US008773397B2

(12) United States Patent
Hotelling et al.

(10) Patent No.: US 8,773,397 B2
(45) Date of Patent: *Jul. 8, 2014

(54) DISPLAY WITH DUAL-FUNCTION CAPACITIVE ELEMENTS

(71) Applicant: Apple Inc., Cupertino, CA (US)

(72) Inventors: Steve Porter Hotelling, Los Gatos, CA (US); Shih Chang Chang, Cupertino, CA (US); Lili Huang, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,063

(22) Filed: Jan. 14, 2014

(65) Prior Publication Data

US 2014/0139484 A1    May 22, 2014

Related U.S. Application Data

(60) Division of application No. 13/936,980, filed on Jul. 8, 2013, which is a continuation of application No. 12/240,964, filed on Sep. 29, 2008, now Pat. No. 8,508,495.

(60) Provisional application No. 61/078,337, filed on Jul. 3, 2008.

(51) Int. Cl.
*G06F 3/041* (2006.01)
(52) U.S. Cl.
USPC .......................................... 345/174; 345/173
(58) Field of Classification Search
CPC ................................................... G06F 3/0412
USPC ..................... 345/173–178; 178/18.01–20.04
See application file for complete search history.

(56) References Cited

U.S. PATENT DOCUMENTS

| 4,916,308 A | 4/1990 | Meadows |
| 5,105,186 A | 4/1992 | May |

(Continued)

FOREIGN PATENT DOCUMENTS

| CN | 1800923 A | 7/2006 |
| CN | 1875312 A | 12/2006 |

(Continued)

OTHER PUBLICATIONS

Chinese Search Report mailed Mar. 23, 2011, for CN Application No. 2009201531939, 10 pages.

(Continued)

*Primary Examiner* — Ryan A Lubit
(74) *Attorney, Agent, or Firm* — Morrison & Foerster LLP

(57) ABSTRACT

A touch screen including display pixels with capacitive elements is provided. The touch screen includes first common voltage lines connecting capacitive elements in adjacent display pixels, and a second common voltage line connecting first common voltage lines. Groups of pixels can be formed as electrically separated regions by including breaks in the common voltage lines. The regions can include a drive region that is stimulated by stimulation signals, a sense region that receives sense signals corresponding to the stimulation signals. A grounded region can also be included, for example, between a sense region and a drive region. A shield layer can be formed of a substantially high resistance material and disposed to shield a sense region. A black mask line and conductive line under the black mask line can be included, for example, to provide low-resistance paths between a region of pixels and touch circuitry outside the touch screen borders.

28 Claims, 58 Drawing Sheets

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,589,856 A | 12/1996 | Stein et al. |
| 5,606,346 A | 2/1997 | Kai et al. |
| 5,825,352 A | 10/1998 | Bisset et al. |
| 5,835,079 A | 11/1998 | Shieh |
| 5,838,308 A | 11/1998 | Knapp et al. |
| 5,880,411 A | 3/1999 | Gillespie et al. |
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |
| 6,310,610 B1 | 10/2001 | Beaton et al. |
| 6,323,846 B1 | 11/2001 | Westerman et al. |
| 6,380,931 B1 | 4/2002 | Gillespie et al. |
| 6,483,498 B1 | 11/2002 | Colgan et al. |
| 6,501,529 B1 | 12/2002 | Kurihara et al. |
| 6,586,101 B2 | 7/2003 | Chu |
| 6,680,448 B2 | 1/2004 | Kawashima et al. |
| 6,690,387 B2 | 2/2004 | Zimmerman et al. |
| 6,778,163 B2 | 8/2004 | Ozawa |
| 7,015,894 B2 | 3/2006 | Morohoshi |
| 7,042,444 B2 | 5/2006 | Cok |
| 7,133,032 B2 | 11/2006 | Cok |
| 7,184,064 B2 | 2/2007 | Zimmerman et al. |
| 7,202,856 B2 | 4/2007 | Cok |
| 7,230,608 B2 | 6/2007 | Cok |
| 7,280,167 B2 | 10/2007 | Choi et al. |
| 7,379,054 B2 | 5/2008 | Lee et al. |
| 7,482,187 B2 | 1/2009 | Shibusawa |
| 7,605,864 B2 | 10/2009 | Takahashi et al. |
| 7,663,607 B2 | 2/2010 | Hotelling et al. |
| 7,701,539 B2 | 4/2010 | Shih et al. |
| 7,705,834 B2 | 4/2010 | Swedin |
| 7,859,521 B2 | 12/2010 | Hotelling et al. |
| 7,880,703 B2 | 2/2011 | Park et al. |
| 7,995,041 B2 | 8/2011 | Chang |
| 8,217,913 B2 | 7/2012 | Hotelling et al. |
| 8,363,027 B2 | 1/2013 | Hotelling et al. |
| 8,479,122 B2 | 7/2013 | Hotelling et al. |
| 8,502,799 B2 | 8/2013 | Hotelling et al. |
| 8,508,495 B2 | 8/2013 | Hotelling et al. |
| 2001/0040665 A1 | 11/2001 | Ahn |
| 2002/0084992 A1 | 7/2002 | Agnew |
| 2003/0234769 A1 | 12/2003 | Cross et al. |
| 2004/0141096 A1 | 7/2004 | Mai |
| 2004/0189587 A1 | 9/2004 | Jung et al. |
| 2005/0052582 A1 | 3/2005 | Mai |
| 2005/0179668 A1 | 8/2005 | Edwards |
| 2005/0231487 A1 | 10/2005 | Ming |
| 2005/0243023 A1 | 11/2005 | Reddy et al. |
| 2006/0007165 A1 | 1/2006 | Yang et al. |
| 2006/0026521 A1 | 2/2006 | Hotelling et al. |
| 2006/0097991 A1 | 5/2006 | Hotelling et al. |
| 2006/0109222 A1 | 5/2006 | Lee et al. |
| 2006/0145365 A1 | 7/2006 | Halls et al. |
| 2006/0146033 A1 | 7/2006 | Chen et al. |
| 2006/0146034 A1 | 7/2006 | Chen et al. |
| 2006/0197753 A1 | 9/2006 | Hotelling |
| 2006/0220033 A1 | 10/2006 | Yamasaki |
| 2006/0244736 A1 | 11/2006 | Tseng |
| 2006/0262100 A1 | 11/2006 | Van Berkel |
| 2007/0018969 A1 | 1/2007 | Chen et al. |
| 2007/0040814 A1 | 2/2007 | Lee et al. |
| 2007/0075977 A1 | 4/2007 | Chen et al. |
| 2007/0165009 A1 | 7/2007 | Sakurai et al. |
| 2007/0176905 A1 | 8/2007 | Shih et al. |
| 2007/0216657 A1 | 9/2007 | Konicek |
| 2007/0222762 A1 | 9/2007 | Van Delden et al. |
| 2007/0240914 A1 | 10/2007 | Lai et al. |
| 2007/0252801 A1 | 11/2007 | Park et al. |
| 2007/0262967 A1 | 11/2007 | Rho |
| 2007/0279395 A1 | 12/2007 | Philipp |
| 2008/0018581 A1 | 1/2008 | Park et al. |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0062139 A1 | 3/2008 | Hotelling et al. |
| 2008/0062140 A1 | 3/2008 | Hotelling et al. |
| 2008/0062147 A1* | 3/2008 | Hotelling et al. ............ 345/174 |
| 2008/0062148 A1 | 3/2008 | Hotelling et al. |
| 2008/0067528 A1 | 3/2008 | Choi et al. |
| 2008/0074401 A1 | 3/2008 | Chung et al. |
| 2008/0129898 A1 | 6/2008 | Moon |
| 2008/0136980 A1 | 6/2008 | Rho et al. |
| 2008/0150901 A1 | 6/2008 | Lowles et al. |
| 2008/0158118 A1 | 7/2008 | Ono et al. |
| 2008/0186288 A1 | 8/2008 | Chang |
| 2008/0195180 A1 | 8/2008 | Stevenson et al. |
| 2008/0273000 A1 | 11/2008 | Park et al. |
| 2008/0278178 A1* | 11/2008 | Philipp ........................ 324/662 |
| 2008/0278458 A1 | 11/2008 | Masuzawa et al. |
| 2008/0309627 A1 | 12/2008 | Hotelling et al. |
| 2008/0309631 A1 | 12/2008 | Westerman et al. |
| 2009/0002331 A1 | 1/2009 | Kamiya et al. |
| 2009/0009486 A1* | 1/2009 | Sato et al. ..................... 345/174 |
| 2009/0096760 A1 | 4/2009 | Ma et al. |
| 2009/0179868 A1 | 7/2009 | Ayres et al. |
| 2009/0237369 A1 | 9/2009 | Hur et al. |
| 2010/0001973 A1 | 1/2010 | Hotelling et al. |
| 2010/0045632 A1* | 2/2010 | Yilmaz et al. ................ 345/174 |
| 2010/0194697 A1 | 8/2010 | Hotelling et al. |
| 2010/0194699 A1 | 8/2010 | Chang |
| 2010/0194707 A1 | 8/2010 | Chang et al. |
| 2011/0228187 A1* | 9/2011 | Wu et al. ......................... 349/41 |
| 2012/0026132 A1* | 2/2012 | Hotelling et al. ............ 345/174 |
| 2012/0262406 A1 | 10/2012 | Hotelling et al. |
| 2013/0106755 A1 | 5/2013 | Hotelling et al. |
| 2013/0293513 A1 | 11/2013 | Hotelling et al. |
| 2013/0300953 A1 | 11/2013 | Hotelling et al. |

FOREIGN PATENT DOCUMENTS

| | | |
|---|---|---|
| CN | 1942853 A | 4/2007 |
| CN | 1959481 A | 5/2007 |
| EP | 1 192 585 A1 | 4/2002 |
| EP | 1 192 585 B1 | 4/2002 |
| EP | 1 422 601 | 5/2004 |
| EP | 1 455 264 A2 | 9/2004 |
| EP | 1 455 264 A3 | 9/2004 |
| EP | 1 455 264 B1 | 9/2004 |
| JP | 7-110742 A | 4/1995 |
| JP | 2000-163031 A | 6/2000 |
| JP | 2002-342033 A | 11/2002 |
| JP | 2005-523496 A | 8/2005 |
| JP | 2006-064769 A | 3/2006 |
| JP | 2006-344163 A | 12/2006 |
| JP | 2007-334347 A | 12/2007 |
| JP | 2008-070983 A | 3/2008 |
| JP | 2008-281616 A | 11/2008 |
| KR | 10-2006-0073590 A | 6/2006 |
| KR | 10-2007-0082757 A | 8/2007 |
| KR | 10-2007-0102414 A | 10/2007 |
| TW | 1234676 | 6/2005 |
| TW | 200826032 A | 6/2008 |
| TW | I303050 | 11/2008 |
| WO | WO-95/27334 A1 | 10/1995 |
| WO | WO-2005/015373 A2 | 2/2005 |
| WO | WO-2005/101178 A2 | 10/2005 |
| WO | WO-2005/101178 A3 | 10/2005 |
| WO | WO-2005/114369 A3 | 12/2005 |
| WO | WO-2007/146779 A2 | 12/2007 |
| WO | WO-2007/146779 A3 | 12/2007 |
| WO | WO-2007/146780 A2 | 12/2007 |
| WO | WO-2007/146780 A3 | 12/2007 |
| WO | WO-2007/146783 A2 | 12/2007 |
| WO | WO-2007/146783 A3 | 12/2007 |
| WO | WO-2010/002929 A2 | 1/2010 |

(56) References Cited

FOREIGN PATENT DOCUMENTS

WO  WO-2010/088666 A1  8/2010
WO  WO-2010/088670 A1  8/2010

OTHER PUBLICATIONS

Chinese Search Report completed Dec. 16, 2011, for CN Application No. ZL2010201083672, filed Feb. 2, 2010, with English Translation, 15 pages.
Chinese Search Report completed Mar. 27, 2012, for CN Application No. ZL2010201083672, filed Feb. 2, 2010, with English Translation, 16 pages.
European Search Report mailed Jul. 6, 2010, for EP Application No. 10151966.8, seven pages.
European Search Report mailed Dec. 9, 2010, for EP Application No. 09164196.9, filed Jun. 30, 2009, six pages.
European Search Report mailed Oct. 4, 2011, for EP Application No. 09164196.9, filed Jun. 30, 2009, 11 pages.
Final Office Action mailed May 15, 2012, for U.S. Appl. No. 12/240,964, filed Sep. 29, 2008, 39 pages.
International Search Report mailed Mar. 17, 2010, for PCT Application No. PCT/US10/22883, filed Feb. 2, 2010, one page.
International Search Report mailed Jun. 25, 2010, for PCT Application No. PCT/US10/22888, filed Feb. 2, 2010, two pages.
International Search Report mailed Mar. 15, 2011, for PCT Application No. PCT/US2009/049313, filed Jun. 30, 2009, seven pages.
Kanda, E. et al. (2008). "55.2: Integrated Active Matrix Capacitive Sensors for Touch Panel LTPS-TFT LCDs," *SID 08 Digest*, pp. 834-837.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Nov. 9, 2011, for U.S. Appl. No. 12/240,964, filed Sep. 29, 2008, 27 pages.
Non-Final Office Action mailed Sep. 15, 2011, for U.S. Appl. No. 12/545,649, filed Aug. 21, 2009, 1449 nine pages.
Notice of Allowance mailed Jun. 10, 2010, for U.S. Appl. No. 12/756,834, filed Apr. 8, 2010, six pages.
Notice of Allowance mailed Jul. 7, 2010, for U.S. Appl. No. 12/558,488, filed Sep. 11, 2009, six pages.
Notice of Allowance mailed Mar. 12, 2012, for U.S. Appl. No. 12/545,649, filed Aug. 21, 2009, seven pages.
Notice of Allowance mailed Nov. 6, 2012, for U.S. Appl. No. 13/527,470, filed Jun. 19, 2012, 11 pages.
Notice of Allowance mailed Apr. 17, 2013, for U.S. Appl. No. 12/240,964 filed Sep. 29, 2008, 13 pages.
Notice of Allowance mailed Apr. 17, 2013 for U.S. Appl. No. 13/717,593 filed Dec. 17, 2012, 9 pages.
Notice of Allowance mailed Nov. 13, 2013, for U.S. Appl. No. 13/936,980 filed Jul. 8, 2013, 20 pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Supplemental Notice of Allowability mailed May 19, 2011, for U.S. Appl. No. 12/558,488, filed Sep. 11, 2009, 10 pages. (include Notice of Allowance mailed May 6, 2011).
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Supplemental Notice of Allowance mailed Jan. 30, 2014, for U.S. Appl. No. 13/936,980, filed Jul. 8, 2013, 2 pages.
TW Search Report mailed Jan. 29, 2014, for TW Patent Application No. 099103062, with English Translatin, two pages.

\* cited by examiner

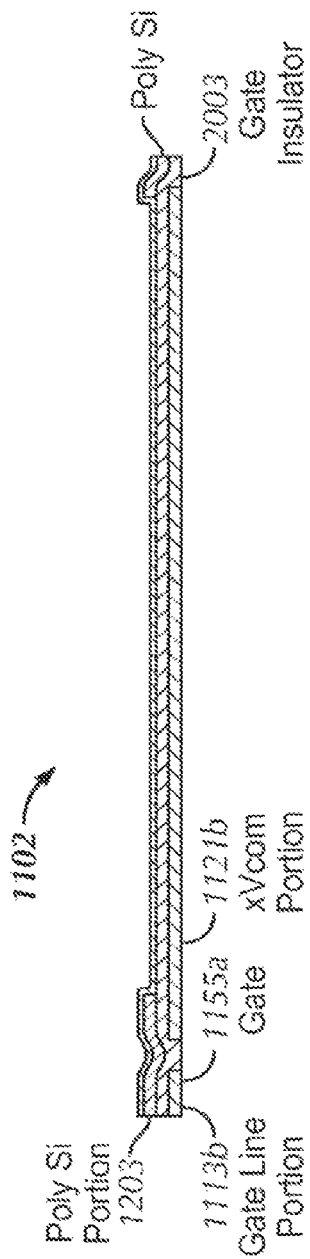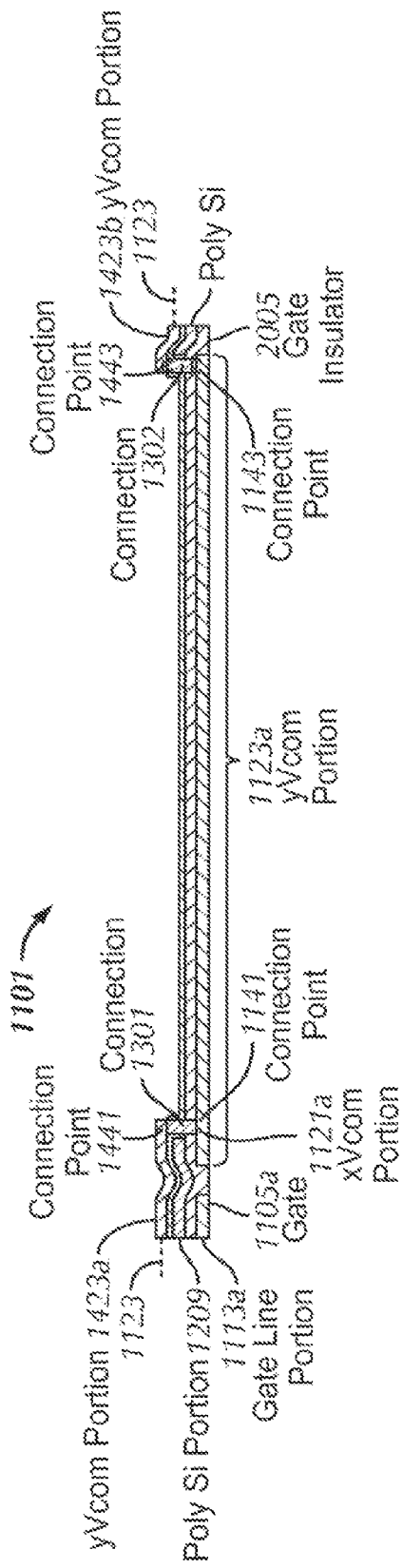
FIG. 20C
FIG. 20D

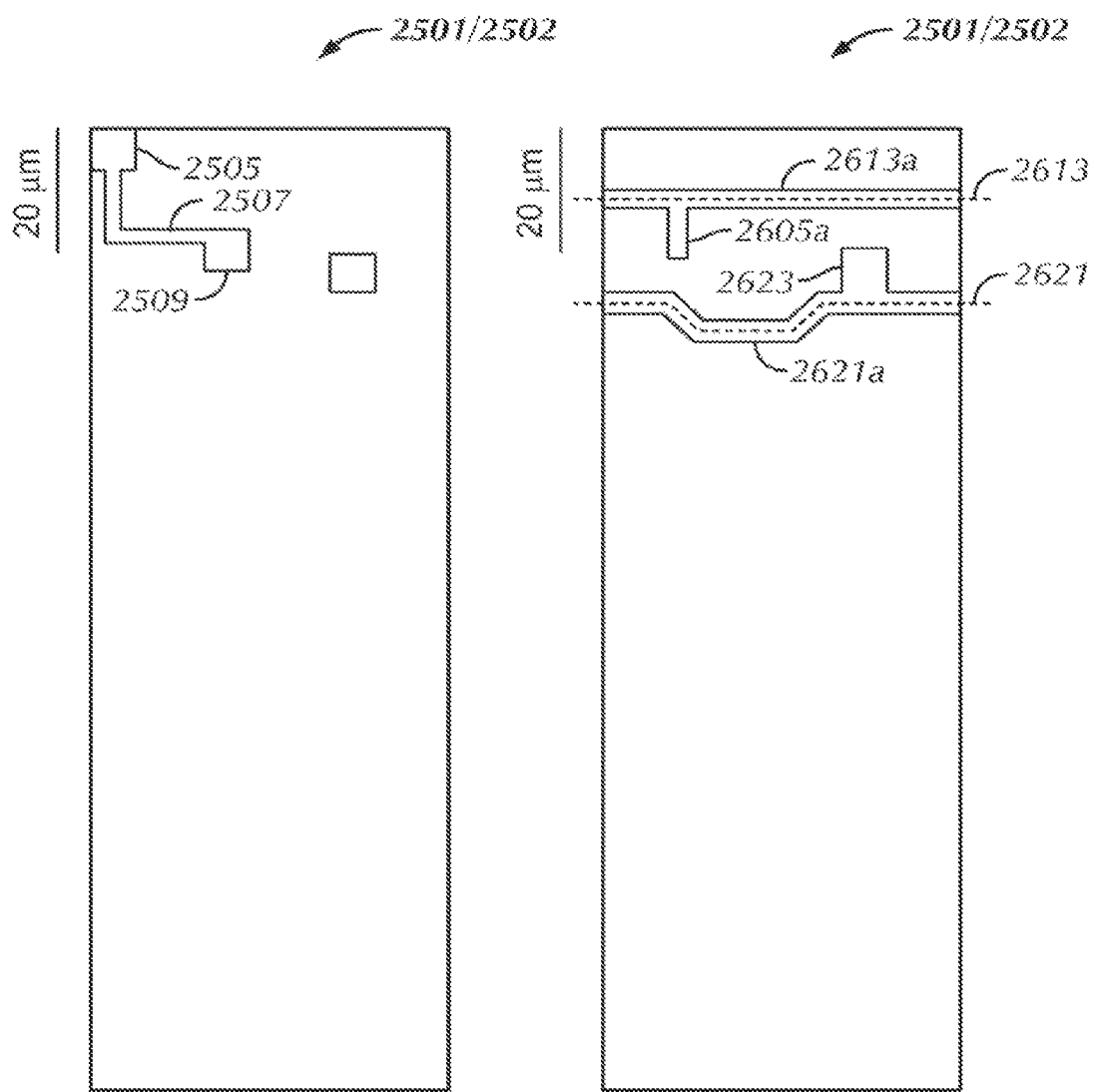

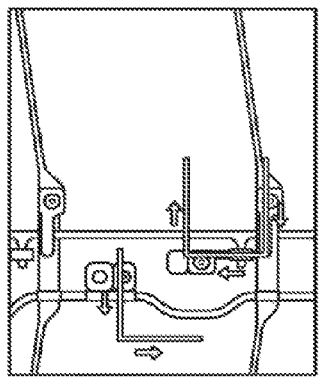
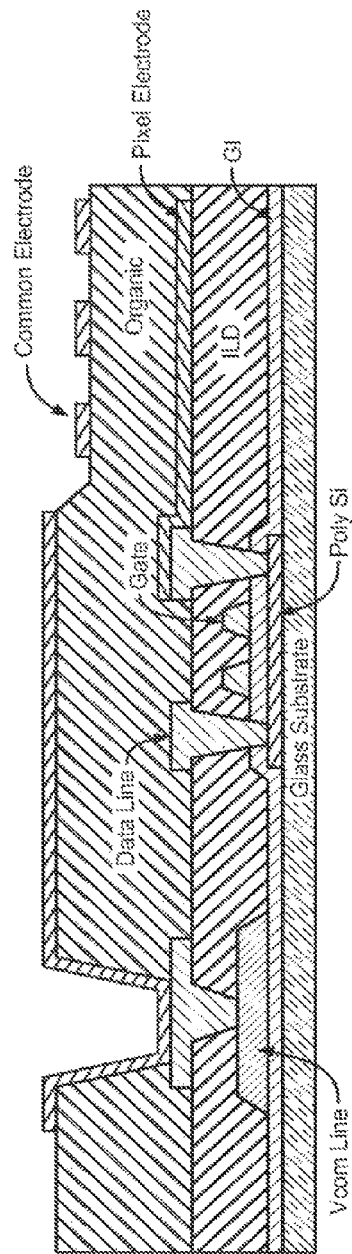
FIG. 33

| Layer | Material | Thickness | Sheet Resistance | Dielectric Constant |
|---|---|---|---|---|
| Poly | Poly-Si | 430A | - | - |
| GI | SiO2 | 750A | - | 4.0 |
| Gate | MoW | 3000A | 0.67 | - |
| ILD | SiNx/SiO2 | 3100A/3700A | - | 7.5/4.0 |
| Data | Ti/Al/Ti | 1750/2750/500 | 0.14 | - |
| Pixel Electrode | IZO | 500A | - | - |
| Organic | Organic | 0.6 um (on PE) 0.8 um (on Data) | - | 3.5 |
| Common Electrode | IZO | 500A | - | - |
| PS | Organic | 2.1 um | - | - |
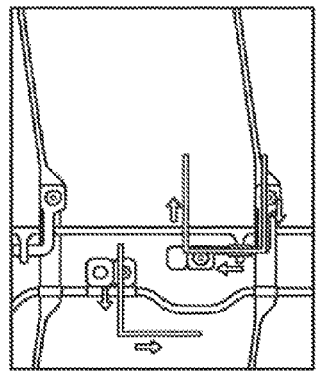
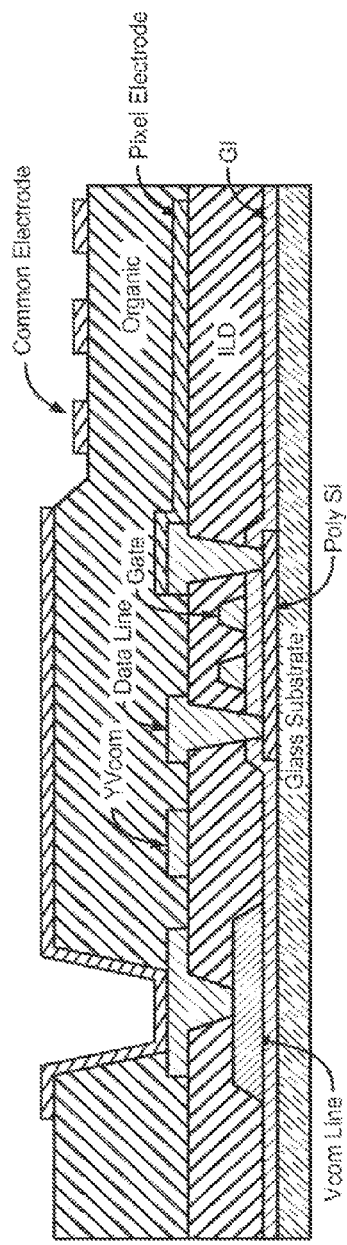
FIG. 43

DISPLAY WITH DUAL-FUNCTION CAPACITIVE ELEMENTS

FIELD OF THE INVENTION

This relates generally to displays having pixels that include capacitive elements, and more particularly to displays in which capacitive elements of the pixels that form part of the display system that generates an image on the display also form part of a touch sensing system that senses touch events on or near the display.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. However, overlaying a display with a touch sensor panel can have drawbacks, such as added weight and thickness, and decreased brightness of the display.

SUMMARY OF THE INVENTION

This relates to displays including pixels with dual-function capacitive elements. Specifically, these dual-function capacitive elements form part of the display system that generates an image on the display, and also form part of a touch sensing system that senses touch events on or near the display. The capacitive elements can be, for example, capacitors in pixels of an LCD display that are configured to operate individually, each as a pixel storage capacitor, or electrode, of a pixel in the display system, and are also configured to operate collectively as elements of the touch sensing system. In this way, for example, a display with integrated touch sensing capability may be manufactured using fewer parts and/or processing steps, and the display itself may be thinner and brighter.

BRIEF DESCRIPTION OF THE DRAWINGS

FIGS. 20A-D illustrate side views of completed pixels in the example ECB LCD display using a-Si according to embodiments of the invention.

FIG. 25 illustrates the patterning of a layer of poly-Si of pixels in an example in-plane switching (IPS) LCD display using low temperature polycrystalline silicon (LTPS) according to embodiments of the invention.

FIG. 26 illustrates the patterning of a first metal layer (M1) of pixels in the example IPS LCD display using LTPS according to embodiments of the invention.

FIG. 33 illustrates a side view of a pixel in the example IPS LCD display using LTPS according to embodiments of the invention.

FIG. 43 illustrates a side view of a pixel in the example IPS LCD display using LTPS in which a yVcom line is formed in an M2 layer according to embodiments of the invention.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to displays including pixels with dual-function capacitive elements. Specifically, these dual-function capacitive elements form part of the display system that generates an image on the display, and also form part of a touch sensing system that senses touch events on or near the display. The capacitive elements can be, for example, capacitors in pixels of an LCD display that are configured to operate individually, each as a pixel storage capacitor, or electrode, of a pixel in the display system, and are also configured to operate collectively as elements of the touch sensing system. In this way, for example, a display with integrated touch sensing capability may be manufactured using fewer parts and/or processing steps, and the display itself may be thinner and brighter.

Figure 1:
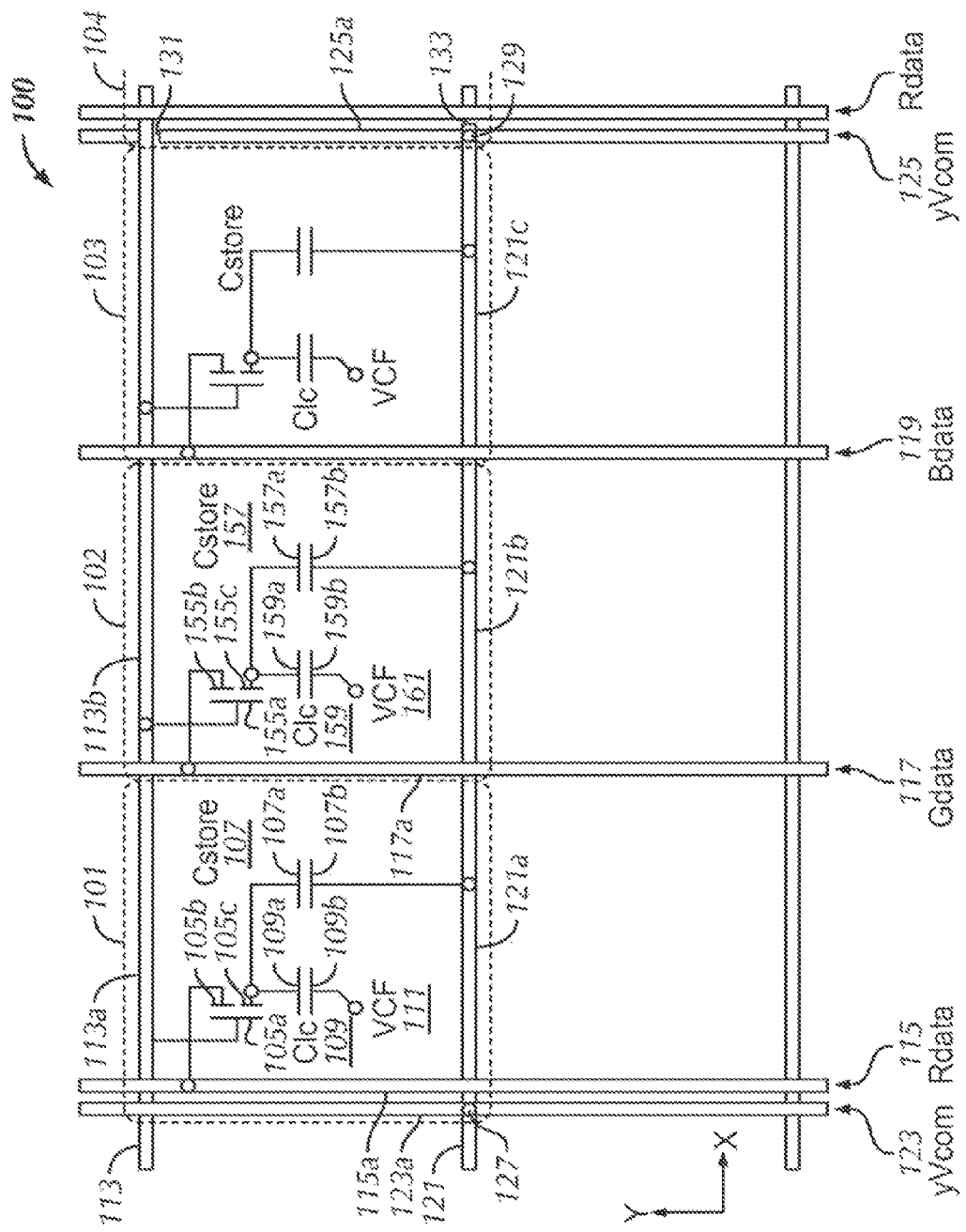
FIG. 1 illustrates a partial circuit diagram of an example LCD display including a plurality of LCD pixels according to embodiments of the present invention.

FIG. 1 is a partial circuit diagram of an example LCD display 100 including a plurality of LCD pixels according to embodiments of the present invention. The pixels of panel 100 are configured such that they are capable of dual-functionality as both LCD pixels and touch sensor elements. That is, the pixels include capacitive elements or electrodes, that can operate as part of the LCD display circuitry of the pixels and that can also operate as elements of touch sensing circuitry. In this way, panel 100 can operate as an LCD display with integrated touch sensing capability. FIG. 1 shows details of pixels 101, 102, 103, and 104 of display 100.

Pixel 102 includes a thin film transistor (TFT) 155 with a gate 155a, a source 155b, and a drain 155c. Pixel 102 also includes a storage capacitor, Cst 157, with an upper electrode 157a and a lower electrode 157b, a liquid crystal capacitor, Clc 159, with a pixel electrode 159a and a common electrode 159b, and a color filter voltage source, Vcf 161. If a pixel is an in-plane-switching (IPS) device, Vcf can be, for example, a fringe field electrode connected to a common voltage line in parallel with Cst 157. If a pixel does not utilize IPS, Vcf 151 can be, for example, an ITO layer on the color filter glass. Pixel 102 also includes a portion 117a of a data line for green (G) color data, Gdata line 117, and a portion 113b of a gate line 113. Gate 155a is connected to gate line portion 113b, and source 155b is connected to Gdata line portion 117a. Upper electrode 157a of Cst 157 is connected to drain 155c of TFT 155, and lower electrode 157b of Cst 157 is connected to a portion 121b of a common voltage line that runs in the x-direction, xVcom 121. Pixel electrode 159a of Clc 159 is connected to drain 155c of TFT 155, and common electrode 159b of Clc 159 is connected to Vcf 151.

The circuit diagram of pixel 103 is identical to that of pixel 102. However, color data line 119 running through pixel 103 carries blue (B) color data. Pixels 102 and 103 can be, for example, conventional LCD pixels.

Similar to pixels 102 and 103, pixel 101 includes a thin film transistor (TFT) 105 with a gate 105a, a source 105b, and a drain 105c. Pixel 101 also includes a storage capacitor, Cst 107, with an upper electrode 107a and a lower electrode 107b, a liquid crystal capacitor, Clc 109, with a pixel electrode 109a and a common electrode 109b, and a color filter voltage source, Vcf 111. Pixel 101 also includes a portion 115a of a data line for red (R) color data, Rdata line 115, and a portion 113a of gate line 113. Gate 105a is connected to gate line portion 113a, and source 105b is connected to Rdata line portion 115a. Upper electrode 107a of Cst 107 is connected to drain 105c of TFT 105, and lower electrode 107b of Cst 107 is connected to a portion 121a of xVcom 121. Pixel electrode 109a of Clc 109 is connected to drain 105c of TFT 105, and common electrode 109b of Clc 109 is connected to Vcf 111.

Unlike pixels 102 and 103, pixel 101 also includes a portion 123a of a common voltage line running in the y-direction, yVcom 123. In addition, pixel 101 includes a connection 127 that connects portion 121a to portion 123a. Thus, connection 127 connects xVcom 121 and yVcom 123.

Pixel 104 is similar to pixel 101, except that a portion 125a of a yVcom 125 has a break (open) 131, and a portion 121b of xVcom 121 has a break 133.

As can be seen in FIG. 1, the lower electrodes of storage capacitors of pixels 101, 102, and 103 are connected together by xVcom 121. This is a conventional type of connection in many LCD panels and, when used in conjunction with conventional gate lines, data lines, and transistors, allows pixels to be addressed. The addition of vertical common voltage lines along with connections to the horizontal common voltage lines allows grouping of pixels in both the x-direction and y-direction, as described in further detail below. For example, yVcom 123 and connection 127 to xVcom 121 can allow the storage capacitors of pixels 101, 102, and 103 to be connected to storage capacitors of pixels that are above and below pixels 101, 102, 103 (the pixels above and below are not shown). For example, the pixels immediately above pixels 101, 102, and 103 can have the same configurations as pixels 101, 102, and 103, respectively. In this case, the storage capacitors of the pixels immediately above pixels 101, 102, and 103 would be connected to the storage capacitors of pixels 101, 102, and 103.

In general, an LCD panel could be configured such that the storage capacitors of all pixels in the panel are connected together, for example, through at least one vertical common voltage line with connections to a plurality of horizontal common voltage lines. Another LCD panel could be configured such that different groups of pixels are connected together to form a plurality of separate regions of connected-together storage capacitors.

One way to create separate regions is by forming breaks (opens) in the horizontal and/or vertical common lines. For example, yVcom 125 of panel 100 has a break 131, which can allow pixels above the break to be isolated from pixels below the break. Likewise, xVcom 121 has a break 133, which can allow pixels to the right of the break to be isolated from pixels to the left of the break.

Figure 2A:
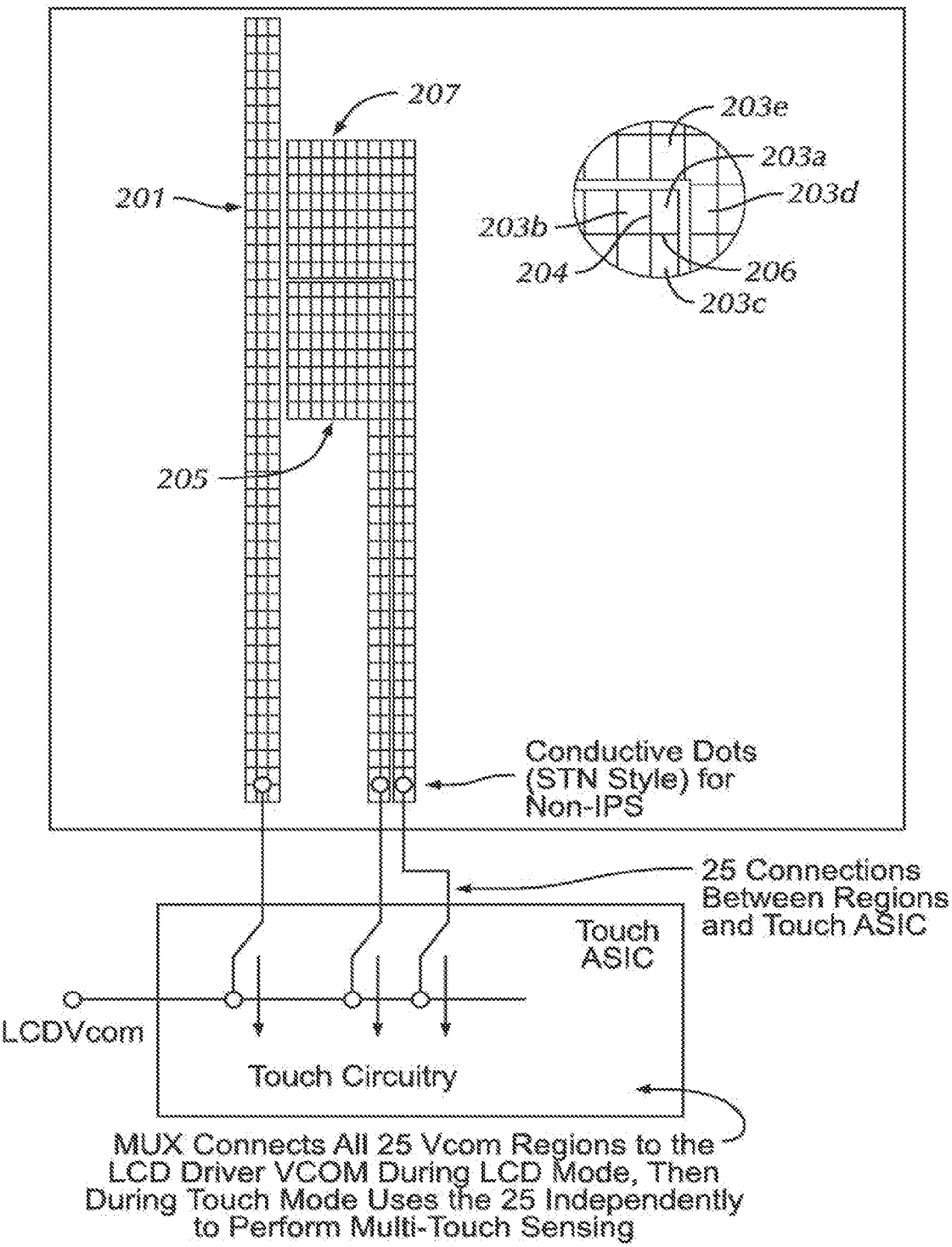
FIGS. 2A and 2B illustrate example regions formed by breaks in vertical and horizontal common voltage lines according to embodiments of the invention.
Figure 2B:
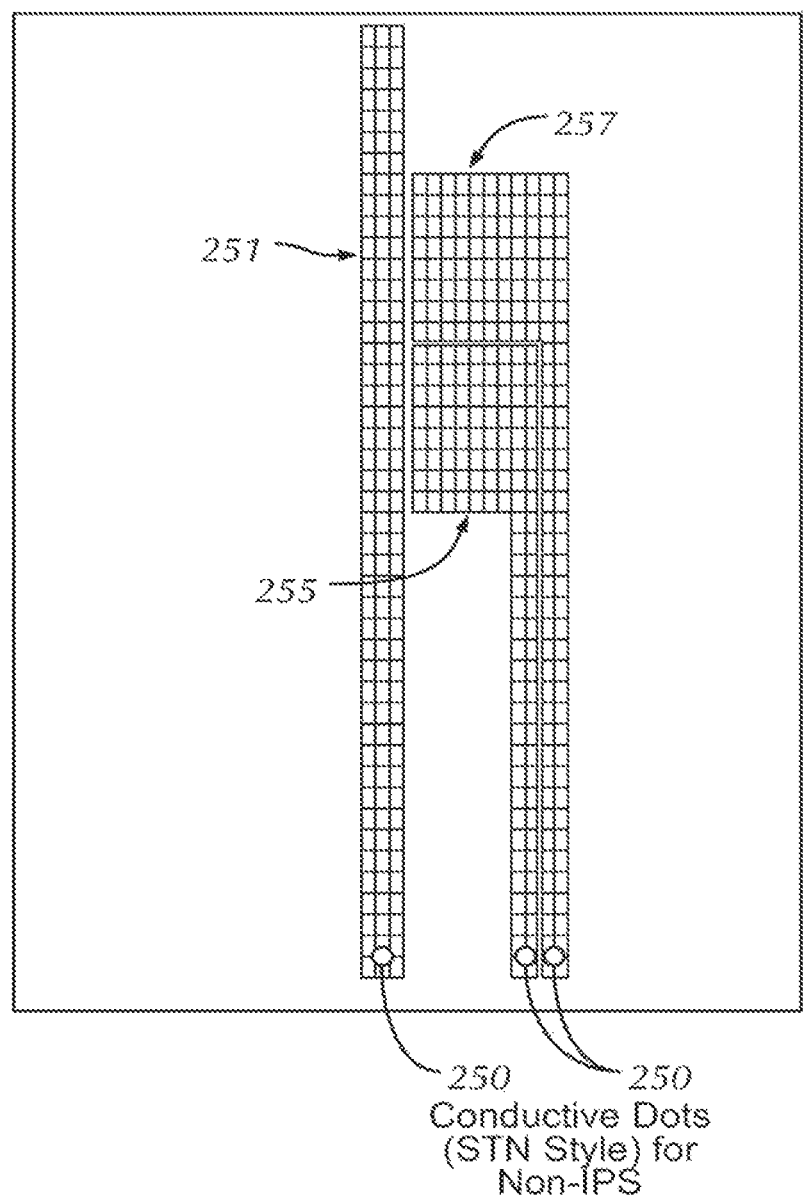

FIGS. 2A and 2B illustrate example regions formed by breaks in vertical and horizontal common voltage lines according to embodiments of the invention. FIG. 2A shows a TFT glass region layout. FIG. 2A shows a region 201, a region 205, and a region 207. Each region 201, 205, and 207 is formed by linking storage capacitors of a plurality of pixels (not shown in detail) through common voltage lines in the vertical direction (y-direction) and in the horizontal direction (x-direction). For example, the enlarged area of FIG. 2A shows pixel blocks 203a-e. A pixel block includes one or more pixels, in which at least one of the pixels includes a vertical common line, yVcom. FIG. 1, for example, illustrates a pixel block that includes pixels 101-103, in which pixel 101 includes yVcom 123. As seen in FIG. 2A, pixel block 203a is connected in the horizontal direction to pixel block 203b through a horizontal common line, xVcom 206. Likewise, pixel block 203a is connected in the vertical direction to pixel block 203c through a vertical common line, yVcom 204. A break in xVcom 206 prevents block 203a from being connected to block 203d, and a break in yVcom 204 prevents block 203a from being connected to block 203e. Regions 201 and 207 form a capacitive element that can provide touch sensing information when connected to suitable touch circuitry, such as touch circuitry 213 of touch ASIC 215. The connection is established by connecting the regions to switch circuitry 217, which is described in more detail below. (Note, for IPS-type displays there are no conductive dots required. In this case, the XVCOM and YVCOM regions may simply extended with metal traces that go to the Touch ASIC which is bonded to the glass in a similar way as the LCD driver chip (through anisotropic conductive adhesive). However, for non-IPS-type displays, the conductive dots may be needed to bring the VCOM regions on the color filter plate into contact with the corresponding regions on the TFT plate.) Likewise, region 201 and region 205 form a capacitive element that can provide touch information when connected to touch circuitry 213. Thus, region 201 serves as a common electrode to regions 205 and 207, which are called, for example, sense electrodes. The foregoing describes mutual capacitance mode of touch sensing. It is also possible to use each region independently to measure self-capacitance.

As described above, the regions connected-together storage capacitors of pixels can be formed using vias between common voltage lines, such as xVcom and yVcom in FIG. 1, and using selective breaks in the common voltage lines. Thus, FIG. 2A illustrates one way in which vias or other connections and selective breaks can be used to create capacitive regions that can span many pixels. Of course, in light of the present disclosure, one skilled in the art would readily understand that regions of other shapes and configurations can be created.

FIG. 2B shows a CF glass patterned ITO region layout, which may or may not be needed, depending on the type of LCD technology used by the pixel. For example, such CF ITO regions would not be needed in the case that the LCD pixel utilizes in-plane-switching (IPS). However, FIG. 2B is directed to non-IPS LCD displays in which a voltage is applied to liquid crystal between an upper and lower electrode. FIG. 2B shows upper regions 221, 223, and 225, which correspond to lower (in non-IPS displays) regions 201, 205, and 207, respectively, of FIG. 2A. FIG. 2B shows conductive dots 250 contacting regions 251, 255, and 257. Conductive dots 250 connect the corresponding upper and lower regions such that when to the upper electrodes of pixels in an upper region are driven, the corresponding lower electrodes of pixels in the lower region are also driven. As a result, the relative voltage between the upper and lower electrodes remains constant, even while the pixels are being driven by, for example, a modulated signal. Thus the voltage applied to the liquid crystal can remain constant during a touch phase, for example. In particular, the constant relative voltage can be the pixel voltage for operation of the LCD pixel. Therefore, the pixels can continue to operate (i.e., display an image) while touch input is being detected.

A touch sensing operation according to embodiments of the invention will be described with reference to FIGS. 3-5B. For the sake of clarity, the operation is described in terms of a single drive pixel and a single sense pixel. However, it is understood that the drive pixel is connected to other drive pixels in a drive region and the sense pixel is connected to other sense pixels in the sense region, as described above. Thus, in actual operation, the entire drive region is driven, and the entire sense region can contribute to the sensing of touch.

Figure 3:
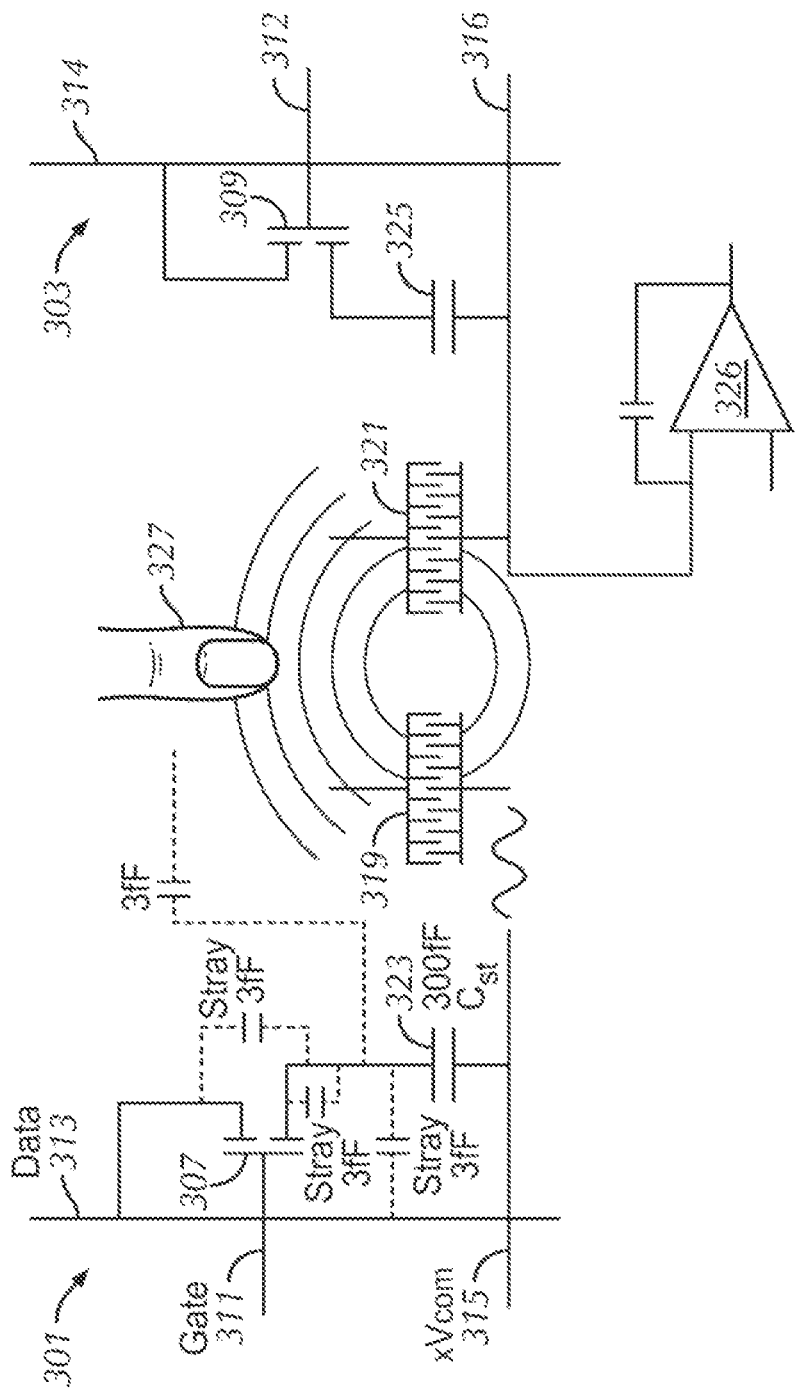
FIG. 3 illustrates partial circuit diagrams of a pixel 301 of a drive region and a pixel 303 of an example sense region.

FIG. 3 shows partial circuit diagrams of a pixel 301 of a drive region and a pixel 303 of an example sense region. Pixels 301 and 303 include TFTs 307 and 309, gate lines 311 and 312, data lines 313 and 314, xVcom lines 315 and 316, fringe field electrodes 319 and 321, and storage capacitors 323 and 325. Storage capacitors 323 and 325 each have a capacitance of about 300 fF (femto-Farads). A lower electrode of fringe field electrode 321 of pixel 303 can be connected, through xVcom 316, to a charge amplifier 326 in the sense circuitry. Charge amplifier 326 holds this line at a virtual ground such that any charge that gets injected from fringe field electrode 321 shows up as a voltage output of the amplifier. While the feedback element of the amplifier is shown as a capacitor, it may also function as a resistor or a combination of a resistor and capacitor. The feedback can also be, for example, a resistor and capacitor feedback for minimizing die-size of the touch sensing circuitry. FIG. 3 also shows a finger 327 that creates a stray capacitance of approximately 3 fF with a cover glass (not shown), and shows other stray capacitances in the pixels, each of which is approximately 3 fF.

Figure 4A:
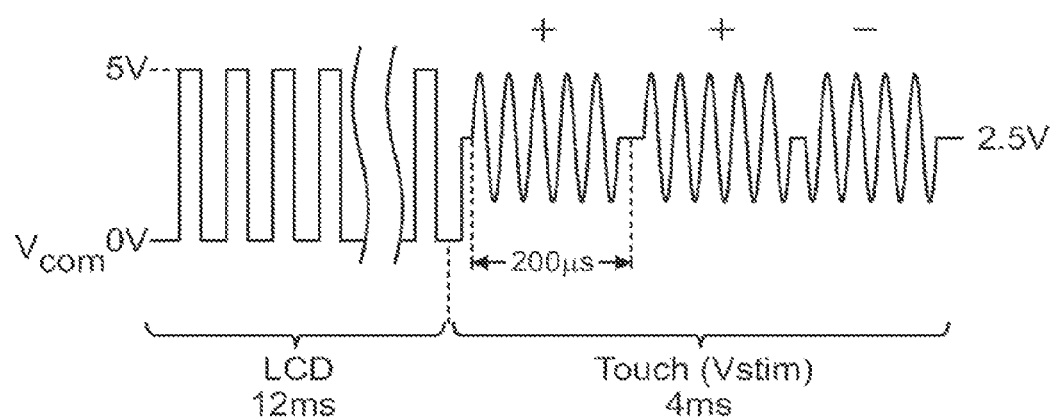
FIG. 4A illustrates example signals applied to the pixels of a drive region during an LCD phase and during a touch phase according to embodiments of the invention.

FIG. 4A shows example signals applied through xVcom 315 to the pixels of the drive region, including pixel 301, during an LCD phase and during a touch phase. During the LCD phase, xVcom 315 is driven with a square wave signal of 2.5V+/−2.5V, in order to perform LCD inversion. The LCD phase is 12 ms in duration. In the touch phase, xVcom 315 is driven with 15 to 20 consecutive stimulation phases lasting 200 microseconds each. The stimulation signals in this case are sinusoidal signals of 2.5V+/−2V each having the same frequency and a relative phase of either 0 degrees or 180 degrees (corresponding to "+" and "−" in FIG. 4A). The touch phase is 4 ms in duration.

Figure 5A:
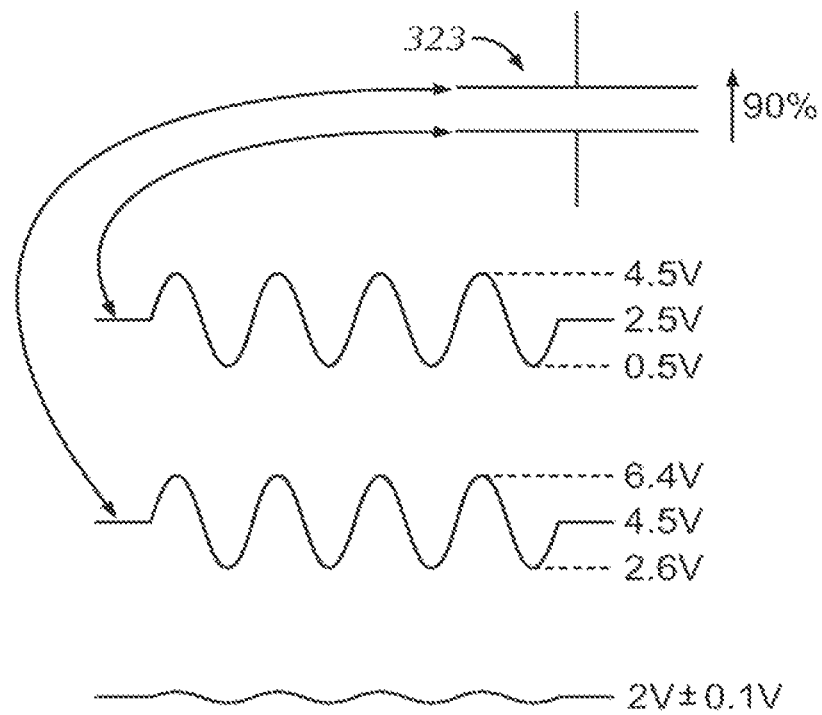
FIG. 5A illustrates details of an example operation of a storage capacitor of a drive region during a touch phase according to embodiments of the invention.

FIG. 5A shows details of the operation of storage capacitor 323 during the touch phase. In particular, because the capacitance of storage capacitor 323 is much higher than the other capacitances, i.e., stray capacitances shown in FIG. 3, almost all (approximately 90%) of the AC component of the 2.5V+/−2V sinusoidal stimulation signal that is applied at the lower electrode of the storage capacitor is transferred to the upper electrode. Therefore, the upper electrode, which is charged to 4.5 volts DC for the operation of the LCD, sees a sinusoidal signal of 4.5V+/−1.9V. These signals are passed to the corresponding left and right comb structures of fringe field electrode 319. In this way, both comb structures of fringe field electrode 319 can be modulated with a signal having an AC component of approximately +/−2V in amplitude (+/−2V on one, +/−1.9V on the other). Thus, fringe field electrode 319, together with the other fringe field electrodes of pixels in the drive region being similarly driven, can operate as a drive line for capacitive sensing.

It is important to note that at the same time fringe field electrode 319 is configured to operate as a drive element for the touch sensing system, the fringe field electrode continues to operate as a part of the LCD display system. As shown in FIG. 5A, while the voltages of the comb structures of fringe field electrode are each modulated at approximately +/−2V, the relative voltage between the comb structures remains approximately constant at 2V+/−0.1V. This relative voltage is the voltage that is seen by the liquid crystal of the pixel for the LCD operation. The 0.1V AC variance in the relative voltage during the touch phase should have an acceptably low affect on the LCD display, particularly since the AC variance would typically have a frequency that is higher than the response time for the liquid crystal. For example, the stimulation signal frequency, and hence the frequency of the AC variance, would typically be more than 100 kHz. However, the response time for liquid crystal is typically less than 100 Hz. Therefore, the fringe field electrode's function as a drive element in the touch system should not interfere with the fringe field electrode's LCD function.

Figure 4B:
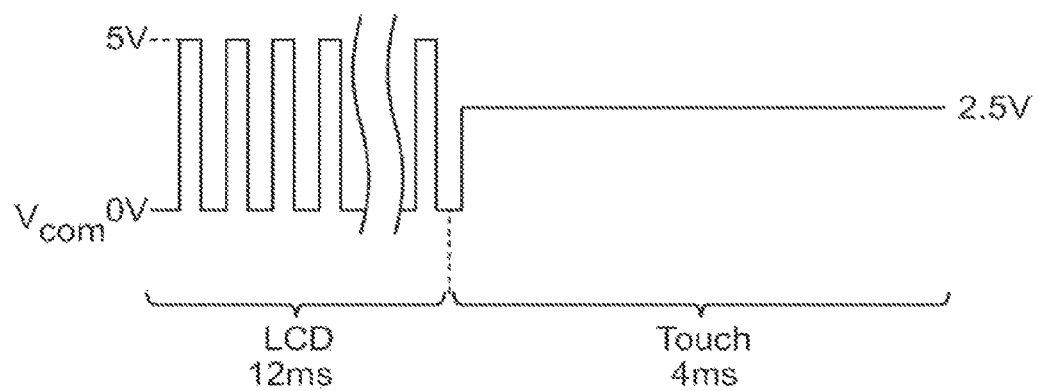
FIG. 4B illustrates example signals applied to the pixels of a sense region during an LCD phase and during a touch phase according to embodiments of the invention.
Figure 5B:
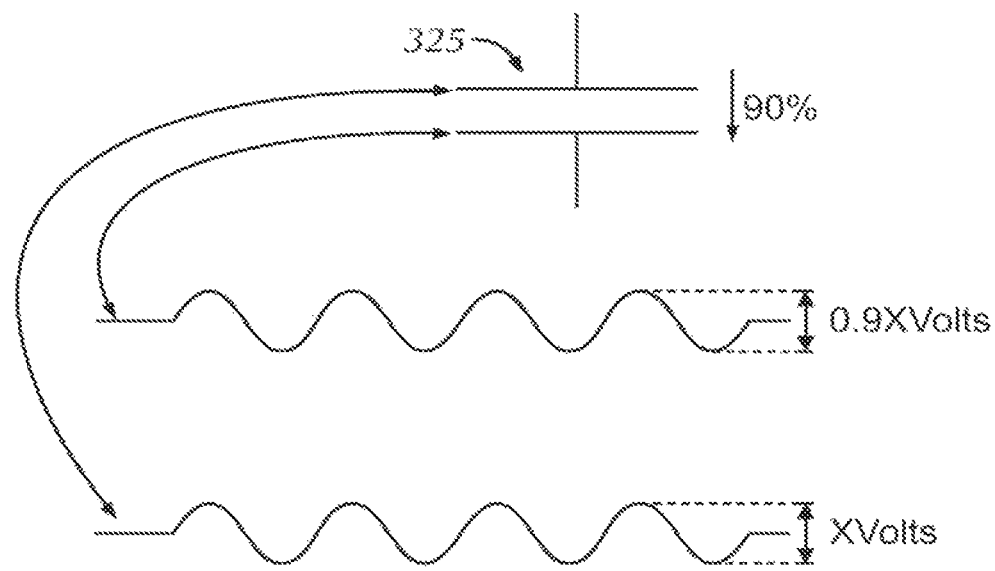
FIG. 5B illustrates details of an example operation of a storage capacitor of a sense region during a touch phase according to embodiments of the invention.

Referring now to FIGS. 3, 4B, and 5B, an example operation of the sense region will now be described. FIG. 4B shows signals applied through xVcom 316 to the pixels of the sense region, including pixel 303, during the LCD and touch phases described above. As with the drive region, xVcom 316 is driven with a square wave signal of 2.5V+/−2.5V in order to perform LCD inversion during the LCD phase. During the touch phase, xVcom 316 is connected to amplifier 326, which holds the voltage at or near a virtual ground of 2.5V. Consequently, fringe field electrode 321 is also held at 2.5V. As shown in FIG. 3, fringing electrical fields propagate from fringe field electrode 319 to fringe field electrode 321. As described above, the fringing electric fields are modulated at approximately +/−2V by the drive region. When these fields are received by the top electrode of fringing field electrode 321, most of the signal gets transferred to the lower electrode, because pixel 303 has the same or similar stray capacitances and storage capacitance as pixel 301. Because xVcom 316 is connected to charge amplifier 326, and is being held at virtual ground, any charge that gets injected will show up as an output voltage of the charge amplifier. This output voltage provides the touch sense information for the touch sensing system. For example, when finger 327 gets close to the fringing fields, it captures some fields and grounds them, which causes a disturbance in the fields. This disturbance can be detected by the touch system as a disturbance in the output voltage of charge amplifier 326. FIG. 5B shows that approximately 90% of a received fringing field at pixel 302 which impinges onto the electrode half of the capacitor which is also connected to the drain of the TFT 325 will be transferred to charge amplifier 326. 100% of the charge that impinges onto the electrode half of the capacitor which is connected directly to XVCOM 316 will be transferred to charge amplifier 326. The ratio of charge impinging onto each electrode will depend on the LCD design. For non-IPS, near 100% of the finger affected charge will impinge on the VCOM electrode because the patterned CF plate is nearest the finger. For IPS type display the ratio will be closer to half and half because each part of the electrode has approximately equal area (or ¼ vs. ¾) facing the finger. For some sub-types of IPS displays, the fringing electrodes are not coplanar, and the majority of the upward facing area is devoted to the VCOM electrode.

The example driving and sensing operations of FIGS. 3, 4A-B, and 5A-B are described using single pixels for the sake of clarity. Some example layouts and operations of drive regions and sense regions according to embodiments of the invention will now be described with reference to FIGS. 6A-C, 7, 8A-C, 9A-C, and 10.

Figure 6A:
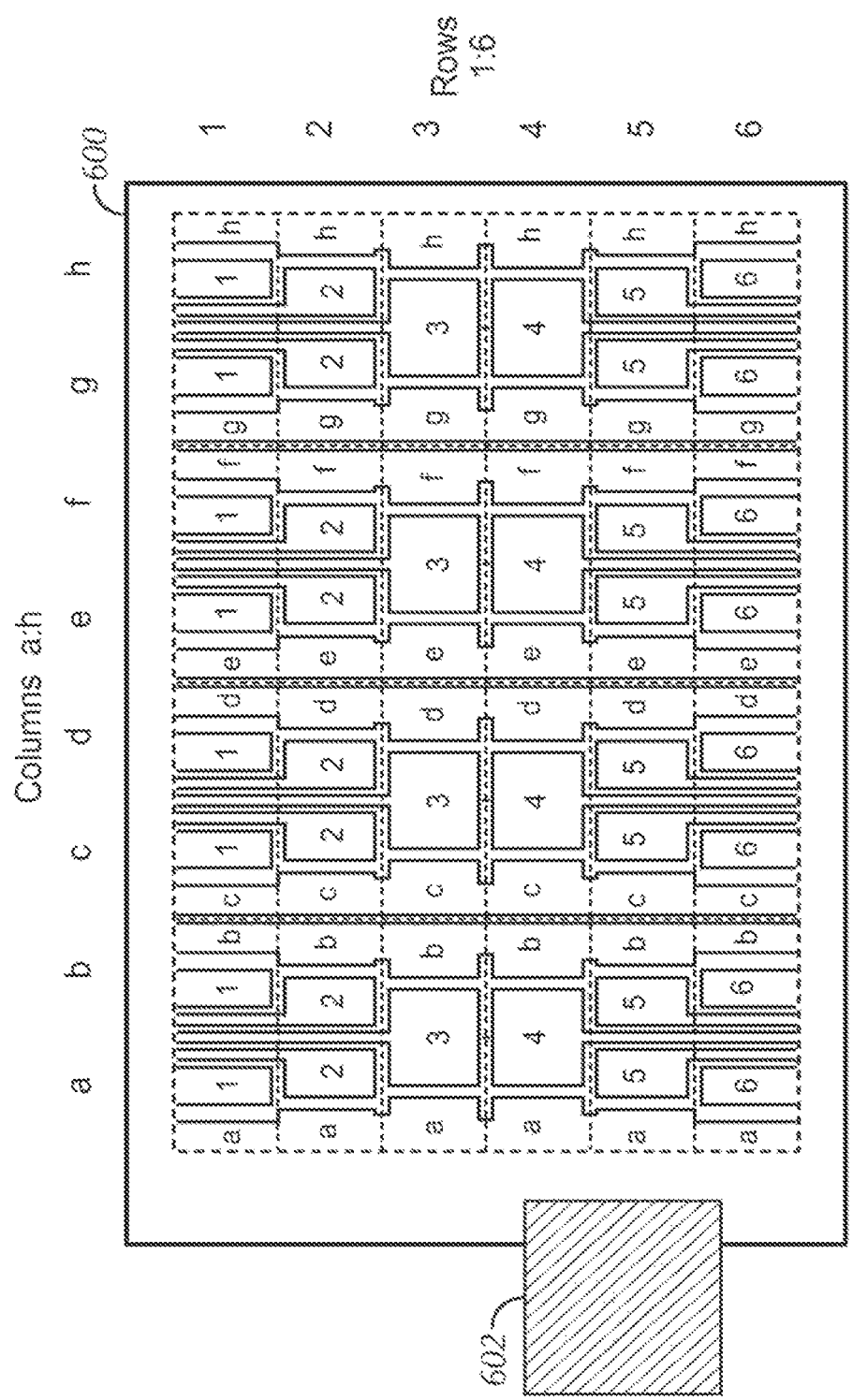
FIG. 6A illustrates a partial view of an example touch screen having regions of pixels with dual-function capacitive elements that operate as LCD elements and as touch sensors according to embodiments of the invention.

FIG. 6A illustrates a partial view of an example touch screen 600 having regions of pixels with dual-function capacitive elements that operate as LCD elements and as touch sensors according to embodiments of the invention. In the example of FIG. 6A, touch screen 600 having eight columns (labeled a through h) and six rows (labeled 1 through 6) is shown, although it should be understood that any number of columns and rows can be employed. Columns a through h can be formed from column-shaped regions, although in the example of FIG. 6A, one side of each column includes staggered edges and notches designed to create separate sections in each column. Each of rows 1 through 6 can be formed from a plurality of distinct patches or pads within the regions, each patch connected to a border area through one or more yVcom lines running to the border area of touch screen 600 for enabling all patches in a particular row to be connected together through metal traces (not shown in FIG. 6A) running in the border areas. These metal traces can be routed to a small area on one side of touch screen 600 and connected to a flex circuit 602. As shown in the example of FIG. 6A, the patches forming the rows can be formed, by selective placement of breaks in xVcom lines and yVcom lines, for example, in a generally pyramid-shaped configuration. In FIG. 6A, for example, the patches for rows 1-3 between columns a and b are arranged in an inverted pyramid configuration, while the patches for rows 4-6 between columns a and b are arranged in an upright pyramid configuration.

Figure 6B:
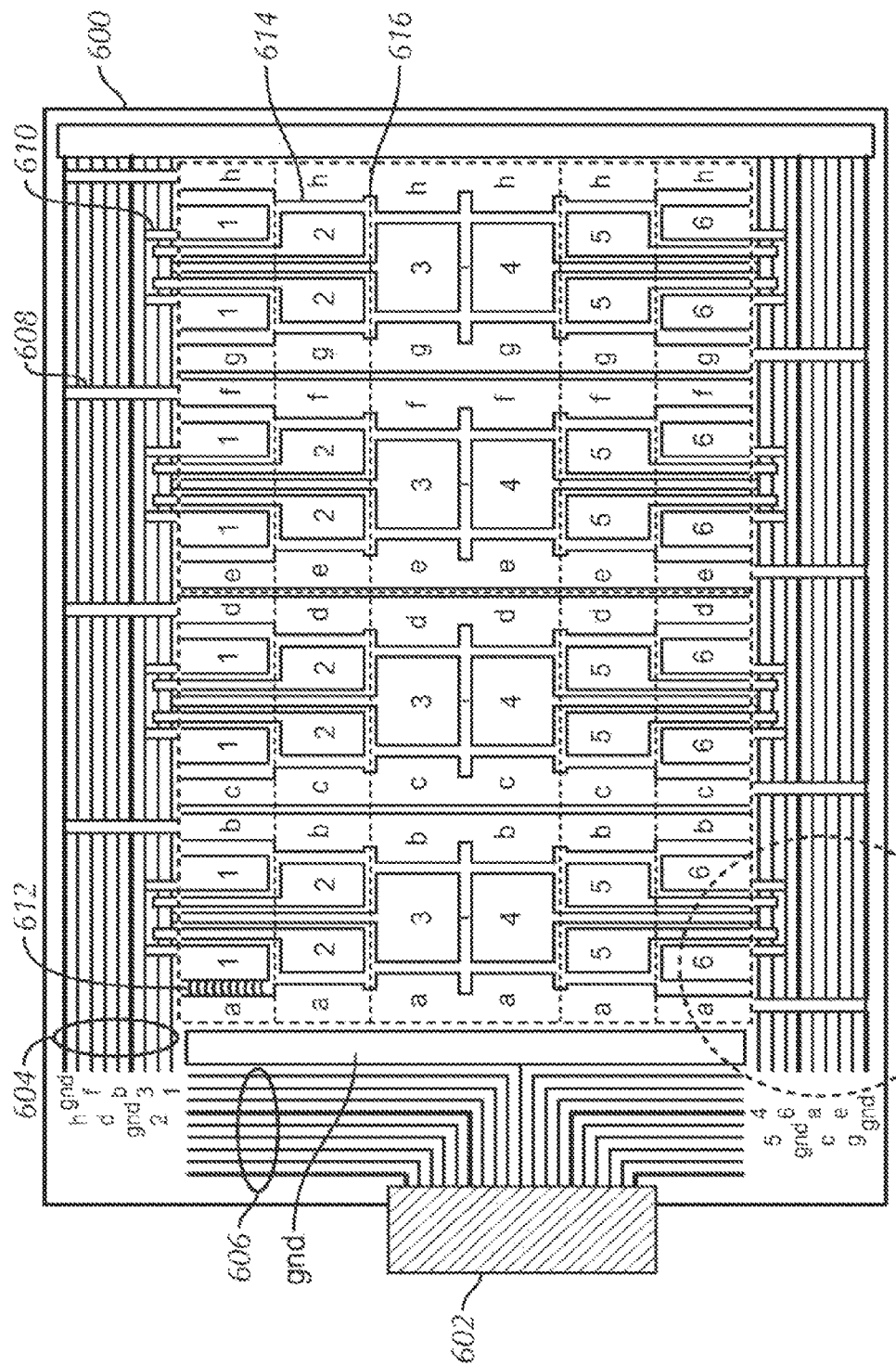
FIG. 6B illustrates a partial view of example touch screen including metal traces running in the border areas of the touch screen according to embodiments of the invention.

FIG. 6B illustrates a partial view of example touch screen 600 including metal traces 604 and 606 running in the border areas of the touch screen according to embodiments of the invention. Note that the border areas in FIG. 6B are enlarged for clarity. Each column a-h can include extended yVcom line(s) 608 that allows the column to be connected to a metal trace through a via (not shown in FIG. 6B). One side of each column includes staggered edges 614 and notches 616 designed to create separate sections in each column. Each row patch 1-6 can include extended yVcom line(s) 610 that allows the patch to be connected to a metal trace through a via (not shown in FIG. 6B). yVcom lines 610 can allow each patch in a particular row to be self-connected to each other. Because all metal traces 604 and 606 are formed on the same layer, they can all be routed to the same flex circuit 602.

If touch screen 600 is operated as a mutual capacitance touch screen, either the columns a-h or the rows 1-6 can be driven with one or more stimulation signals, and fringing electric field lines can form between adjacent column areas and row patches. In FIG. 6B, it should be understood that although only electric field lines 612 between column a and row patch 1 (a-1) are shown for purposes of illustration, electric field lines can be formed between other adjacent column and row patches (e.g. a-2, b-4, g-5, etc.) depending on what columns or rows are being stimulated. Thus, it should be understood that each column-row patch pair (e.g. a-1, a-2, b-4, g-5, etc.) can represent a two-region touch pixel or sensor at which charge can be coupled onto the sense region from the drive region. When a finger touches down over one of these touch pixels, some of the fringing electric field lines that extend beyond the cover of the touch screen are blocked by the finger, reducing the amount of charge coupled onto the sense region. This reduction in the amount of coupled charge can be detected as part of determining a resultant "image" of touch. It should be noted that in mutual capacitance touch screen designs as shown in FIG. 6B, no separate reference ground is needed, so no second layer on the back side of the substrate, or on a separate substrate, is needed.

Touch screen 600 can also be operated as a self-capacitance touch screen. In such an embodiment, a reference ground plane can be formed on the back side of the substrate, on the same side as the patches and columns but separated from the patches and columns by a dielectric, or on a separate substrate. In a self-capacitance touch screen, each touch pixel or sensor has a self-capacitance to the reference ground that can be changed due to the presence of a finger. In self-capacitance embodiments, the self-capacitance of columns a-h can be sensed independently, and the self-capacitance of rows 1-6 can also be sensed independently.

Figure 6C:
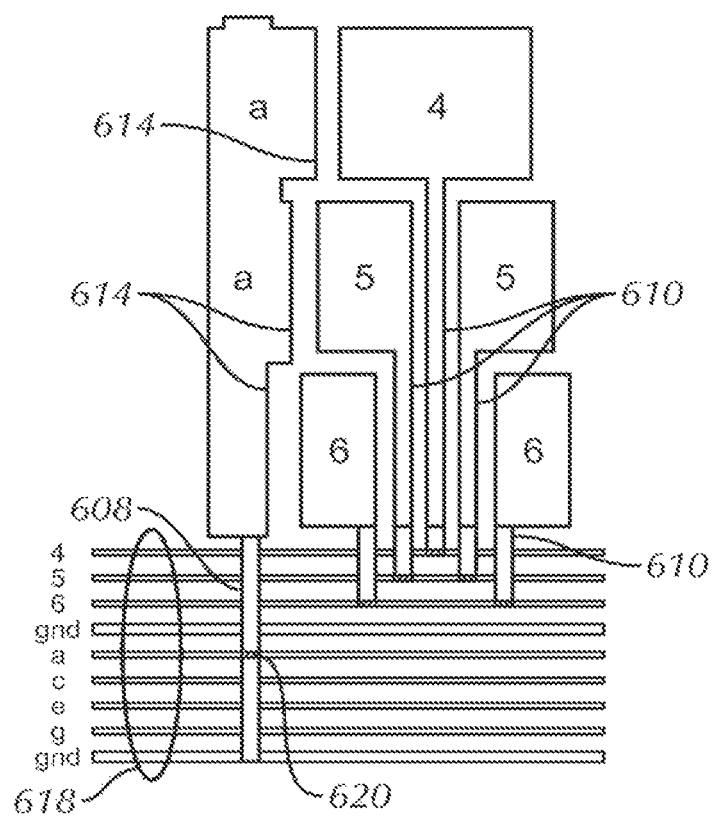
FIG. 6C illustrates an example connection of columns and row patches to the metal traces in the border area of the touch screen according to embodiments of the invention.

FIG. 6C illustrates an example connection of columns and row patches to the metal traces in the border area of the touch screen according to embodiments of the invention. FIG. 6C represents "Detail A" as shown in FIG. 6B, and shows column "a" and row patches 4-6 connected to metal traces 618 through yVcom lines 608 and 610. Because yVcom lines 608 and 610 are separated from metal traces 618 by a dielectric material, vias 620 formed in the dielectric material allow the yVcom lines to connect to the metal traces. The metal traces 618 can be formed in the same layer as the yVcom lines. In this case, there would be no additional process steps, and the touch traces can be routed in the same M1 and M2 layers that are conventional in LCD's, also sometimes referred to as "gate metal" and "source/drain metal". Also, the dielectric insulation layer can be referred to as a "inner layer dielectric" or "ILD".

As shown in FIG. 6C, column edges 614 and row patches 4-6 can be staggered in the x-dimension because space should be made for the touch pixels containing yVcom lines 610 connecting row patches 4 and 5. (It should be understood that row patch 4 in the example of FIG. 6C is really two patches stuck together.) To gain optimal touch sensitivity, it can be desirable to balance the area of the regions in touch pixels a-6, a-5 and a-4. However, if column "a" was kept linear, row patch 6 can be slimmer than row patch 5 or 6, and an imbalance would be created between the regions of touch pixel a-6.

Figure 7:
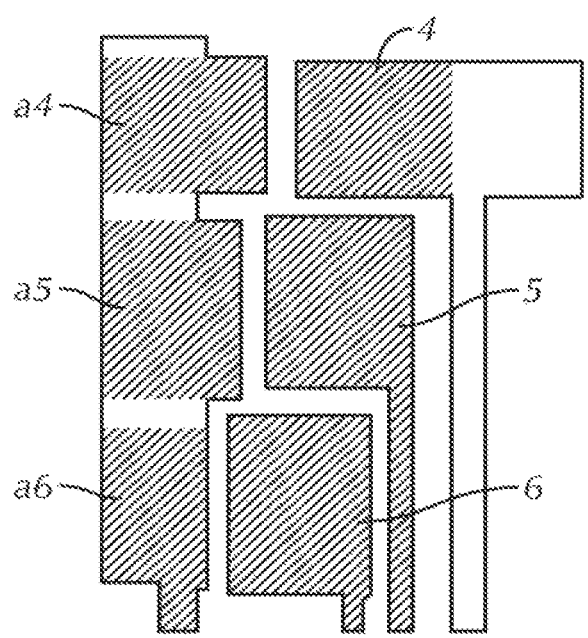
FIG. 7 illustrates a top view of an example column and adjacent row patches according to embodiments of the invention.

FIG. 7 illustrates a top view of an example column and adjacent row patches according to embodiments of the invention. It can be generally desirable to make the mutual capacitance characteristics of touch pixels a-4, a-5 and a-6 relatively constant to produce a relatively uniform z-direction touch sensitivity that stays within the range of touch sensing circuitry. Accordingly, the column areas $a_4$, $a_5$ and $a_6$ should be about the same as row patch areas 4, 5 and 6. To accomplish this, column section $a_4$ and $a_5$, and row patch 4 and 5 can be shrunk in the y-direction as compared to column section a6 and row patch 6 so that the area of column segment $a_4$ matches the area of column segments $a_5$ and $a_6$. In other words, touch pixel $a_4$-4 will be wider but shorter than touch pixel $a_6$-6, which will be narrower but taller.

Because the touch pixels or sensors can be slightly skewed or misaligned in the x-direction, the x-coordinate of a maximized touch event on touch pixel a-6 (e.g. a finger placed down directly over touch pixel a-6) can be slightly different from the x-coordinate of a maximized touch event on touch pixel a-4, for example. Accordingly, in embodiments of the invention this misalignment can be de-warped in a software algorithm to re-map the touch pixels and remove the distortion.

Although a typical touch panel grid dimension can have touch pixels arranged on 5.0 mm centers, a more spread-out grid having about 6.0 mm centers, for example, can be desirable to reduce the overall number of electrical connections in the touch screen. However, spreading out the sensor pattern can cause erroneous touch readings.

Figure 8A:
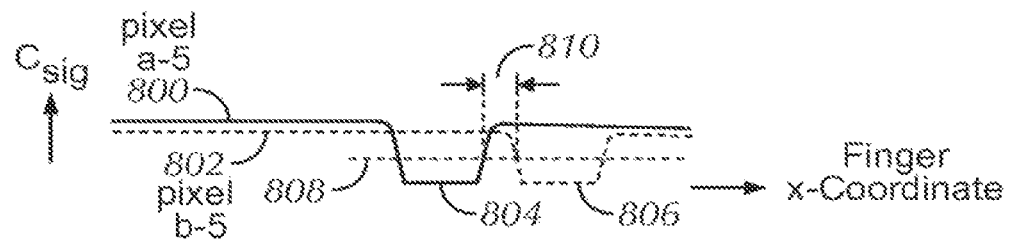
FIG. 8A is an example plot of an x-coordinate of a finger touch versus mutual capacitance seen at a touch pixel for a two adjacent touch pixels in a single row having wide spacings according to embodiments of the invention.

FIG. 8A is an example plot of an x-coordinate of a finger touch versus mutual capacitance seen at a touch pixel for a two adjacent touch pixels a-5 and b-5 in a single row having wide spacings. In FIG. 8A, plot 800 represents the mutual capacitance seen at touch pixel a-5 as the finger touch moves continuously from left to right, and plot 802 represents the mutual capacitance seen at touch pixel b-5 as the finger touch moves continuously from left to right. As expected, a drop in the mutual capacitance 804 is seen at touch pixel a-5 when the finger touch passes directly over touch pixel a-5, and a similar drop in the mutual capacitance 806 is seen at touch pixel b-5 when the finger touch passes directly over touch pixel b-5. If line 808 represents a threshold for detecting a touch event, FIG. 8A illustrates that even though the finger is never lifted from the surface of the touch screen, it can erroneously appear at 810 that the finger has momentarily lifted off the surface. This location 810 can represent a point about halfway between the two spread-out touch pixels.

Figure 8B:
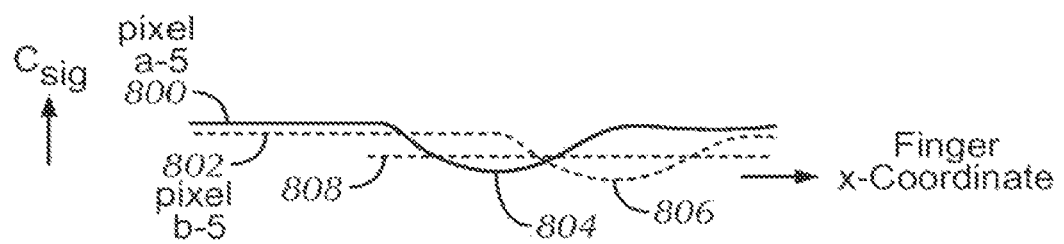
FIG. 8B is an example plot of an x-coordinate of a finger touch versus mutual capacitance seen at a touch pixel for a two adjacent touch pixels in a single row having wide spacings where spatial interpolation has been provided according to embodiments of the invention.

FIG. 8B is an example plot of an x-coordinate of a finger touch versus mutual capacitance seen at a touch pixel for a two adjacent touch pixels a-5 and b-5 in a single row having wide spacings where spatial interpolation has been provided according to embodiments of the invention. As expected, a drop in the mutual capacitance 804 is seen at touch pixel a-5 when the finger touch passes directly over touch pixel a-5, and a similar drop in the mutual capacitance 806 is seen at touch pixel b-5 when the finger touch passes directly over touch pixel b-5. Note, however, that the rise and fall in the mutual capacitance value occurs more gradually than in FIG. 8A. If line 808 represents a threshold for detecting a touch event, FIG. 8B illustrates that as the finger moves from left to right over touch pixel a-5 and b-5, a touch event is always detected at either touch pixel a-5 or b-5. In other words, this "blurring" of touch events is helpful to prevent the appearance of false no-touch readings.

In one embodiment of the invention, the thickness of the coverglass for the touch screen can be increased to create part or all of the spatial blurring or filtering shown in FIG. 8B.

Figure 8C:
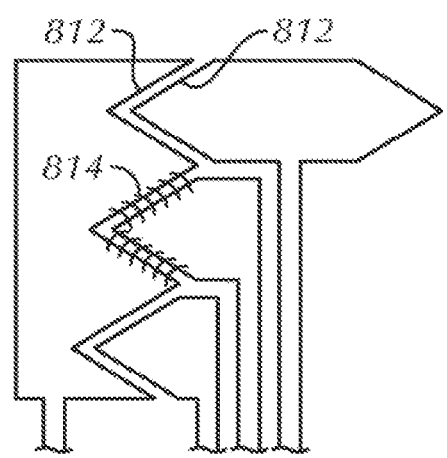
FIG. 8C illustrates a top view of an example column and adjacent row patch pattern useful for larger touch pixel spacings according to embodiments of the invention.

FIG. 8C illustrates a top view of an example column and adjacent row patch pattern useful for larger touch pixel spacings according to embodiments of the invention. FIG. 8C illustrates an example embodiment in which sawtooth region edges 812 are employed within a touch pixel elongated in the x-direction. The sawtooth region edges can allow fringing electric field lines 814 to be present over a larger area in the x-direction so that a touch event can be detected by the same touch pixel over a larger distance in the x-direction. It should be understood that the sawtooth configuration of FIG. 8C is only an example, and that other configurations such serpentine edges and the like can also be used. These configurations can further soften the touch patterns and create additional spatial filtering and interpolation between adjacent touch pixels as shown in FIG. 8B.

Figure 9B:
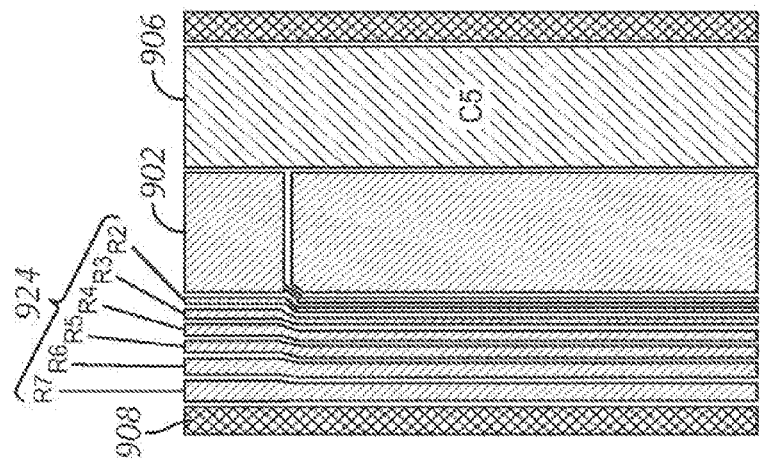
FIG. 9B illustrates a close-up view of a portion of the example touch screen of FIG. 9A.
Figure 9A:
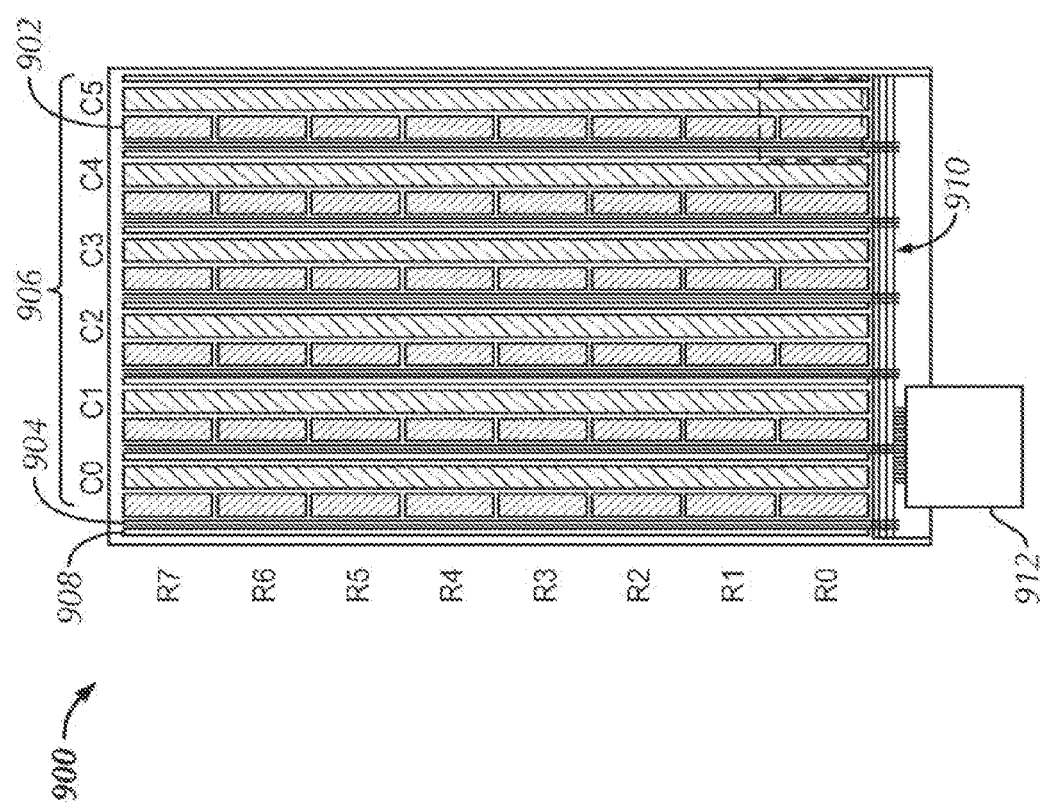
FIG. 9A illustrates an example touch screen including sense (or drive) regions formed as columns and rows of polygonal regions (bricks) according to embodiments of the invention.

FIG. 9A illustrates example touch screen 900 including sense (or drive) regions (C0-C5) formed as columns 906 and rows of polygonal regions (bricks) 902, where each row of bricks forms a separate drive (or sense) region (R0-R7) according to embodiments of the invention. In the example of FIG. 9A, connecting yVcom lines 904 are routed along only one side of the bricks (a so-called "single escape" configuration). Although a touch screen 900 having six columns and eight rows is shown, it should be understood that any number of columns and rows can be employed.

To couple bricks 902 in a particular row together, connecting yVcom lines 904, can be routed from the bricks along one side of the bricks in a single escape configuration to a particular bus line 910. Ground isolation regions 908, can be formed between connecting yVcom lines 904 and adjacent columns 906 to reduce the capacitive coupling between the connecting yVcom lines and the columns. Connections for each bus line 910 and for columns 906 can be brought off touch screen 900 through flex circuit 912.

FIG. 9B illustrates a close-up view of a portion of the example touch screen 900 of FIG. 9A, showing how bricks 902 can be routed to bus lines 910 using connecting yVcom lines 904 in a single escape configuration according to embodiments of the invention. In FIG. 9B, the longer connections, more yVcom lines 904 (e.g. trace R7) can be used than the shorter connecting yVcom lines (e.g. trace R2) to equalize the overall resistivity of the traces and to minimize the overall capacitive loads seen by the drive circuitry.

Figure 9C:
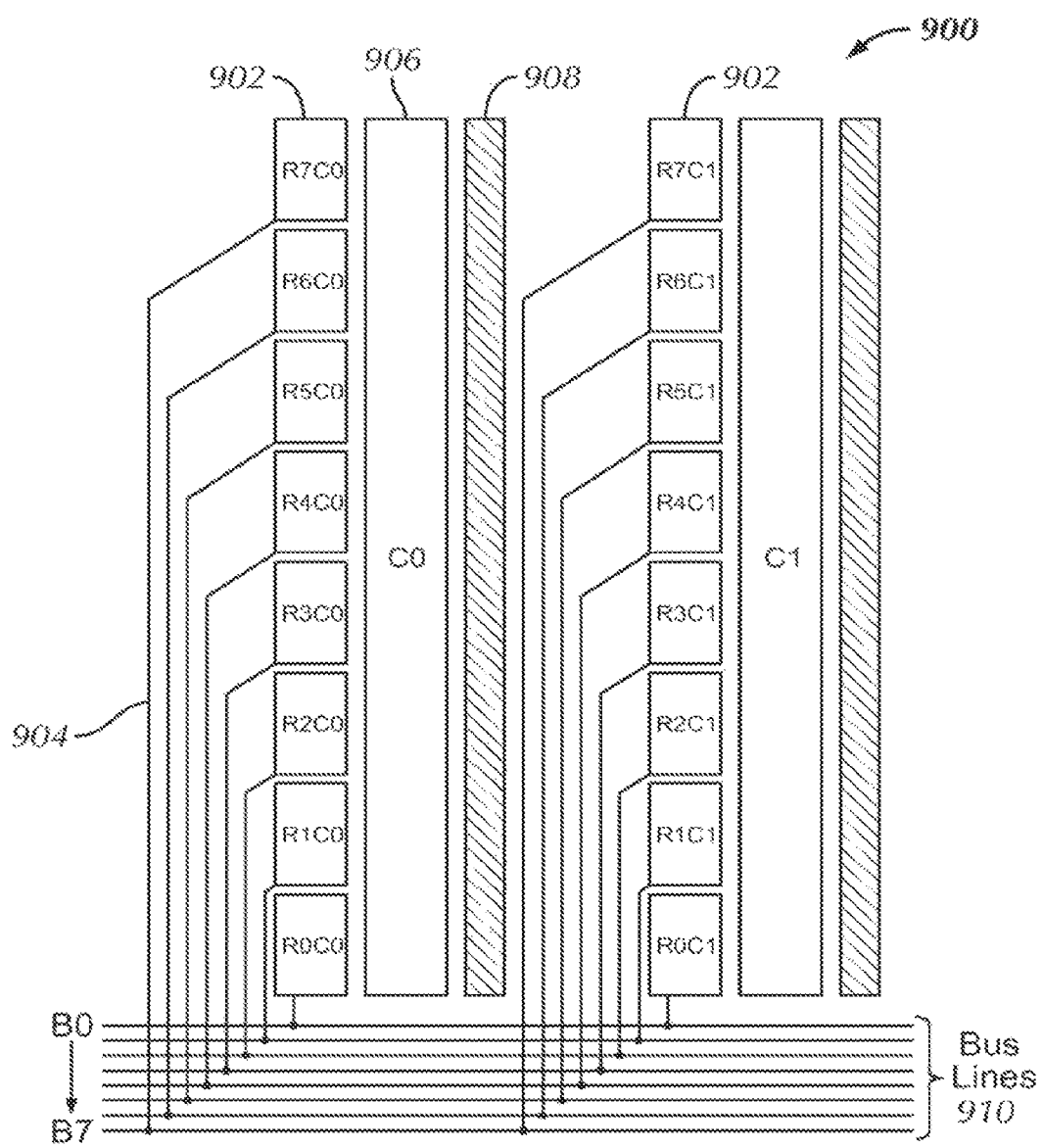
FIG. 9C illustrates a portion of example touch screen of FIG. 9A including bricks associated with columns C0 and C1 and connecting yVcom lines coupling the bricks to bus lines according to embodiments of the invention.

FIG. 9C illustrates a portion of example touch screen 900 of FIG. 9A including bricks 902 associated with columns C0 and C1 and connecting yVcom lines 904 (illustrated symbolically as thin lines) coupling the bricks to bus lines 910 according to embodiments of the invention. In the example of FIG. 9B, which is drawn in a symbolic manner and not to scale for purposes of illustration only, bus line B0 is coupled to brick R0C0 (the closest brick to B0 adjacent to column C0) and R0C1 (the closest brick to B0 adjacent to column C1). Bus line B1 is coupled to brick R1C0 (the next closest brick to B0 adjacent to column C0) and R who 1 (the next closest brick to B0 adjacent to column C1). The pattern repeats for the other bus lines such that bus line B7 is coupled to brick R7C0 (the farthest brick from B0 adjacent to column C0) and R7C1 (the farthest brick from B0 adjacent to column C1).

Figure 10:
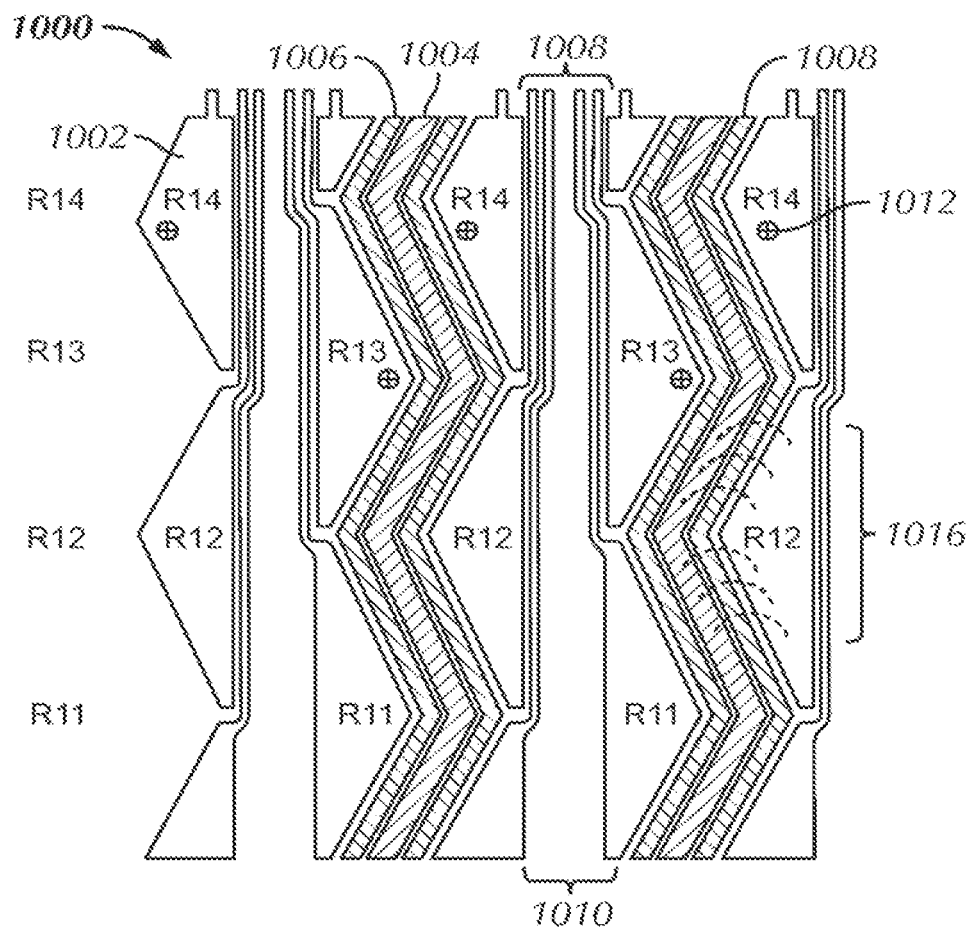
FIG. 10 illustrates a portion of example zig-zag double interpolated touch screen that can further reduce the stray capacitance between the connecting yVcom lines and the sense regions according to embodiments of the invention.

FIG. 10 illustrates a portion of example zig-zag double interpolated touch screen 1000 that can further reduce the stray capacitance between the connecting yVcom lines and the sense regions according to embodiments of the invention. In the example of FIG. 10, polygonal regions 1002 representing the drive (or sense) regions are generally pentagonal in shape and staggered in orientation, with some of the polygonal areas near the end of the panel being cut-off pentagons. Sense (or drive) regions 1004 are zig-zag shaped, with ground guards 1006 between the sense (or drive) regions and pentagons 1002. All connecting yVcom lines 1008 are routed in channels 1010 between pentagons 1002. In mutual capacitance embodiments, each touch pixel or sensor is characterized by electric field lines 1016 formed between a pentagon and an adjacent sense (or drive) region 1004. Because connecting yVcom lines 1008 do not run alongside any sense (or drive) regions 1004, but instead run between pentagons 1002, the stray capacitance between connecting yVcom lines 1008 and sense (or drive) regions 1004 is minimized, and spatial cross-coupling is also minimized. Previously, the distance between connecting yVcom lines 1008 and sense (or drive) regions 1004 was only the width of ground guard 1006, but in the embodiment of FIG. 10, the distance is the width of the ground guard plus the width of pentagon 1002 (which varies along the length of its shape).

As the example of FIG. 10 indicates, the pentagons for row R14 at an end of the touch screen can be truncated. Accordingly, the calculated centroids of touch 1012 for R14 can be offset in the y-direction from their true position. In addition, the calculated centroids of touch for any two adjacent rows will be staggered (offset from each other) in the x-direction by an offset distance. However, this misalignment can be de-warped in a software algorithm to re-map the touch pixels and remove the distortion.

Although the foregoing embodiments of the invention have been primarily described herein in terms of mutual capacitance touch screens, it should be understood that embodiments of the invention are also applicable to self-capacitance touch screens. In such an embodiment, a reference ground plane can be formed either on the back side of the substrate, or on the same side of the substrate as the polygonal regions and sense regions but separated from the polygonal regions and sense regions by a dielectric, or on a separate substrate. In a self-capacitance touch screen, each touch pixel or sensor has a self-capacitance to the reference ground that can be changed due to the presence of a finger. A touch screen can use both mutual and self-capacitance measurements in a time-multiplexing fashion to gather additional information and each measurement type can compensate the weaknesses of the other.

Example displays including pixels with dual-function capacitive elements, and the processes of manufacturing the displays, according to embodiments of the invention will now be described with reference to FIGS. 11-46. FIGS. 11-24 are directed to an example electrically controlled birefringence (ECB) LCD display using amorphous silicon (a-Si). FIGS. 25-34 are directed to an example IPS LCD display using low temperature polycrystalline silicon (LTPS). FIGS. 35-43 are directed to another example IPS LCD display using LTPS. FIGS. 44-55 are directed to an example ECB LCD display using LTPS.

An example process of manufacturing an ECB LCD display according to embodiments of the invention will now be described with reference to FIGS. 11-18. The figures show various stages of processing of two pixels, a pixel 1101 and a pixel 1102, during the manufacture of the ECB LCD display. The resulting pixels 1101 and 1102 form electrical circuits equivalent to pixels 101 and 102, respectively, of FIG. 1.

Figure 11:
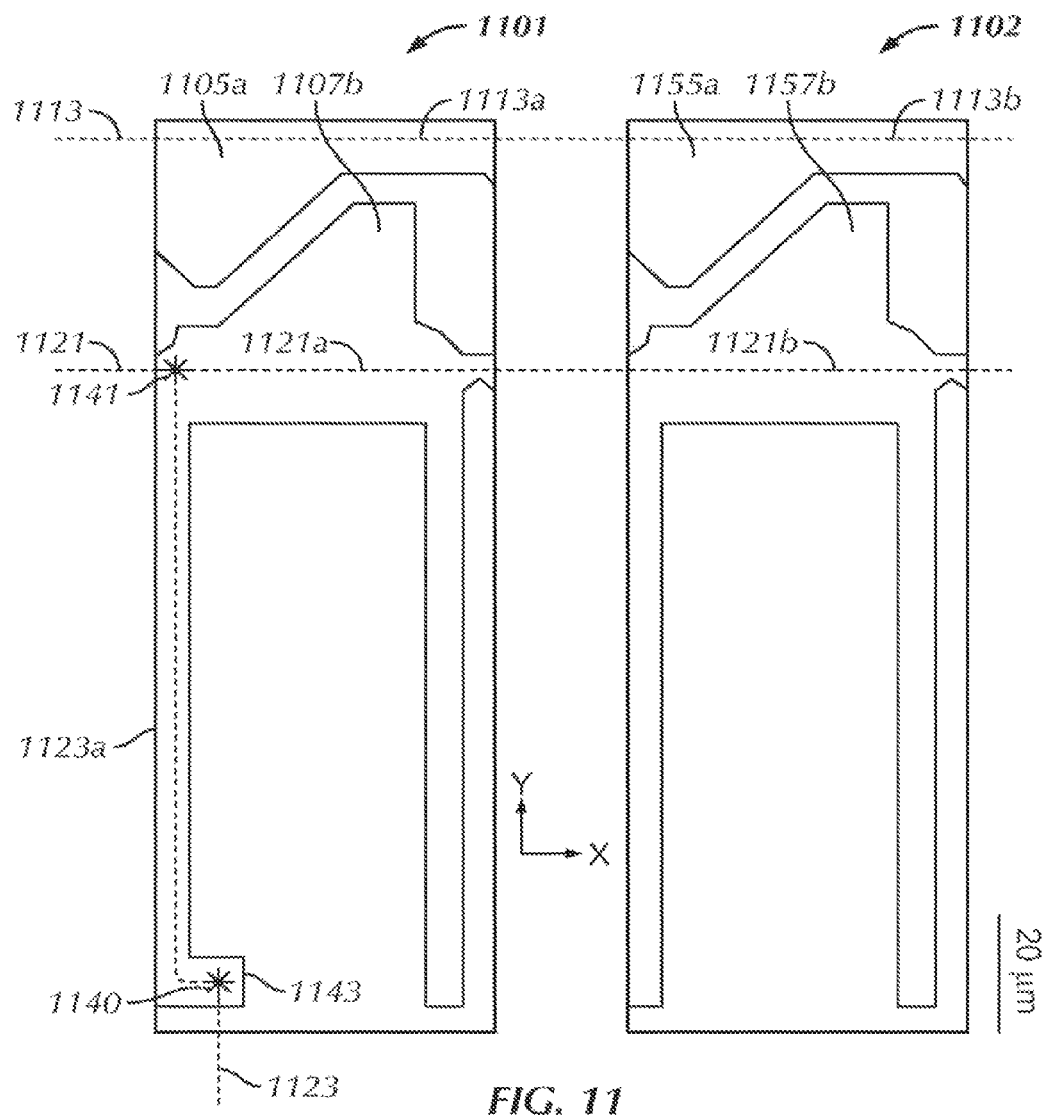
FIG. 11 illustrates a patterning of a first metal layer (M1) of pixels in an example electrically controlled birefringence (ECB) LCD display using amorphous silicon (a-Si) according to embodiments of the invention.

FIG. 11 shows the patterning of a first metal layer (M1) of pixels 1101 and 1102. As shown in FIG. 11, the M1 layer for pixel 1102 includes a gate 1155a, a portion 1113b of a gate line 1113, a lower electrode 1157b of a storage capacitor (not shown except for lower electrode 1157b), and a portion 1121b of an xVcom 1121. Pixel 1101 includes a gate 1105a, a lower electrode 1107b of a storage capacitor (not shown except for lower electrode 1107b), a portion 1113a of gate line 1113, and a portion 1121a of xVcom 1121. Pixel 1101 also includes a portion 1123a of a yVcom 1123 (shown as dotted lines), which includes an additional portion 1140. Portion 1123a has a connection point 1141 and a connection point 1143. As shown in FIG. 11, a gate line 1113 and an xVcom 1121 run through both pixels 1101 and 1102 in an x-direction. Gate line 1113 connects to gates 1105a and 1155a, and xVcom 1121 connects lower electrode 1107b and 1157b. Portion 1123a of yVcom 1123 connects to xVcom 1121 in pixel 1101.

Figure 12:
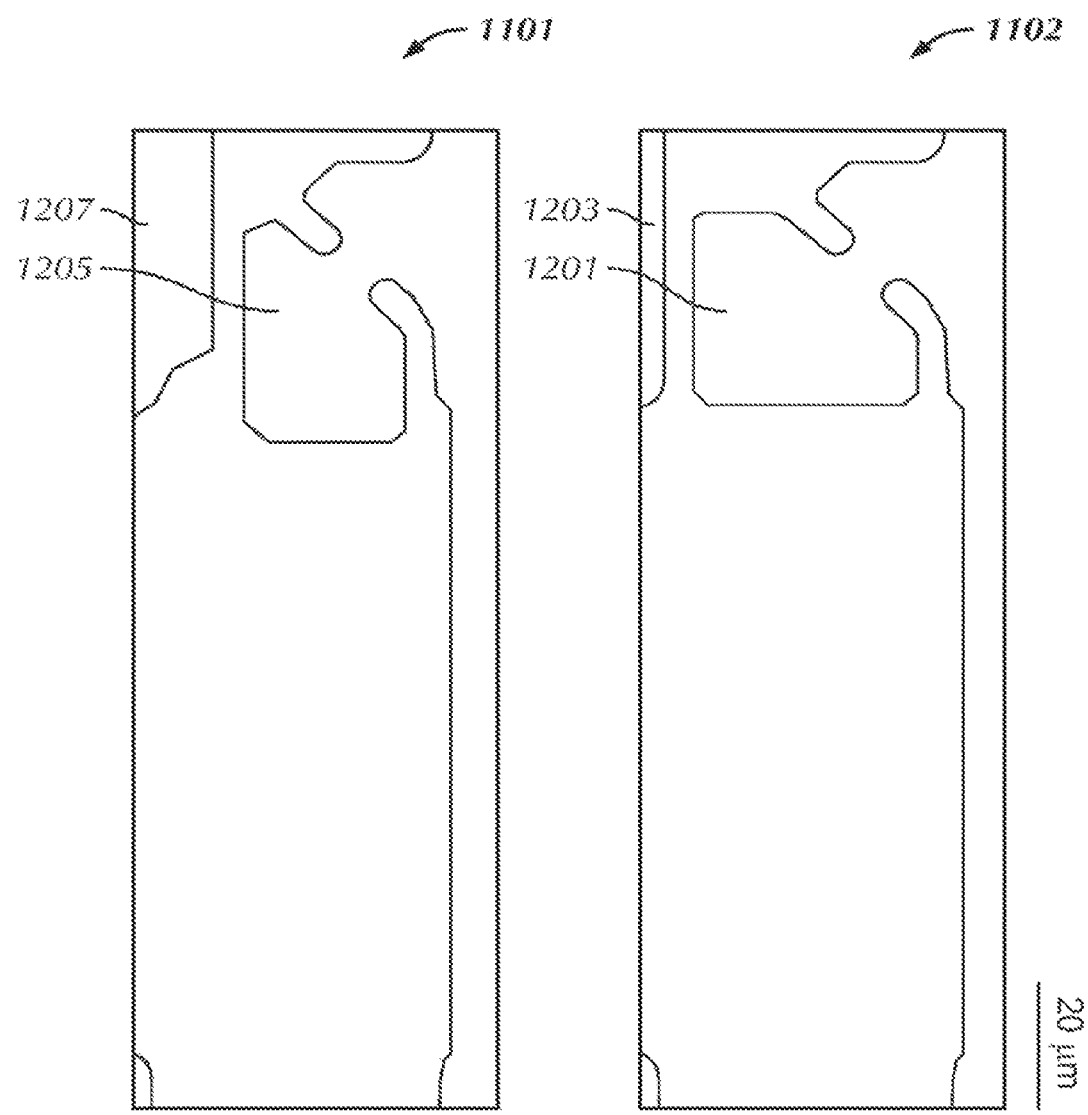
FIG. 12 illustrates a patterning step in which island patterns of poly-Si are formed in the example ECB LCD display using a-Si according to embodiments of the invention.

FIG. 12 shows a subsequent patterning step in the process of manufacturing pixels 1101 and 1102, in which island patterns of poly-Si are formed. As can be seen FIG. 12, the island patterns for the pixels are similar, except that semiconductor portion 1201 and 1203 of pixel 1102 are slightly different that semiconductor portions 1205 and 1207 of pixel 1101. For example, portion 1205 is slightly smaller than portion 1201. This is due, in part, to allow xVcom 1121 to be connected in the vertical direction (y-direction) with other xVcom lines through yVcom 1123, as is described in greater detail below.

Figure 13:
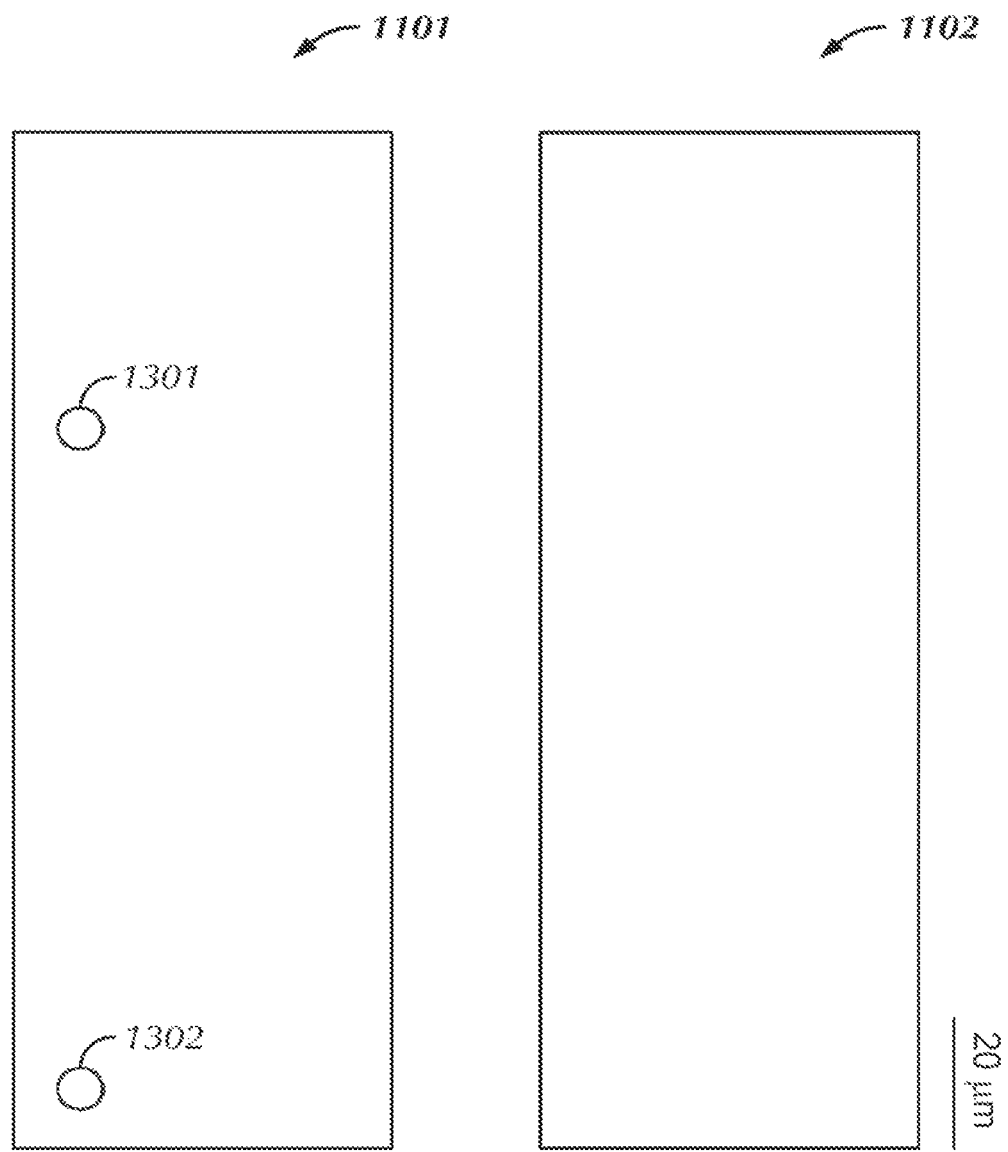
FIG. 13 illustrates connections formed in a pixel in the example ECB LCD display using a-Si according to embodiments of the invention.

FIG. 13 shows connections 1301 and 1302 formed in pixel 1101. Pixel 1102 does not include such connections. The operation of connections 1301 and 1302 is described in more detail below with reference to FIG. 14.

Figure 14:
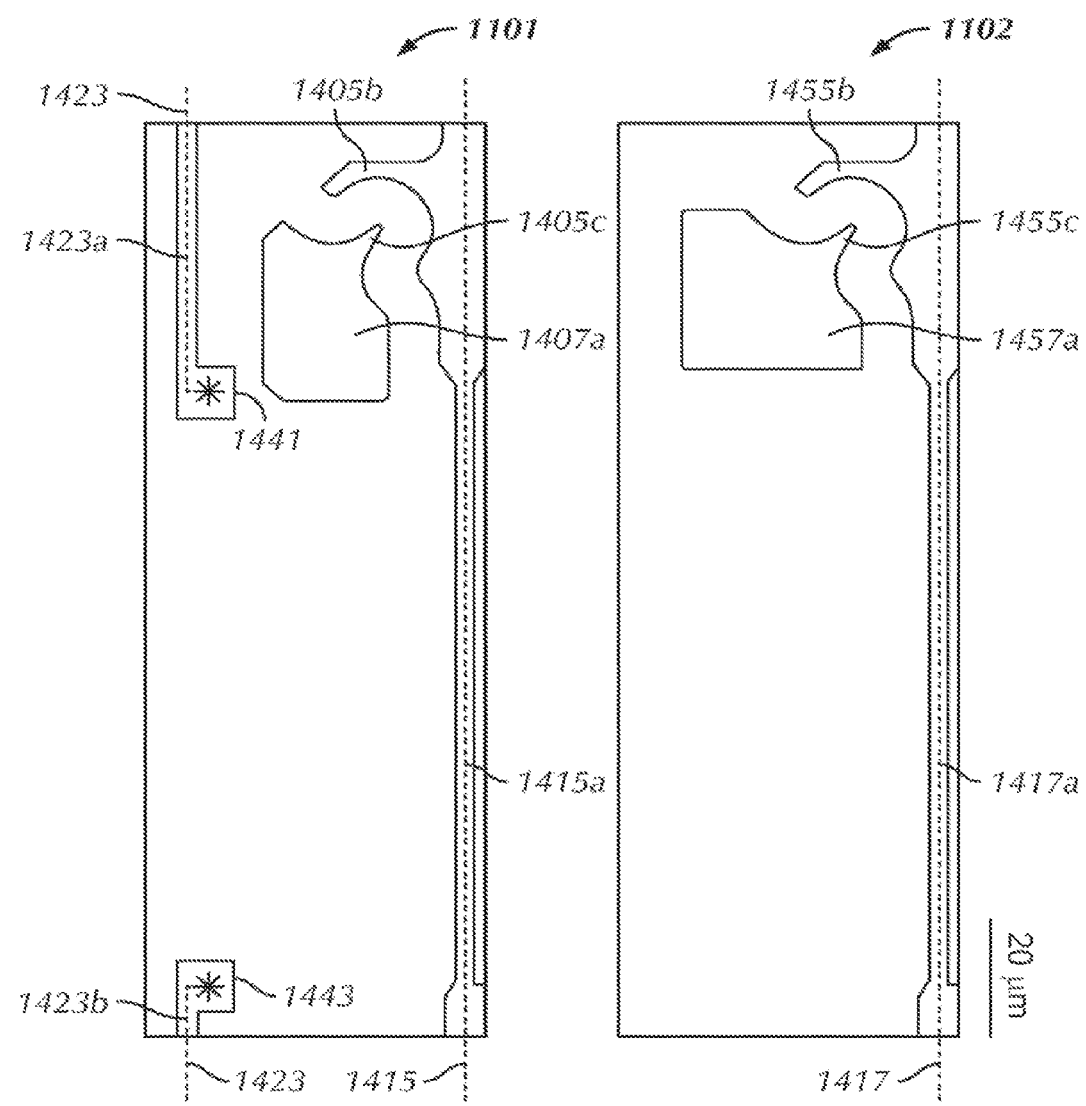
FIG. 14 illustrates patterning of a second metal layer (M2) of pixels in the example ECB LCD display using a-Si according to embodiments of the invention.

FIG. 14 shows patterning of a second metal layer (M2) of pixels 1101 and 1102. As shown in FIG. 14, the M2 layer of pixel 1102 forms a portion 1417a of a green color data line, Gdata 1417 (shown as a dotted line in FIG. 14), a source 1455b, a drain 1455c, and an upper electrode 1457a. Similar to pixel 1102, the M2 layer of pixel 1101 forms a portion 1415a of a red color data line, Rdata 1415 (shown as a dotted line in FIG. 14), a source 1405b, a drain 1405c, and upper electrode 1407a. The M2 layer of pixel 1101 also forms portions 1423a and 1423b of yVcom 1123 (shown a dotted line in FIG. 14). Upper electrode 1407a is smaller than upper electrode 1457a, which allows portion 1423a to be formed in the M2 layer of the pixel 1101. Portion 1423a has a connection point 1441, and portion 1423b has a connection point 1443.

FIGS. 11, 13 and 14 together illustrate that pixel 1101 includes a vertical common line (yVcom 1415) that allows connection of xVcom 1121 with other xVcom lines in the vertical direction (y-direction). In particular, the figures show portion 1423a is connected to portion 1123a through connection 1301 at connection points 1441 and 1141, respectively. Portion 1123a is connected to 1423b through connection 1302 at points 1143 and 1443, respectively. Thus, the figures show a continuous portion of yVcom 1123 is formed in pixel 1101 by the connection of multiple structures of the pixel. As shown FIG. 11, yVcom portion 1123a is connected to xVcom portion 1121a. Consequently, the structure of pixel 1101 shown in the figures allows connection in the vertical direction of multiple xVcom lines.

Figure 15:
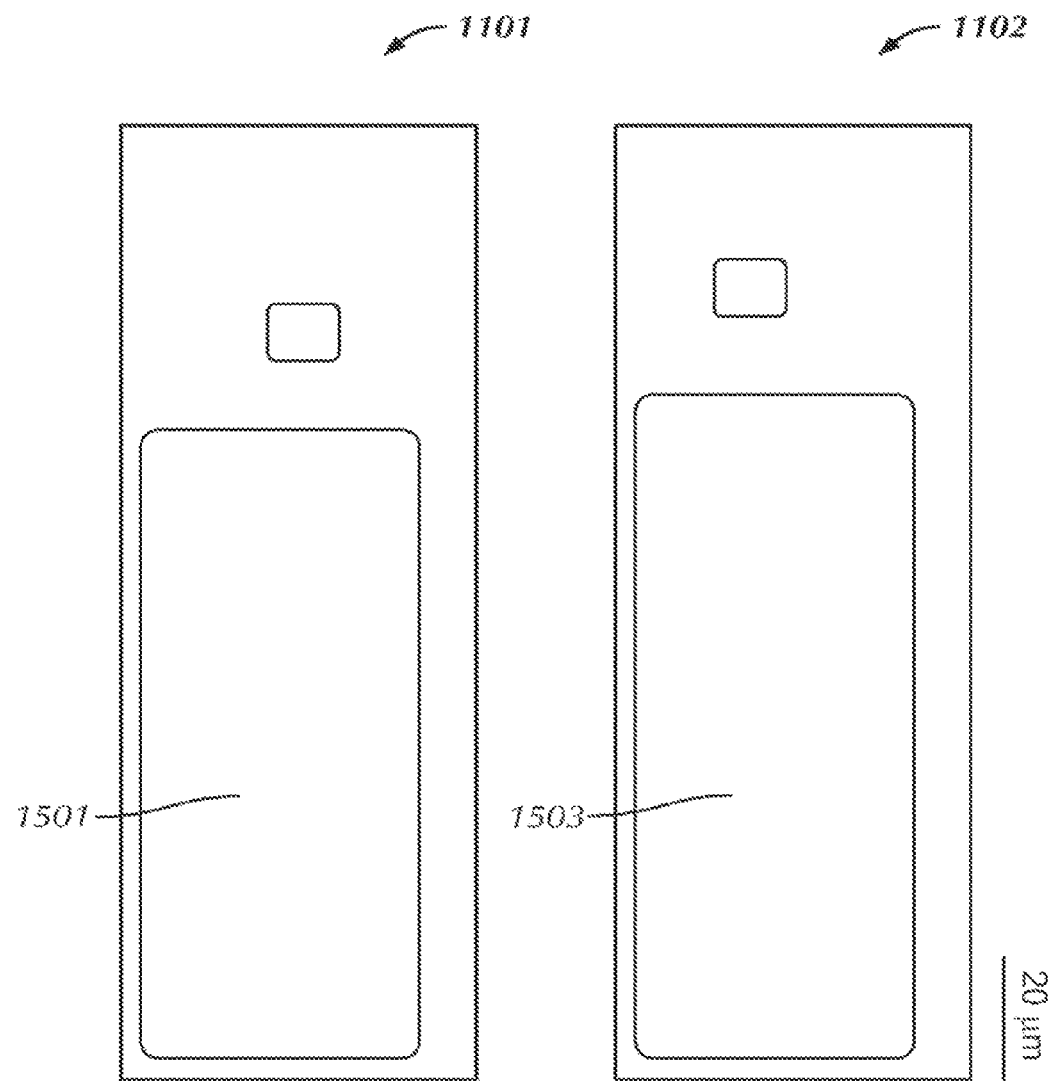
FIG. 15 illustrates planarization (PLN) contact layers in the example ECB LCD display using a-Si according to embodiments of the invention.
Figure 16:
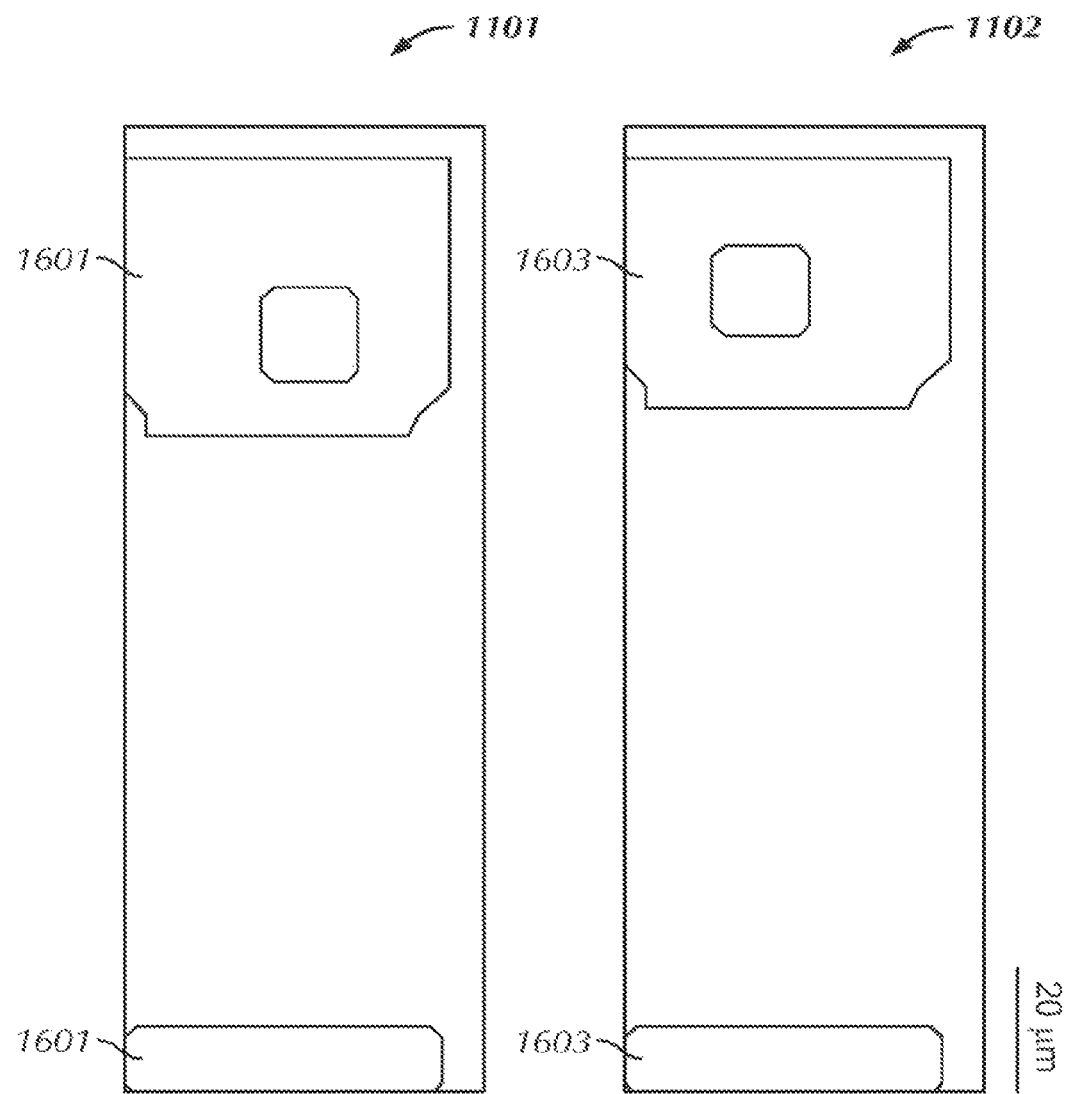
FIG. 16 illustrates reflector (REF) layers in the example ECB LCD display using a-Si according to embodiments of the invention.
Figure 17:
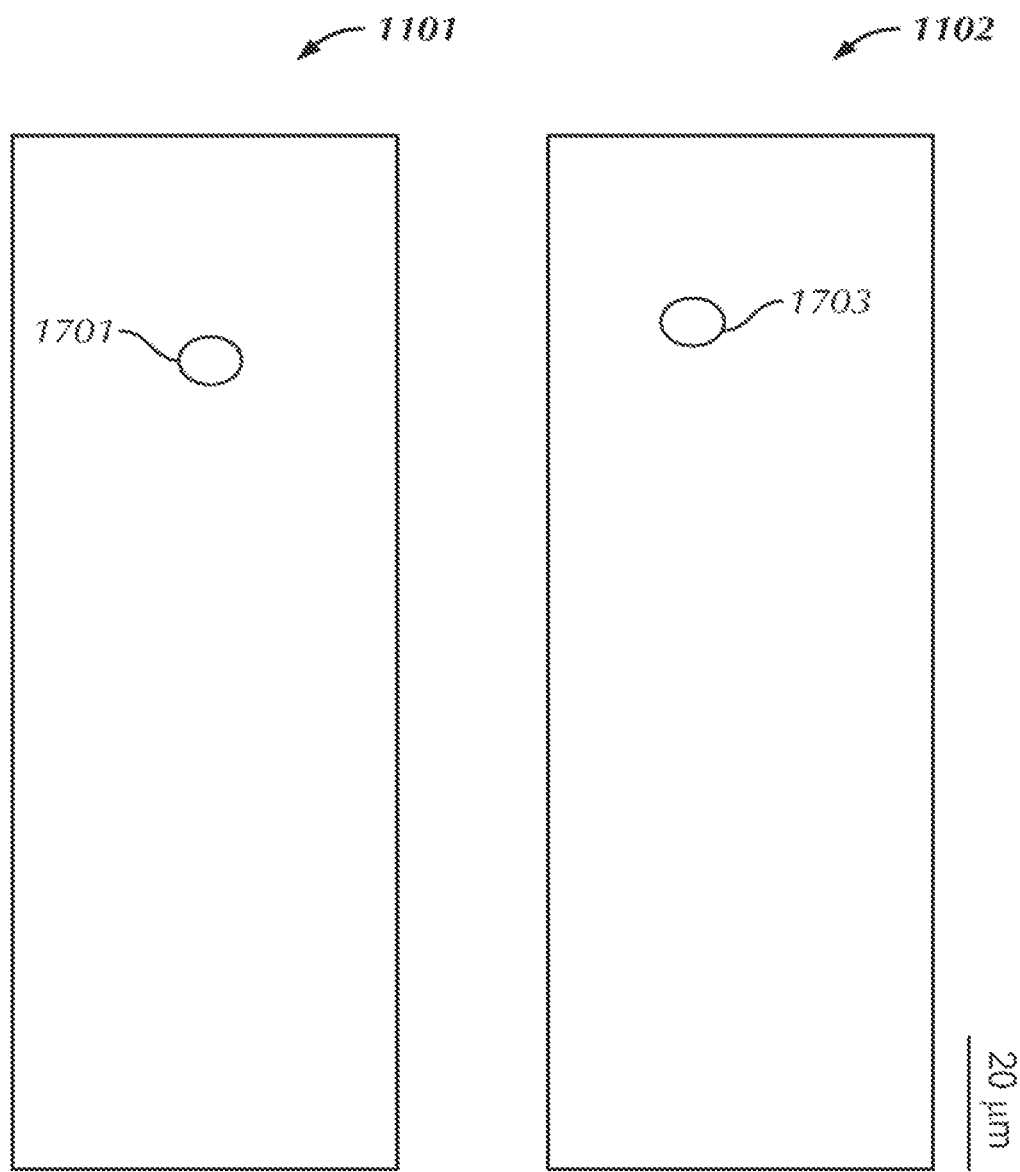
FIG. 17 illustrates passivation (PASS) contacts in the example ECB LCD display using a-Si according to embodiments of the invention.
Figure 18:
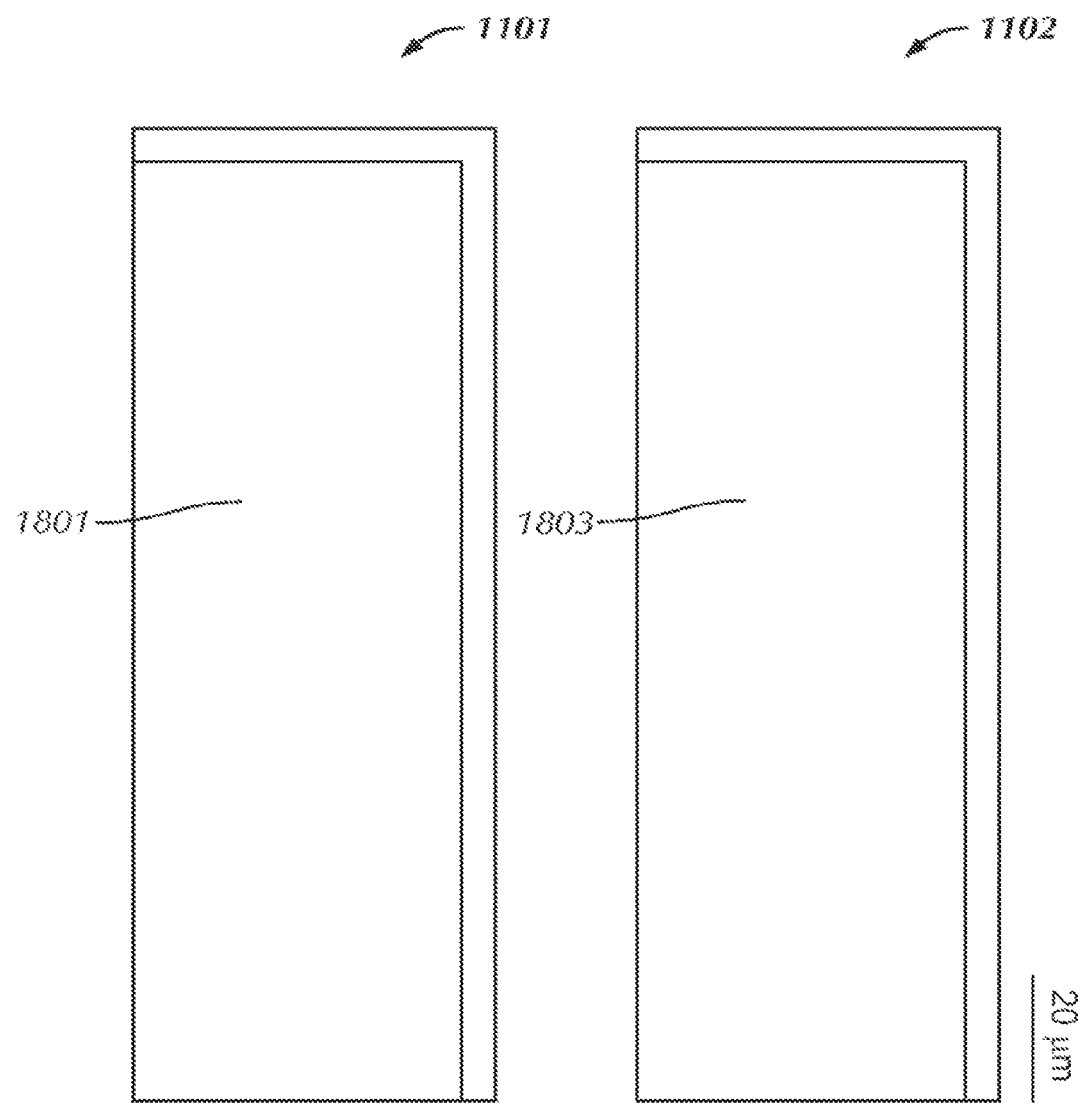
FIG. 18 illustrates semi-transparent conductive material, such as IPO, layers that form pixel electrodes in the example ECB LCD display using a-Si according to embodiments of the invention.

FIG. 15 shows planarization (PLN) contact layers 1501 and 1503 of pixels 1101 and 1102, respectively. FIG. 16 shows reflector (REF) layers 1601 and 1603 of pixels 1101 and 1102, respectively. FIG. 17 shows passivation (PASS) contacts 1701 and 1703 of pixels 1101 and 1102, respectively. FIG. 18 shows semi-transparent conductive material, such as IPO, layers that form pixel electrodes 1801 and 1803 of pixels 1101 and 1102, respectively.

Figure 19:
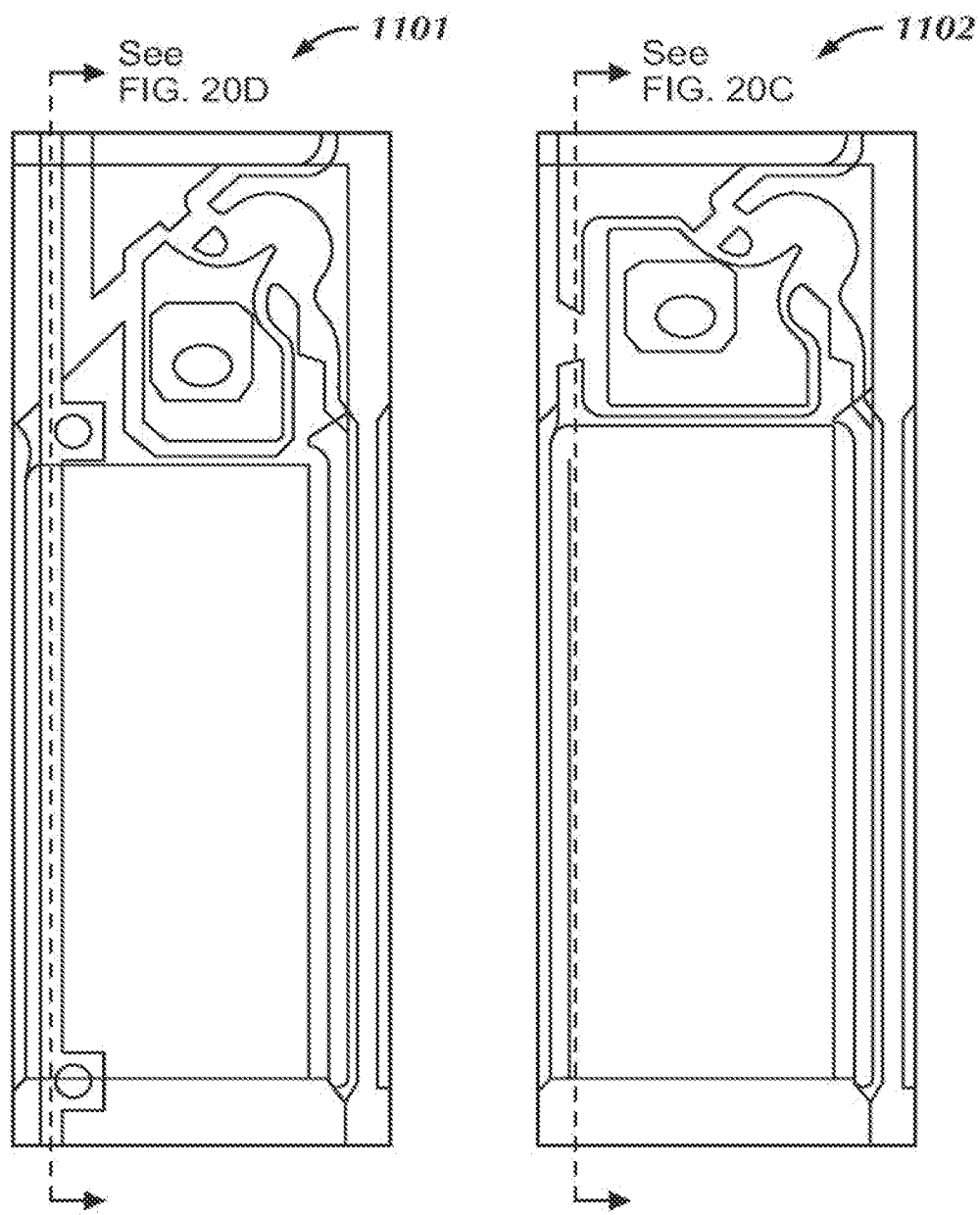
FIG. 19 illustrates a plan view of completed pixels in the example ECB LCD display using a-Si according to embodiments of the invention.
Figure 20A:
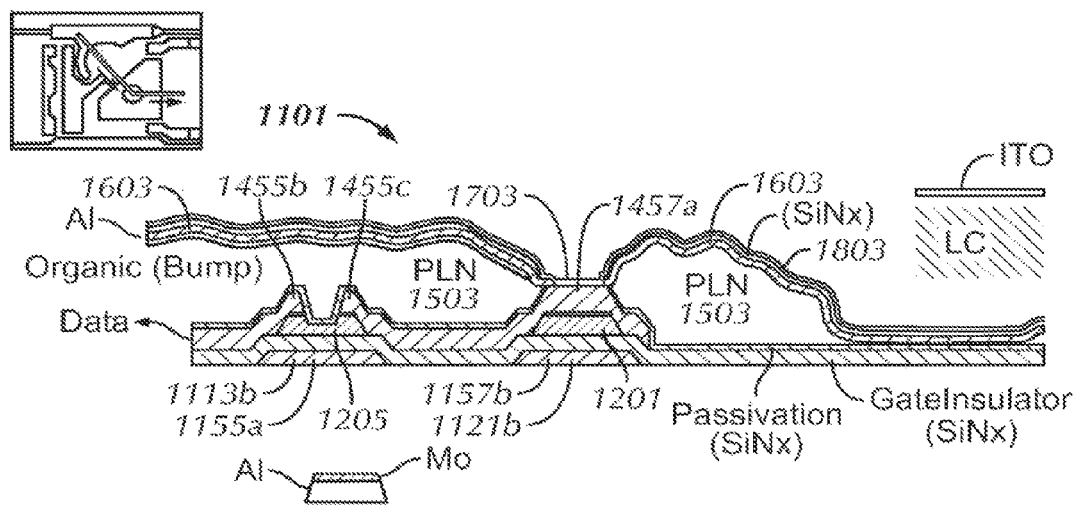
Figure 20B:
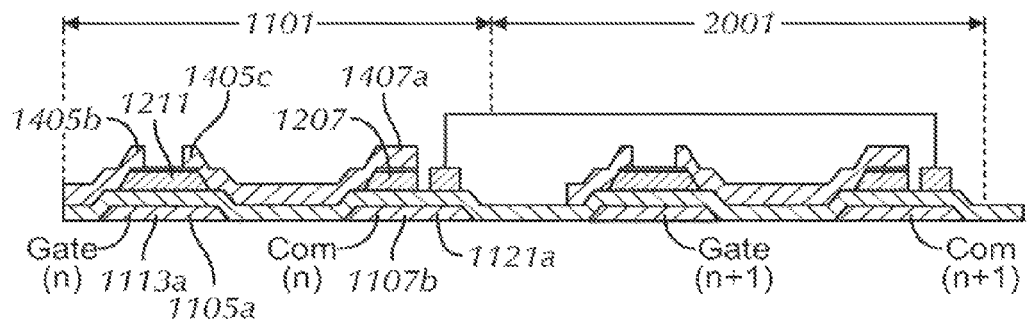

FIG. 19 shows a plan view of completed pixels 1101 and 1102. FIGS. 20A-B illustrate side views of completed pixel 1101 take along the paths shown in the top views shown in the figures. FIGS. 20C-D illustrate side views of pixels 1102 and 1101 along the lines shown in FIG. 19.

FIG. 20A shows a side view of pixel 1101. The portion of the M1 layer shown in FIG. 20A includes gate line portion 1113b, gate 1155a, lower electrode 1157b, and xVcom portion 1121b. The poly-Si layer shown in FIG. 20A includes poly-Si 1205 and poly-Si 1201. The M2 layer shown in FIG. 20A includes source 1455b, drain 1465c, and upper electrode 1457a. FIG. 20A also shows planarization layer 1503, reflector layer 1603, passivation contact 1703, and transparent conductor layer 1103.

FIG. 20B shows another side view of pixel 1101. For the sake of clarity, the planarization contact, reflector, passivation contact, and transparent conductor layers are not shown in the figure. The M1 layer shown in FIG. 20B includes gate line portion 1113a, gate 1105a, lower electrode 1107b, and xVcom portion 1121a. FIG. 20B also shows an adjacent pixel 2001, which has the same structure as pixel 1101. The poly-Si layer shown in FIG. 20B includes poly-Si portion 1211 and poly-Si portion 1207. The M2 layer shown in FIG. 20B includes source 1405b, drain 1405c, and upper electrode 1407a.

FIG. 20C shows a side view of pixel 1102 along the line shown in FIG. 19. The M1 layer shown in FIG. 20C includes gate line portion 1113b, gate 1155a, and xVcom portion 1121b. FIG. 20C also shows a gate insulator 2003 deposited on top of M1. Poly-Si portion 1203 and an additional poly-Si portion are also shown in FIG. 20C.

FIG. 20D shows a side view of pixel 1101 along the line shown in FIG. 19. The M1 layer shown in FIG. 20D includes gate line portion 1113a, gate 1105a, and yVcom portion 1123a, which includes an intersection with xVcom portion 1121a. Connections 1301 and 1302 contact connection points 1141 and 1143, respectively, of yVcom portion 1123a. FIG. 20D also shows a gate insulator layer 2005 and poly-Si portion 1209. The M2 layer shown in FIG. 20D includes yVcom portion 1423a, which connects with connection 1301 at connection point 1441, and yVcom portion 1423b, which connects with connection 1302 at connection point 1443. The vertical common line, yVcom 1123 (shown in FIG. 20D as dashed lines) runs through pixel 1181 as yVcom portion 1423a, connection 1301, yVcom portion 1123a, connection 1302, and yVcom portion 1423b. FIG. 20D also shows a portion of an adjacent pixel that includes structure identical to pixel 1101. In particular, the adjacent pixel includes a yVcom portion that is connected, via a connection, to an xVcom portion. Thus, FIG. 20D illustrates that a xVcom portion 1121a can be connected to an adjacent pixels xVcom portion with a yVcom line.

Figure 21:
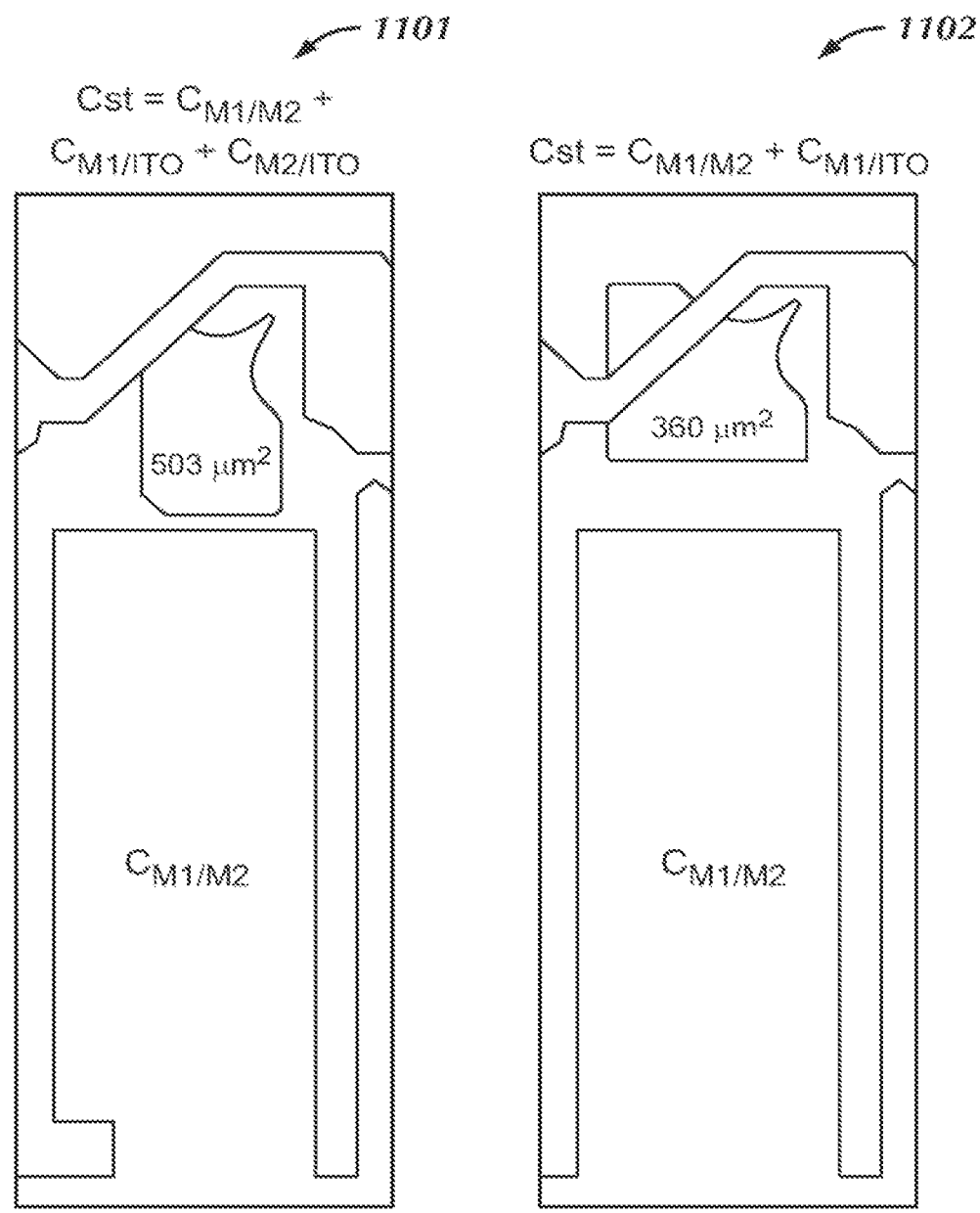
FIGS. 21 and 22 illustrate a comparative analysis of the storage capacitances of pixels in the example ECB LCD display using a-Si according to embodiments of the invention.
Figure 22:
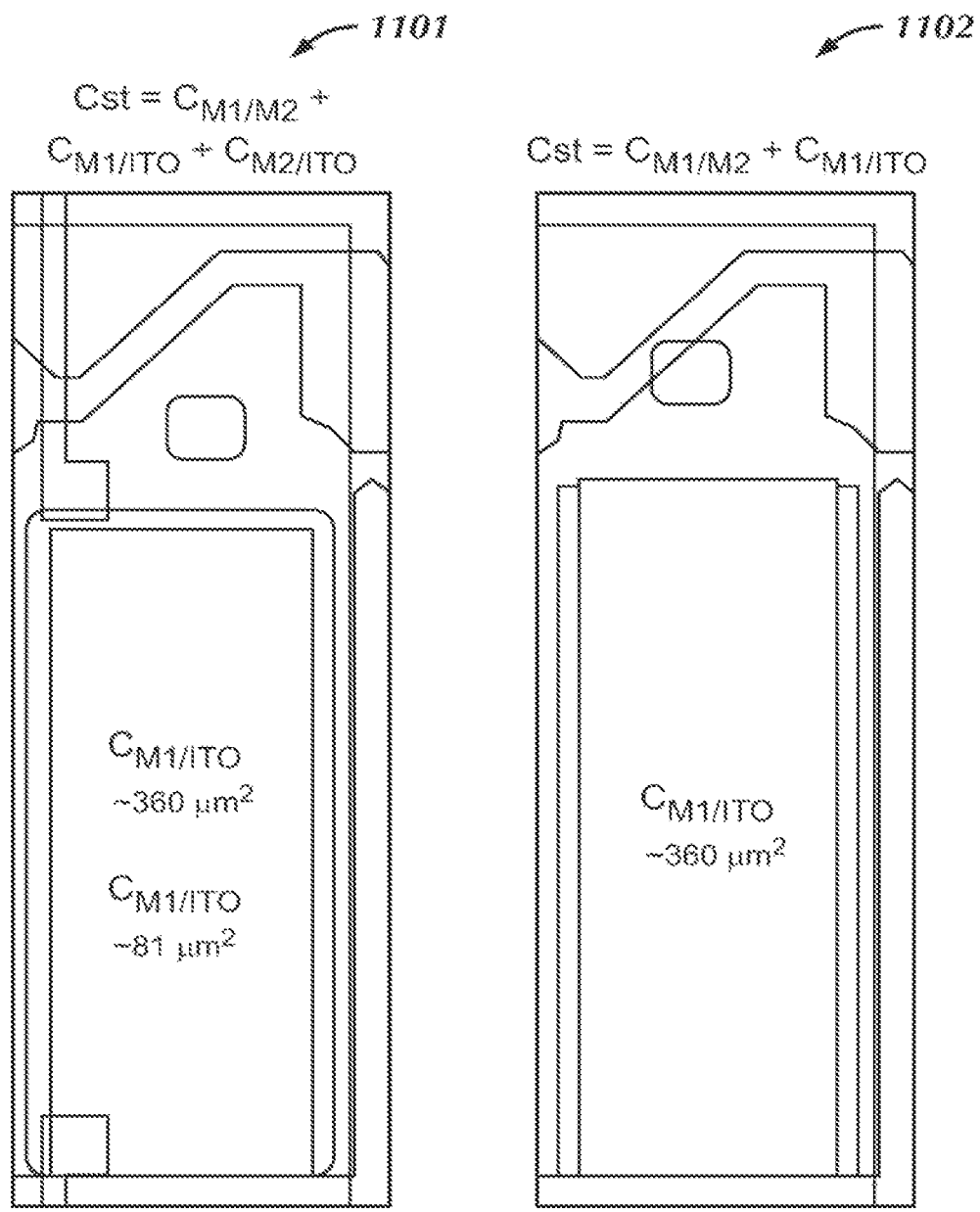

FIGS. 21 and 22 show a comparative analysis of the storage capacitance of pixels 1101 and 1102. The total storage capacitance (Cstore) of pixel 1102 is:

$$C\text{store} = C_{M1/M2} + C_{M1/ITO} \quad (1)$$

where: $C_{M1/M2}$ is the capacitance of the overlapping M1 and M2 layers, such as upper electrode 1457a and lower electrode 1157b of pixel 1102, and $C_{M1/ITO}$ is the capacitance between overlapping areas of the first metal layer and the transparent conductor layer.

For example, FIG. 21 shows the overlapping areas of the first and second metal layers that result in the capacitance $C_{M1/M2}$. As shown in FIG. 21, $C_{M1/M2}$ of pixel 1102 results from an overlap of approximately 360 square micrometers of the first and second metallic layers. Referring now to FIG. 22, the highlighted portions of pixel 1102 show the overlapping regions of the first metallic layer and the transparent conductor layer that result in $C_{M1/ITO}$. As shown in FIG. 22, the total overlap is approximately 360 square micrometers.

In contrast, the total capacitance of pixel 1101 is:

$$C\text{store} = C_{M1/M2} + C_{M1/ITO} + C_{M2/ITO} \quad (2)$$

where: $C_{M1/M2}$ and $C_{M1/ITO}$ are defined as above, and $C_{M2/ITO}$ is the capacitance resulting from the overlap of the second metallic layer and the transparent conductor layer.

The additional term in the storage capacitance equation for pixel 1101, $C_{M2/ITO}$, results from the additional areas of the second metallic layer in pixel 1101 that overlap with the transparent conductor layer. FIGS. 21 and 22 show the areas of overlapping metal in pixel 1101 that result in the terms of equation 2. FIG. 21 shows an overlapping region of the first and second metallic layers in pixel 1101 that equals approximately 503 square micrometers. FIG. 22 shows overlapping regions of the first metallic layer and the transparent conductor layer in pixel 1101 that equals approximately 360 square micrometers. FIG. 22 also shows an overlapping region of the second metallic layer and the transparent conductor layer that equals approximately 81 square micrometers. Thus, it is apparent from FIGS. 21 and 22 that, while the area of overlap of the first and second metallic layers of pixel 1101 is less than the corresponding area of pixel 1102, pixel 1101 has an extra area overlap that pixel 1102 does not. In particular, the overlap of the second metallic layer and the transparent conductor layer in pixel 1101 contributes an additional 81 square micrometers, which in turn contributes an additional amount of capacitance to the storage capacitance of pixel 1101.

Figure 23:
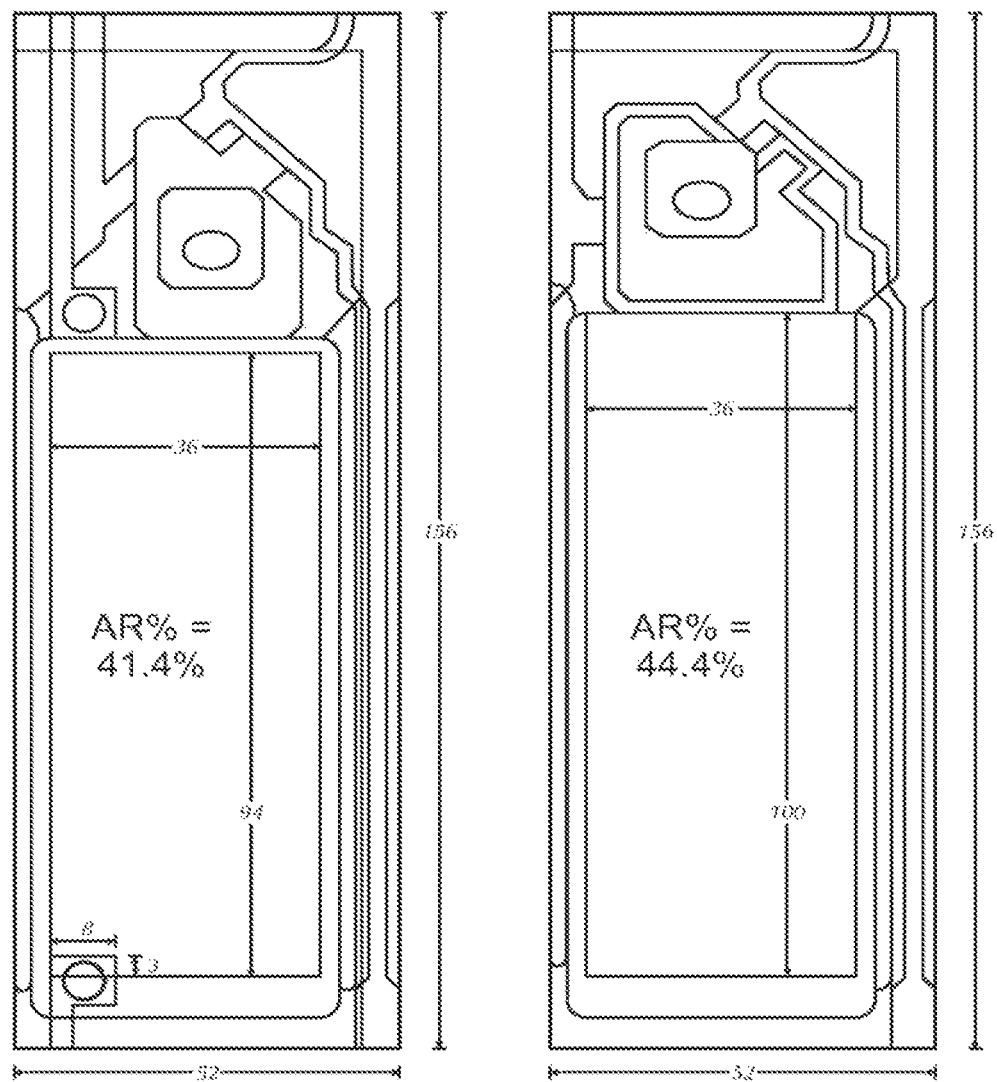
FIG. 23 illustrates aperture ratio estimations for pixels in the example ECB LCD display using a-Si according to embodiments of the invention.

FIG. 23 illustrates aperture ratio estimations for pixels 1101 and 1102. Pixel 1101 has an aperture ratio of 41.4%. Pixel 1102 has an aperture ratio of 44.4%.

Figure 24:
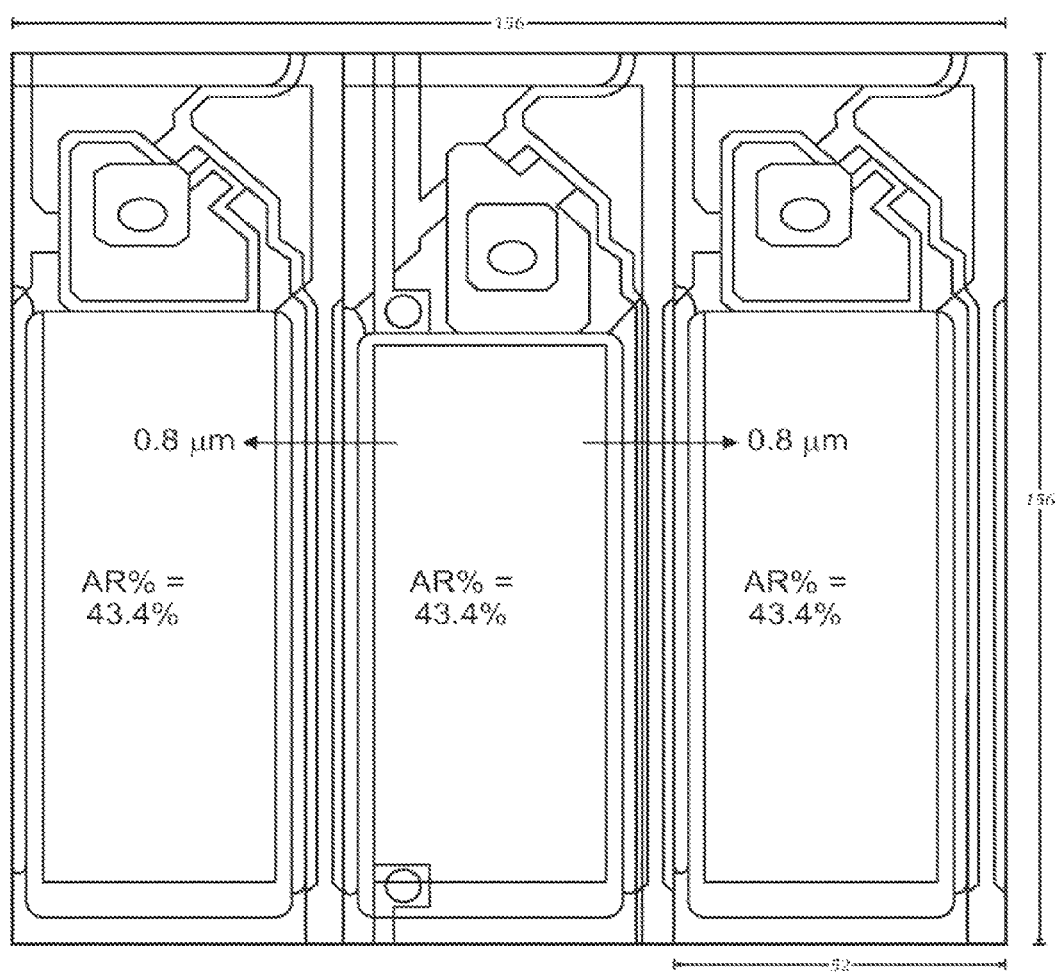
FIG. 24 illustrates an example modification in the example ECB LCD display using a-Si according to embodiments of the invention.

FIG. 24 illustrates an example modification according to embodiments of the invention. As a result of the modification, the aperture ratios of the different pixels in a system may be made more similar, which may improve the appearance of the display. Similar to pixel 1102, pixels 2401 and 2405 do not include connection portions in the y-direction. Pixel 2403, on the other hand, does include a connection portion in the y-direction, similar to pixel 1101.

FIGS. 25-34 are directed to an example IPS LCD display using low temperature polycrystalline silicon (LTPS). An example process of manufacturing an IPS LCD display using LTPS according to embodiments of the invention will now be described with reference to FIGS. 25-31. The figures show various stages of processing of two pixels, a pixel 2501 and a pixel 2502, during the manufacture of the IPS LCD display using LTPS. The resulting pixels 2501 and 2502 form electrical circuits equivalent to pixels 101 and 102, respectively, of FIG. 1. Because the stages of processing shown in FIGS. 25-30 are the same for pixel 2501 and pixel 2502, only one pixel is shown in each of these figures. However, it is understood that the stages of processing show in FIGS. 25-30 apply to both pixel 2501 and pixel 2502.

FIG. 25 shows the patterning of a layer of poly-Si of pixels 2501 and 2502. Semiconductor portions 2505, 2507, and 2509 form the active region of a TFT, and serve as source, gate, and drain, respectively.

FIG. 26 shows a subsequent patterning step in the process of manufacturing pixels 2501 and 2502, in which a first metal layer (M1) of pixels 2501 and 2502 is formed. As shown in FIG. 26, the M1 layer for the pixels 2501/2502 includes a gate 2605a, a portion 2613a of a gate line 2613 (shown as dotted lines), and a portion 2621a of xVcom 2621. Portion 2621a includes a connection point 2623. Gate line 2613 and xVcom 2621 run through pixels that are adjacent in the x-direction.

Figure 27:
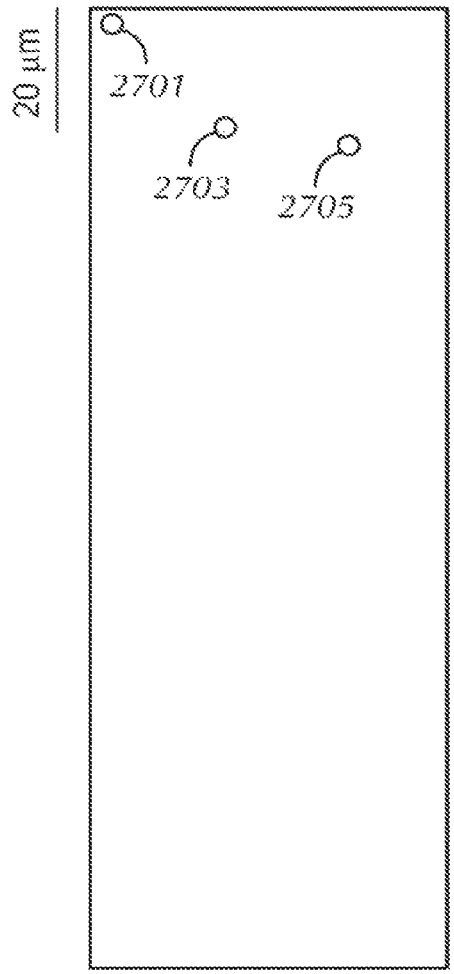
FIG. 27 illustrates vias formed in pixels in the example IPS LCD display using LTPS according to embodiments of the invention.

FIG. 27 shows vias 2701, 2703, and 2705 formed in pixels 2501/2502 for connections to portion 2505, portion 2509, and connection point 2623, respectively.

Figure 28:
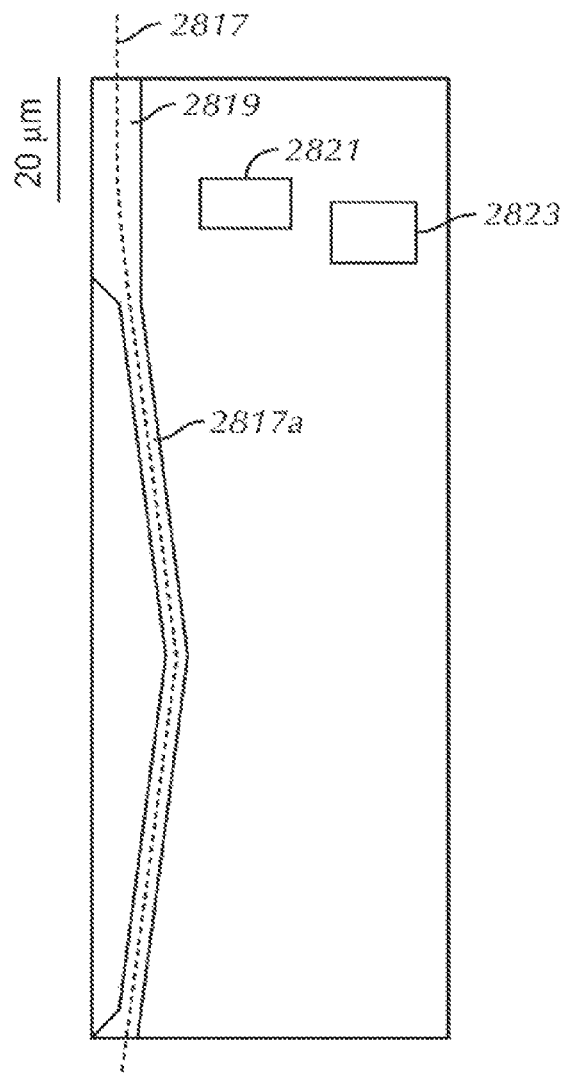
FIG. 28 illustrates the patterning of a second metal layer (M2) of pixels in the example IPS LCD display using LTPS according to embodiments of the invention.

FIG. 28 shows patterning of a second metal layer (M2) of pixels 2501/2502. As shown in FIG. 28, the M2 layer of the pixels forms a portion 2817a of a color data line 2817 (shown as a dotted line in FIG. 28), which could carry red, green, or blue color data, for example. Portion 2817a includes a connection 2819 that connects to portion 2505 through via 2701. The M2 layer also forms a connection 2821 with portion 2509 through via 2703, and forms a connection 2823 to connection point 2623 through via 2705.

Figures 29, 30:
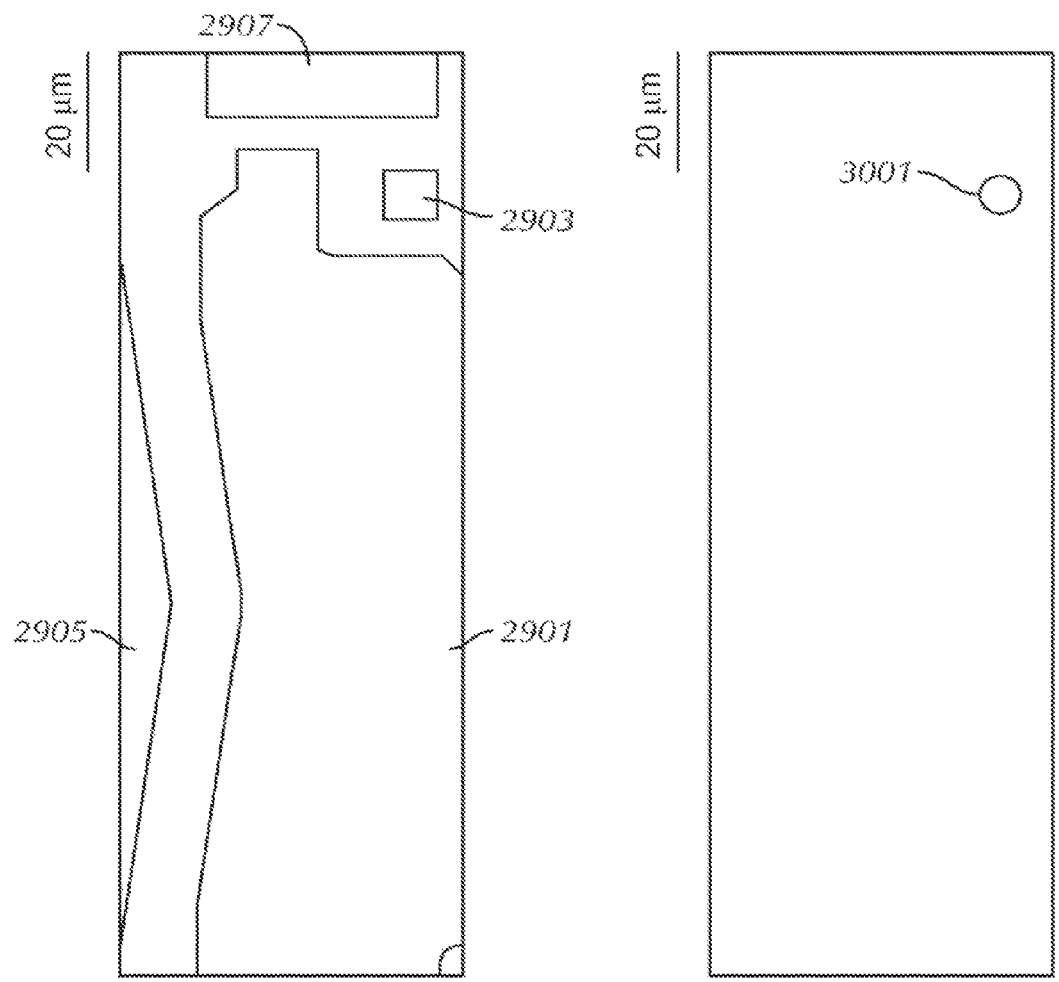
FIG. 29 illustrates a first layer of transparent conductive material, such as ITO, formed on pixels in the example IPS LCD display using LTPS according to embodiments of the invention.
FIG. 30 illustrates a connection in the example IPS LCD display using LTPS according to embodiments of the invention.

FIG. 29 shows a first layer of transparent conductive material, such as ITO, formed on pixels 2501/2502. The first transparent conductor layer includes a pixel electrode 2901. FIG. 29 also shows a portion 2905 of a pixel electrode of a pixel adjacent in the x-direction, and a portion 2907 of a pixel electrode of a pixel adjacent in the y-direction. FIG. 29 also shows a connection 2903, which forms a connection between a common ITO layer described below and xVcom 2621 through connection point 2623 and a connection 3001 shown in FIG. 30.

Figure 31:
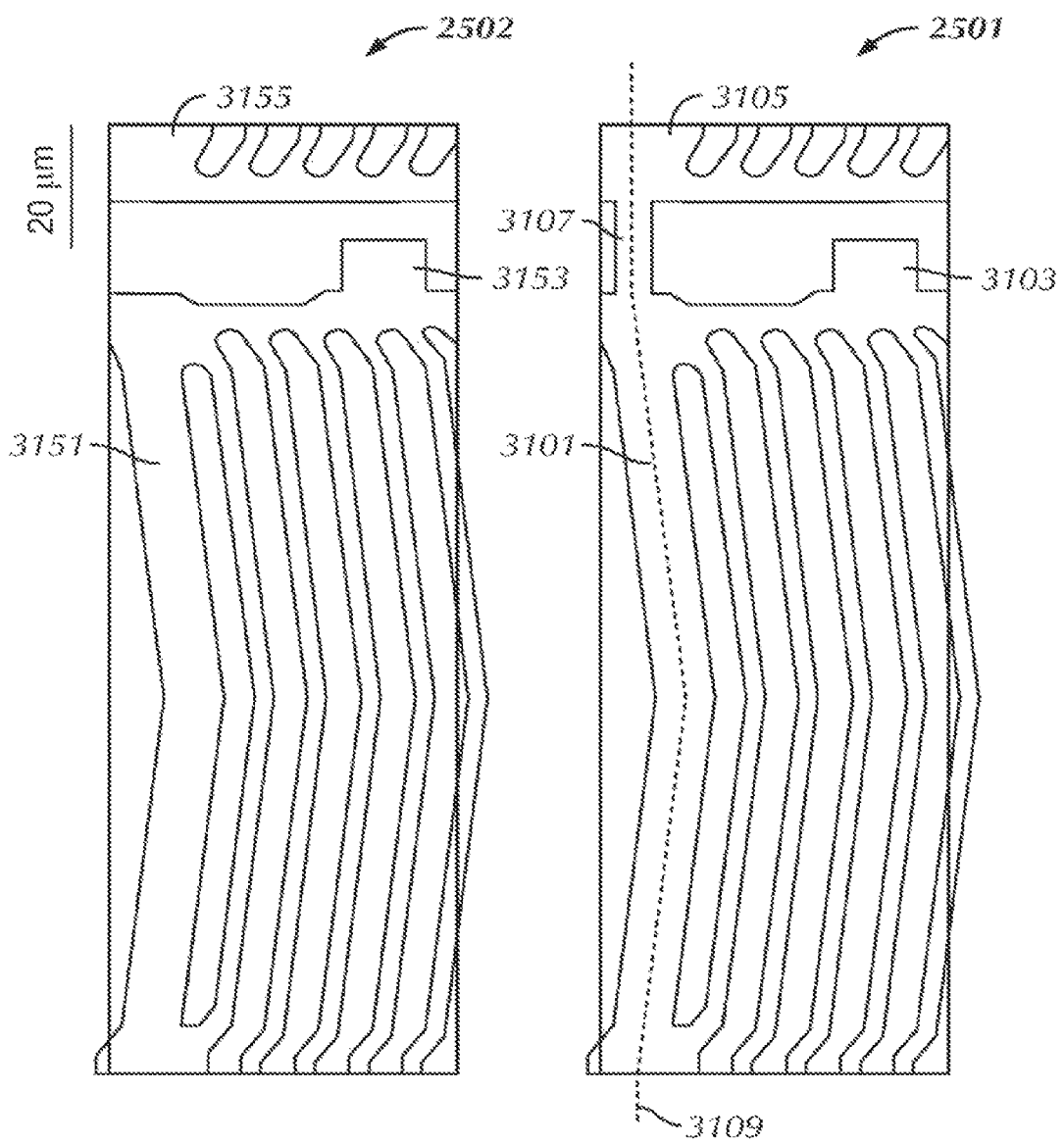
FIG. 31 illustrates a second layer of transparent conductor, such as ITO, formed on pixel in the example IPS LCD display using LTPS according to embodiments of the invention.

FIG. 31 shows a second layer of transparent conductor, such as ITO, formed on pixel 2501 and pixel 2502. The second layer on pixel 2502 forms a common electrode 3151, which includes a connection point 3153 that connects to xVcom 2621 through connections 3001 and 2903, and connection point 2623. FIG. 31 also shows a portion 3155 of a common electrode of a pixel adjacent in the y-direction. Like pixel 2502, pixel 2501 includes a common electrode 3101 formed of the second layer of transparent conductor. Likewise, common electrode 3101 includes a connection point 3103 that connects to xVcom 2621 through connections 3001 and 2903, and connection point 2623. However, pixel 2501 also includes a connection 3107 between common electrode 3101 and a common electrode 3105 of a pixel adjacent in the y-direction. In this way, the common electrodes of pixels can be connected in the y-direction to form a yVcom line 3109. Because common electrode 3101 is connected to xVcom 2621 and xVcom 2621 is connected to common electrodes of other pixels in the x-direction, the common electrodes of a region of pixels can be connected together to form a touch sensing element. Similar to the previous example embodiment, breaks in xVcom lines and yVcom lines can create separate regions of linked-together common electrodes that can be formed as an array of touch sensors.

Figure 32:
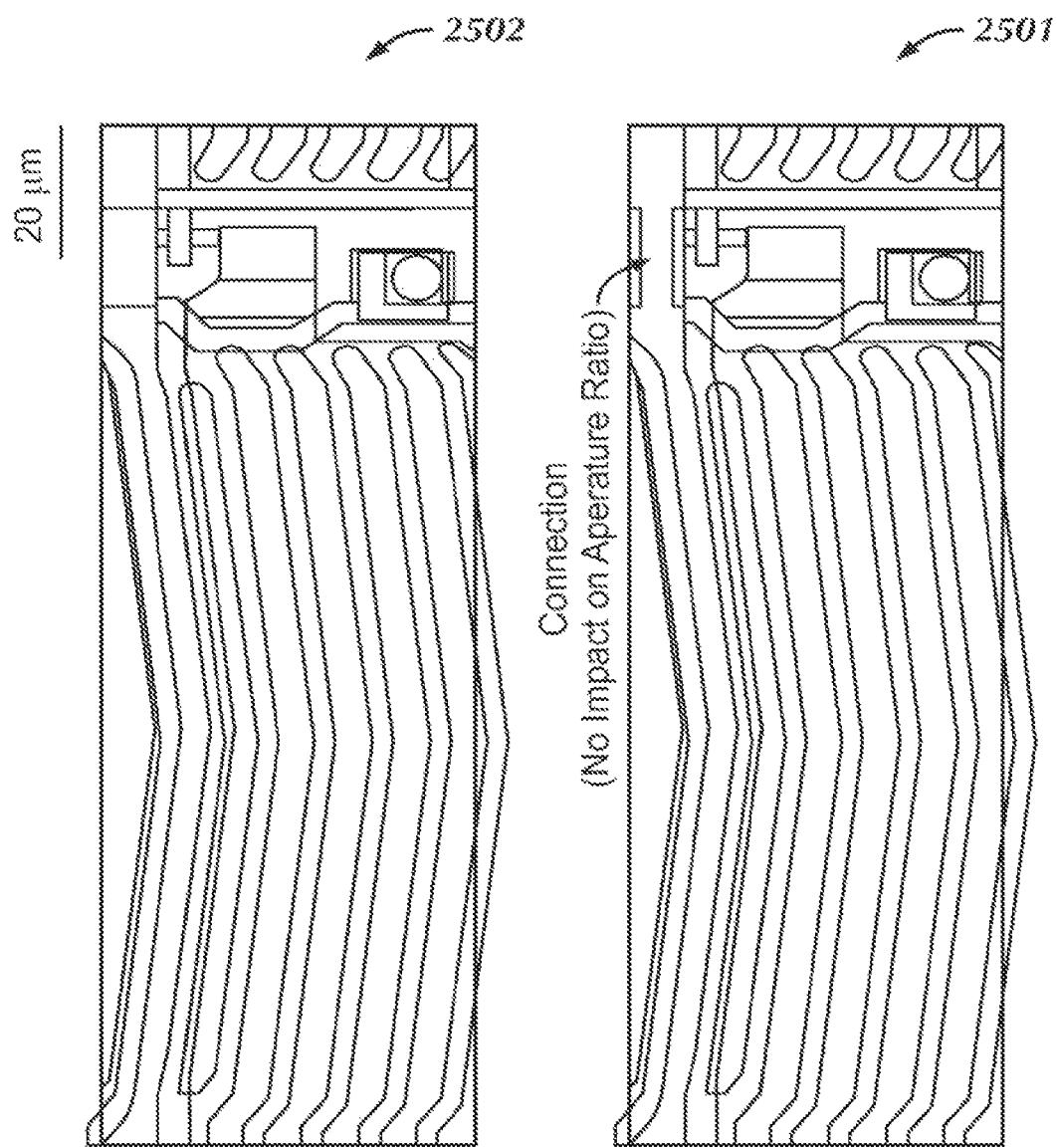
FIG. 32 illustrates a plan view of completed pixels in the example IPS LCD display using LTPS according to embodiments of the invention.

FIG. 32 shows a plan view of completed pixels 2501 and 2502. FIG. 33 illustrates a side view of pixel 2501 taken along the lines shown in the top view shown in the figure.

Figure 34:
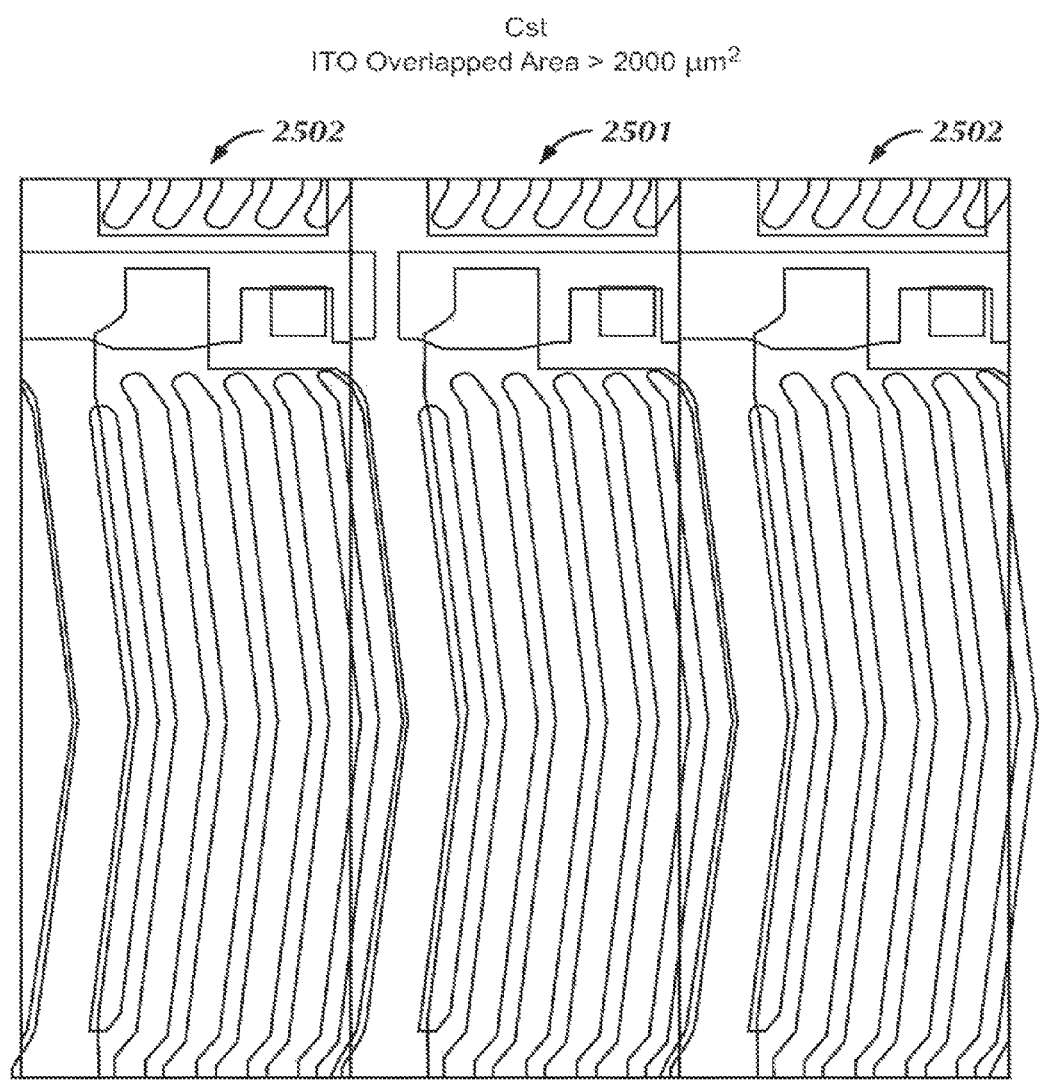
FIG. 34 illustrates the storage capacitances of two pixels in the example IPS LCD display using LTPS according to embodiments of the invention.

FIG. 34 illustrates the storage capacitance of a pixel 2501 and a pixel 2502.

FIGS. 35-43 are directed to another example IPS LCD display using LTPS. In the present example, a yVcom line is formed in an M2 layer (in comparison to the previous example IPS LCD display, in which a yVcom line is formed in a common ITO layer). An example process of manufacturing an IPS LCD display using LTPS with an M2 layer yVcom line according to embodiments of the invention will now be described with reference to FIGS. 35-41. The figures show various stages of processing of two pixels, a pixel 3501 and a pixel 3502, during the manufacture of the example IPS LCD display. The resulting pixels 3501 and 3502 form electrical circuits equivalent to pixels 101 and 102, respectively, of FIG. 1.

Figure 35:
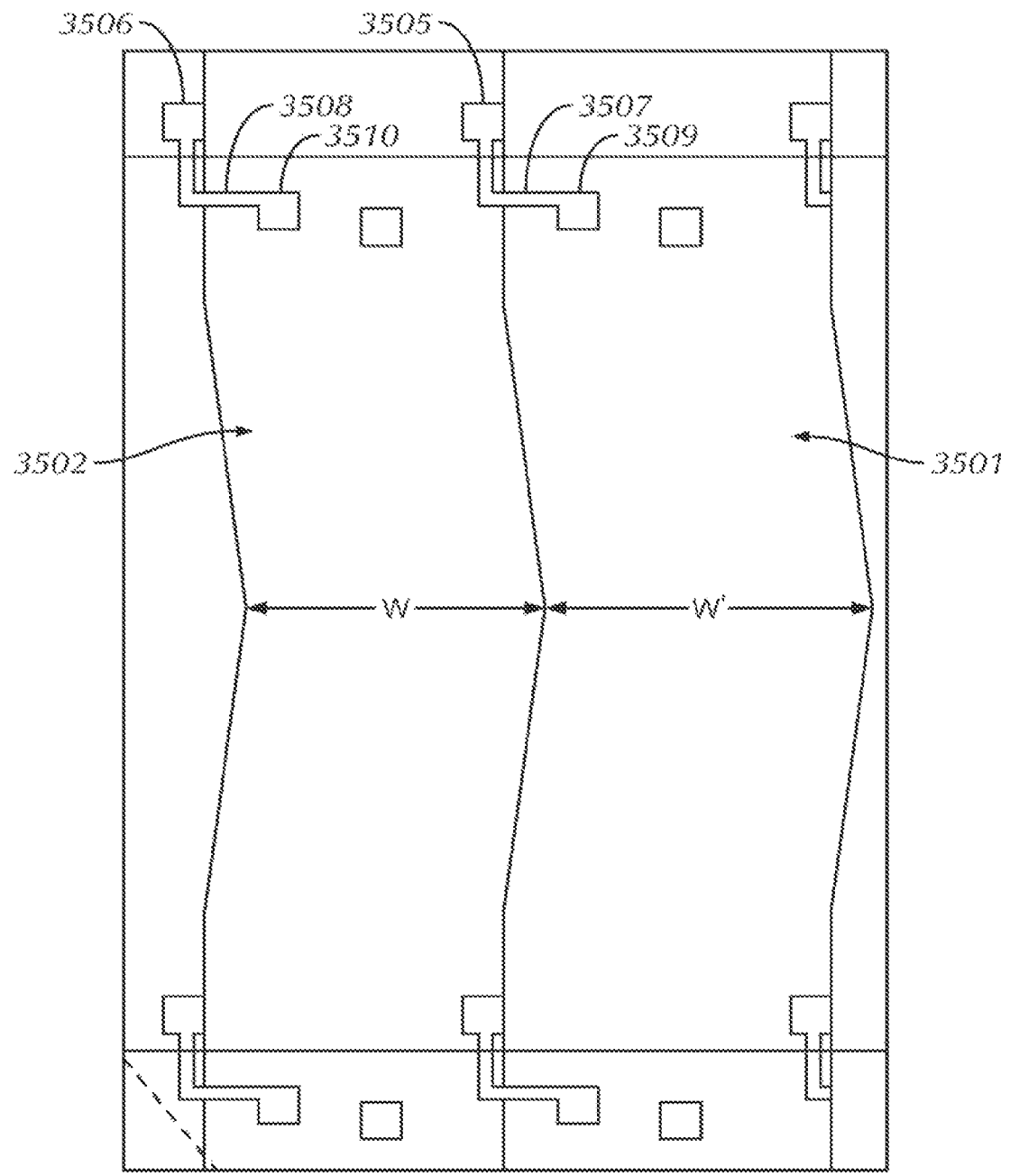
FIG. 35 illustrates the patterning of a layer of poly-Si of pixels in an example IPS LCD display using LTPS in which a yVcom line is formed in an M2 layer according to embodiments of the invention.

FIG. 35 shows the patterning of a layer of poly-Si of pixels 3501 and 3502. Semiconductor portions 3505, 3507, and 3509 form the active region of a TFT of pixel 3501, and serve as source, gate, and drain, respectively. Likewise, semiconductor portions 3506, 3508, and 3510 are the source, gate, and drain, respectively, of pixel 3502. FIG. 35 also shows that pixel 3501 has the width W' (in the x-direction) that is slightly greater than the width W of pixel 3502.

Figure 36:
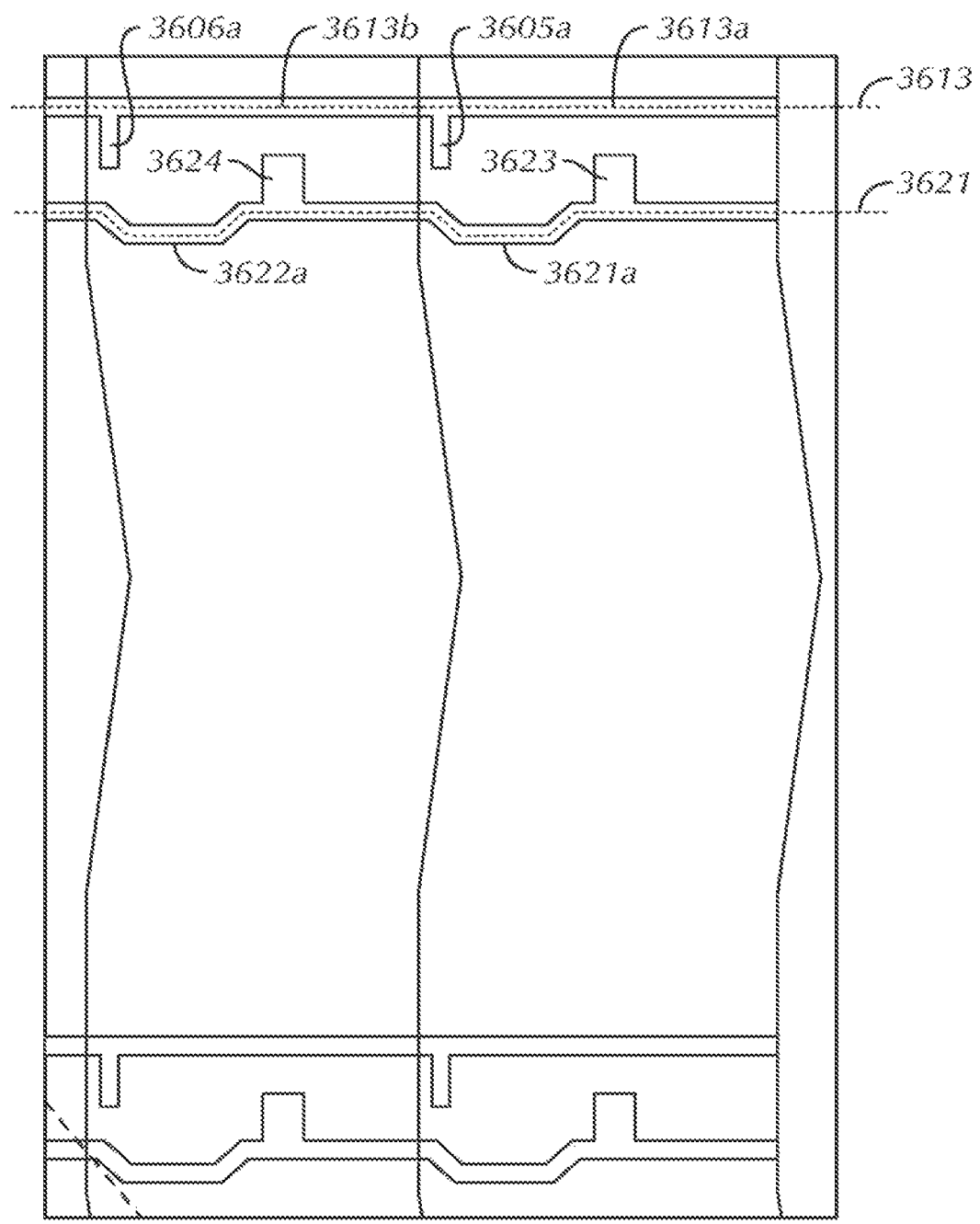
FIG. 36 illustrates the patterning of a first metal layer (M1) of pixels in the example IPS LCD display using LTPS in which a yVcom line is formed in an M2 layer according to embodiments of the invention.

FIG. 36 shows a subsequent patterning step in the process of manufacturing pixels 3501 and 3502, in which a first metal layer (M1) of pixels 3501 and 3502 is formed. As shown in FIG. 36, the M1 layers of pixels 3501 and 3502 include gates 3605a and 3606a, portions 3613a and 3613b of a gate line 3613 (shown as dotted lines), and portions 3621a and 3621b of xVcom 3621. Portions 3621a and 3622a include connections points 3623 and 3624, respectively. Gate line 3613 and xVcom 3621 run through pixels that are adjacent in the x-direction.

Figure 37:
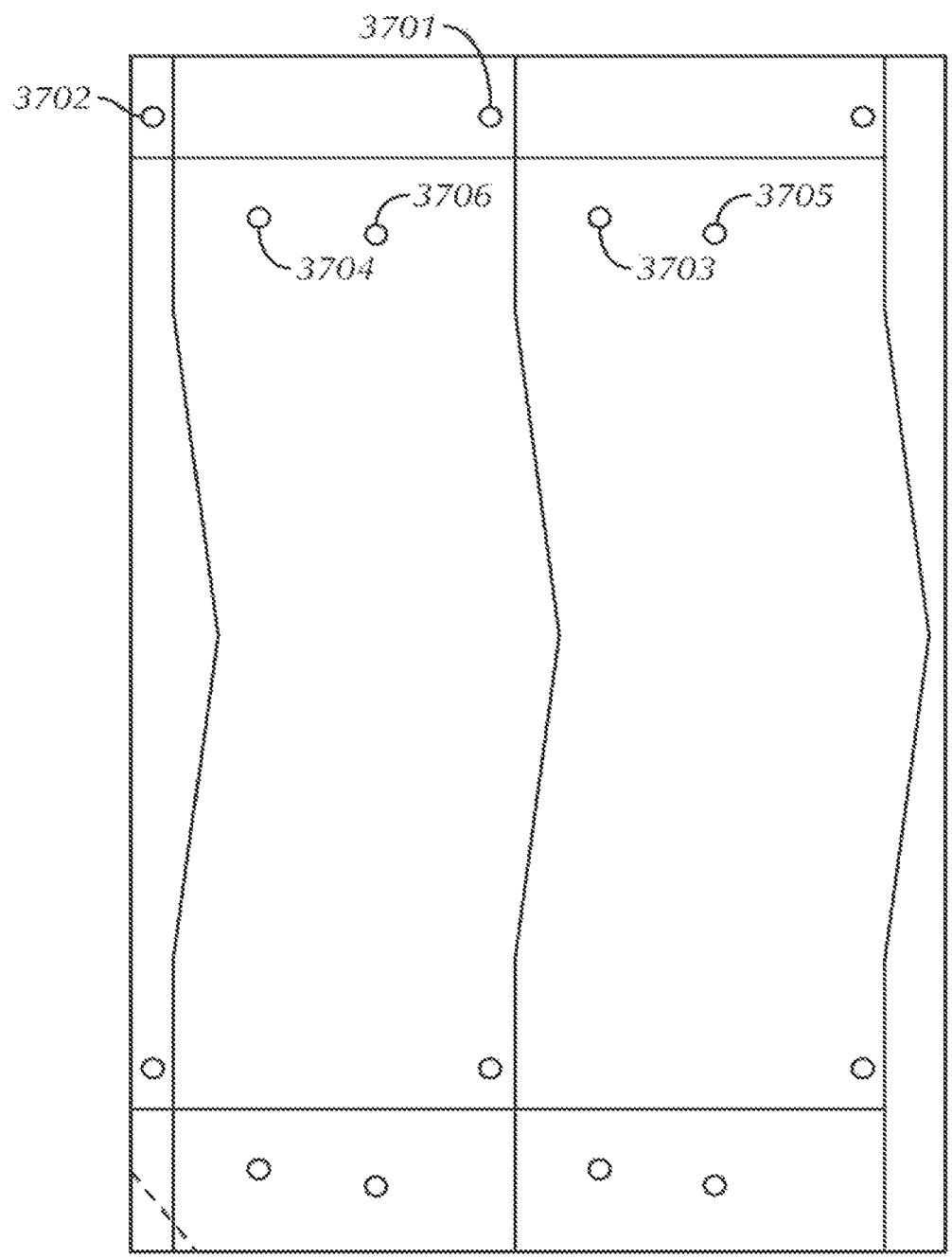
FIG. 37 illustrates vias formed in pixels in the example IPS LCD display using LTPS in which a yVcom line is formed in an M2 layer according to embodiments of the invention.

FIG. 37 shows vias 3701, 3703, and 3705 formed in pixels 3501 for connections to portion 3505, portion 3509, and connection point 3623, respectively. Vias 3702, 3704, and 3706 formed in pixels 3502 for connections to portion 3506, portion 3510, and connection point 3624, respectively.

Figure 38:
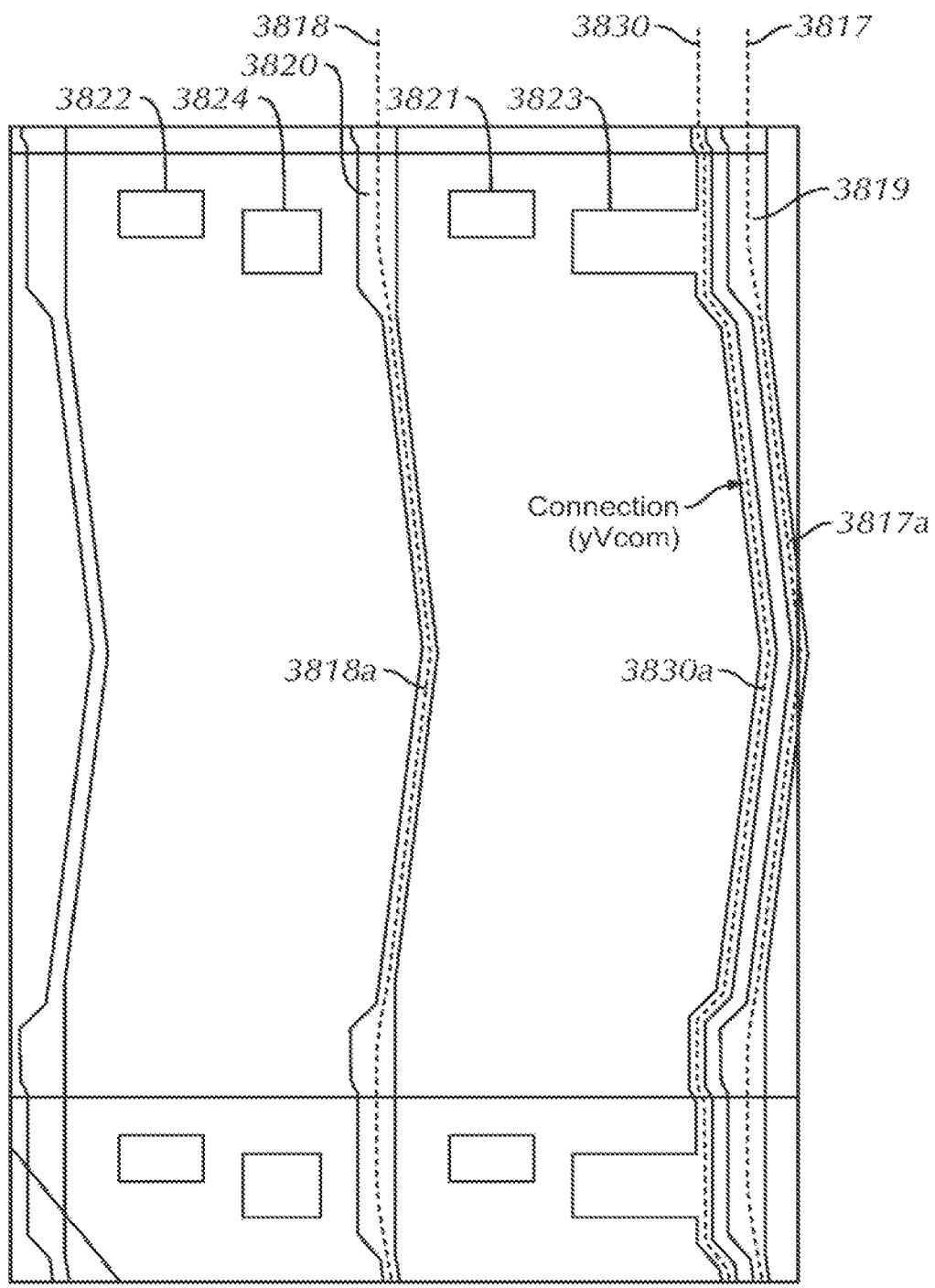
FIG. 38 illustrates patterning of a second metal layer (M2) of pixels in the example IPS LCD display using LTPS in which a yVcom line is formed in an M2 layer according to embodiments of the invention.

FIG. 38 shows patterning of a second metal layer (M2) of pixels 3501 and 3502. For pixel 3501, the M2 layer forms a portion 3817a of a color data line 3817 (shown as a dotted line in FIG. 38), which could carry red, green, or blue color data, for example. Portion 3817a includes a connection 3819 that connects to portion 3505 through via 3701. Pixel 3501 also includes a portion 3830a of a yVcom 3830 (shown as a dotted line), which includes a connection 3823 to connection point 3623 through via 3705. Thus, yVcom 3830 is connected to xVcom 3621. Pixel 3501 also includes a connection 3821 with portion 3509 through via 3703.

Because yVcom 3830 is connected to xVcom 3621 and xVcom 3621 is connected to common electrodes of other pixels in the x-direction, the common electrodes of a region of pixels can be connected together to form a touch sensing element. Similar to the previous example embodiment, breaks in xVcom lines and yVcom lines can create separate regions of linked-together common electrodes that can be formed as an array of touch sensors.

For pixel 3502, the M2 layer forms a portion 3818a of a color data line 3818 (shown as a dotted line in FIG. 38), which could carry red, green, or blue color data, for example. Portion 3818a includes a connection 3820 that connects to portion 3506 through via 3702. Pixel 3501 also includes a connection 3824 to connection point 3624 through via 3706, and a connection 3822 with portion 3510 through via 3704.

Figure 39:
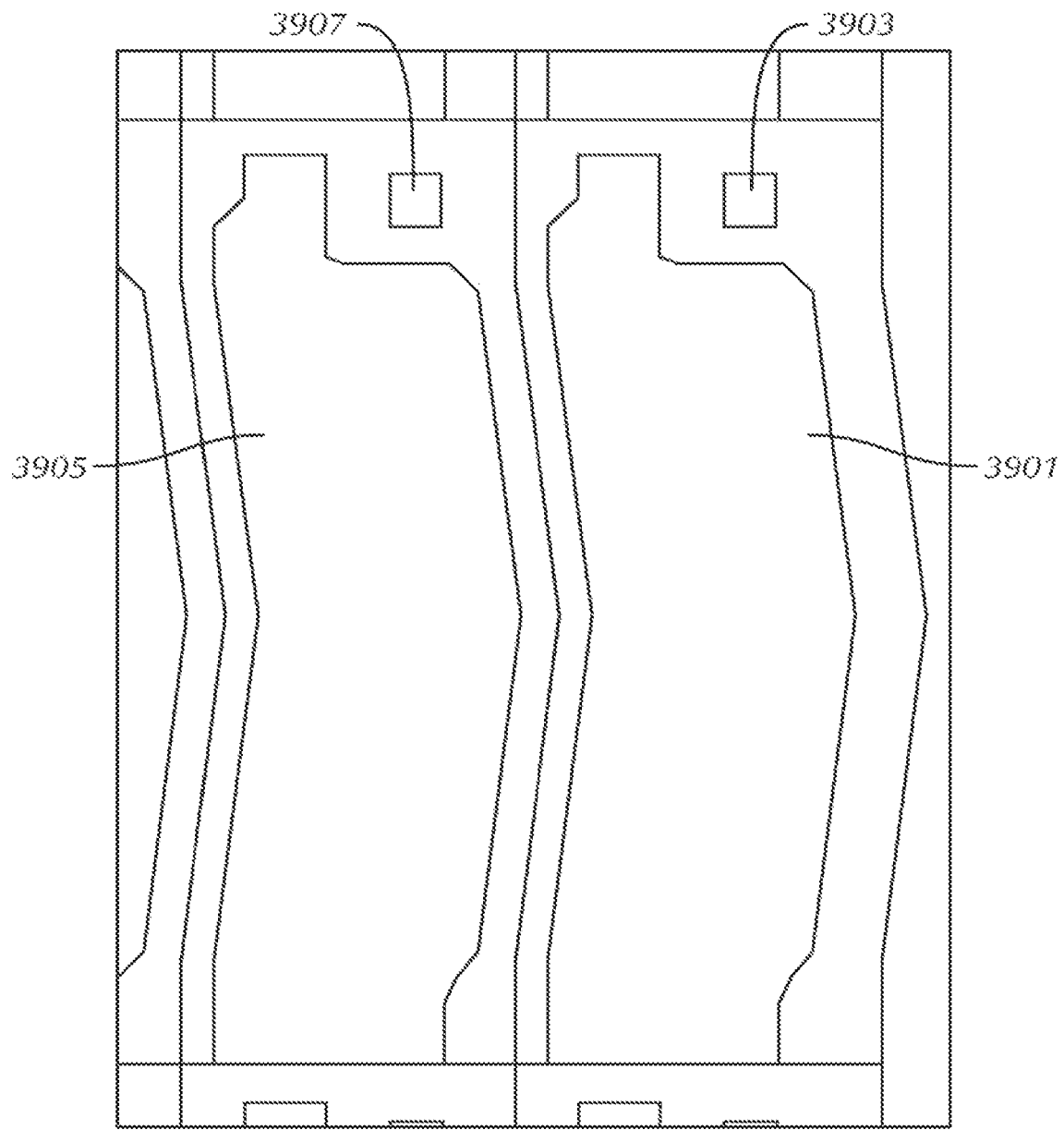
FIG. 39 illustrates a first layer of transparent conductive material, such as ITO, formed on pixels in the example IPS LCD display using LTPS in which a yVcom line is formed in an M2 layer according to embodiments of the invention.
Figure 40:
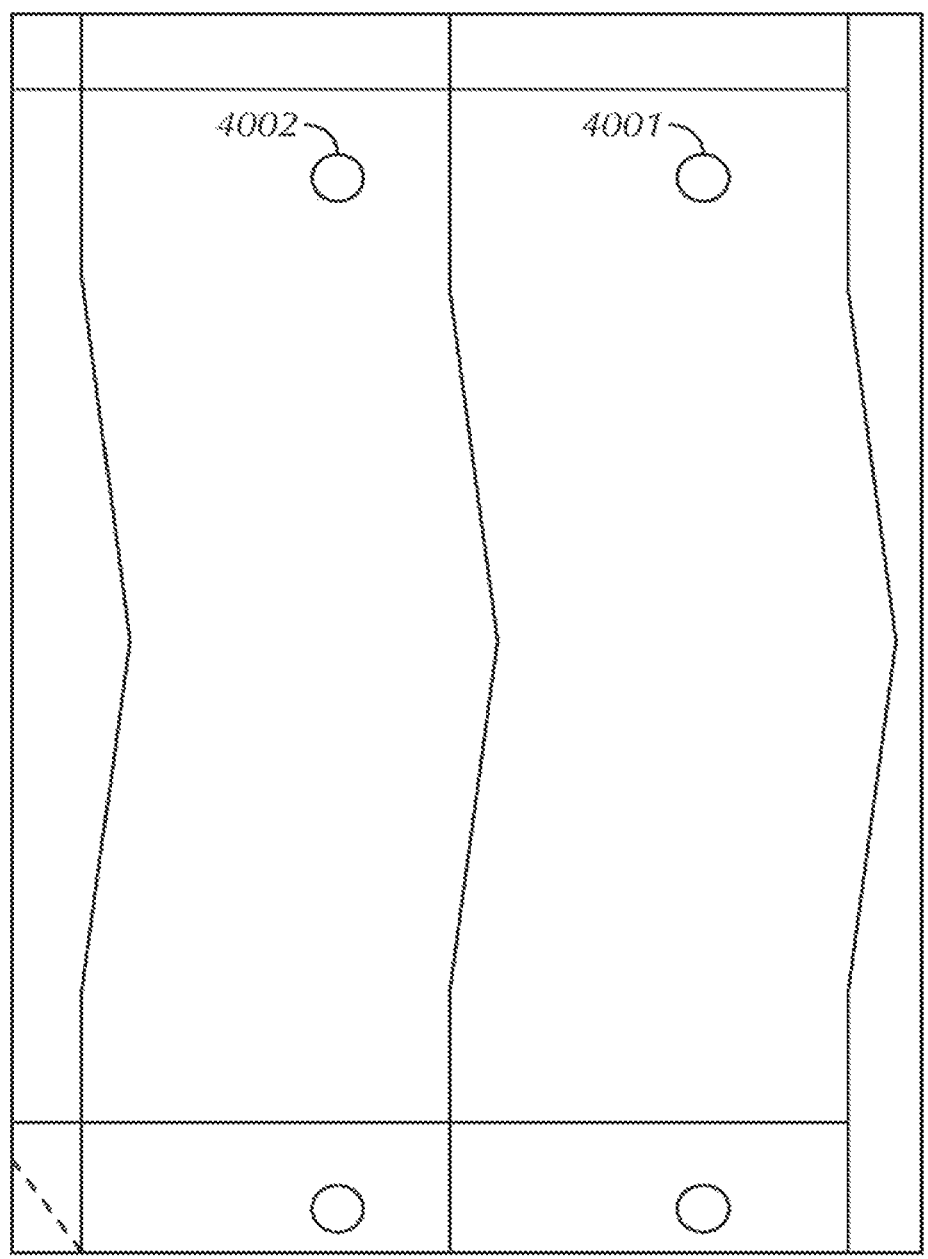
FIG. 40 illustrates connections in the example IPS LCD display using LTPS in which a yVcom line is formed in an M2 layer according to embodiments of the invention.

FIG. 39 shows a first layer of transparent conductive material, such as ITO, formed on pixels 3501 and 3502. The first transparent conductor layer includes pixel electrodes 3901 and 3905. FIG. 39 also shows connections 3903 and 3907, which form connections between a common ITO layer described below and xVcom 3621 through connection points 3623 and 3624 and connections 4001 and 4002, respectively, shown in FIG. 40.

Figure 41:
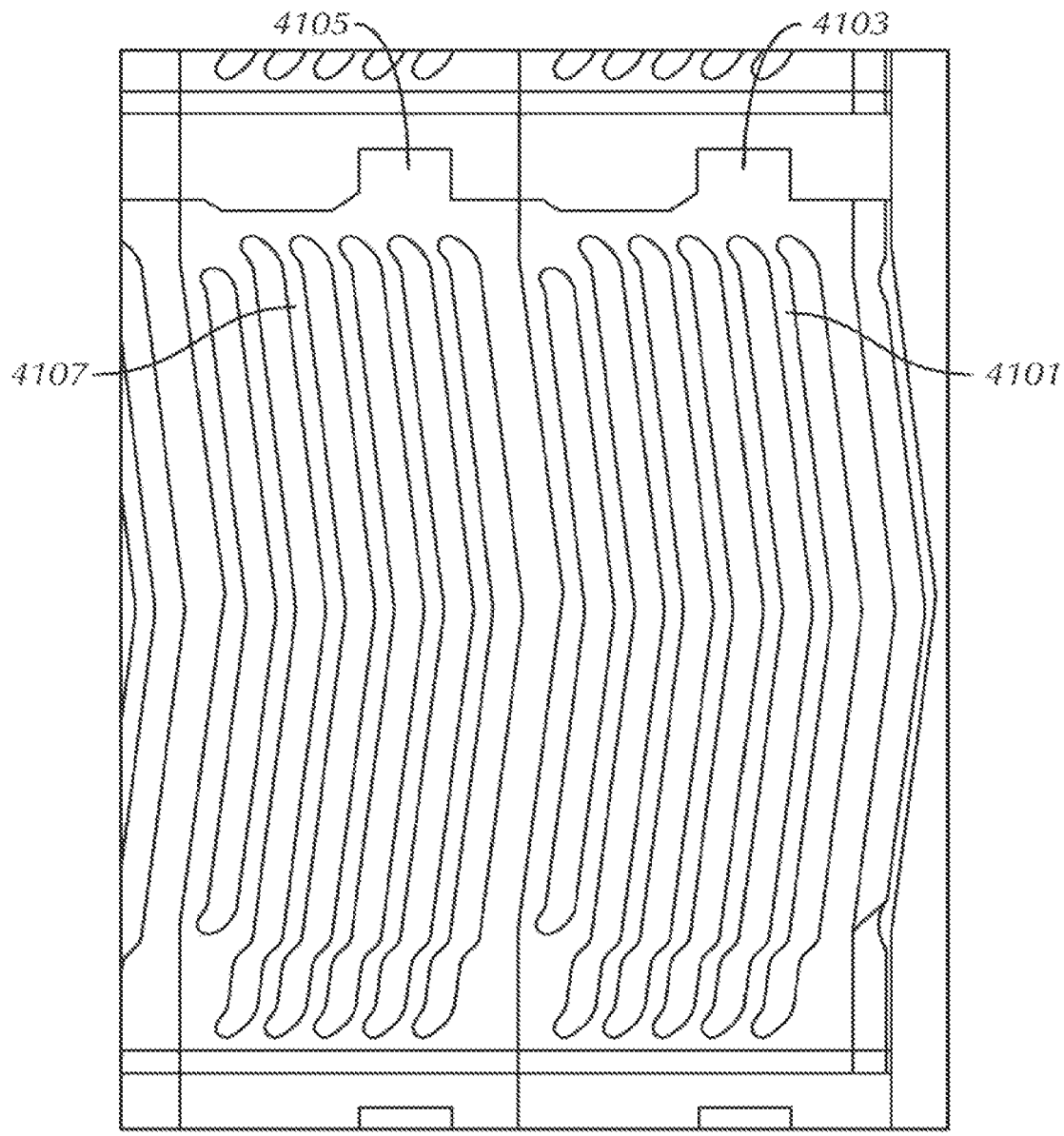
FIG. 41 illustrates a second layer of transparent conductor, such as ITO, formed on pixels in the example IPS LCD display using LTPS in which a yVcom line is formed in an M2 layer according to embodiments of the invention.

FIG. 41 shows a second layer of transparent conductor, such as ITO, formed on pixel 3501 and pixel 3502. The second layer on pixel 3502 forms a common electrode 4107, which includes a connection point 4105 that connects to xVcom 3621 through connections 4002 and 3907, and connection point 3624. Like pixel 3502, pixel 3501 includes a common electrode 4101 formed of the second layer of transparent conductor. Likewise, common electrode 4101 includes a connection point 4103 that connects to xVcom 3621 through connections 4001 and 3903, and connection point 3623.

Figure 42:
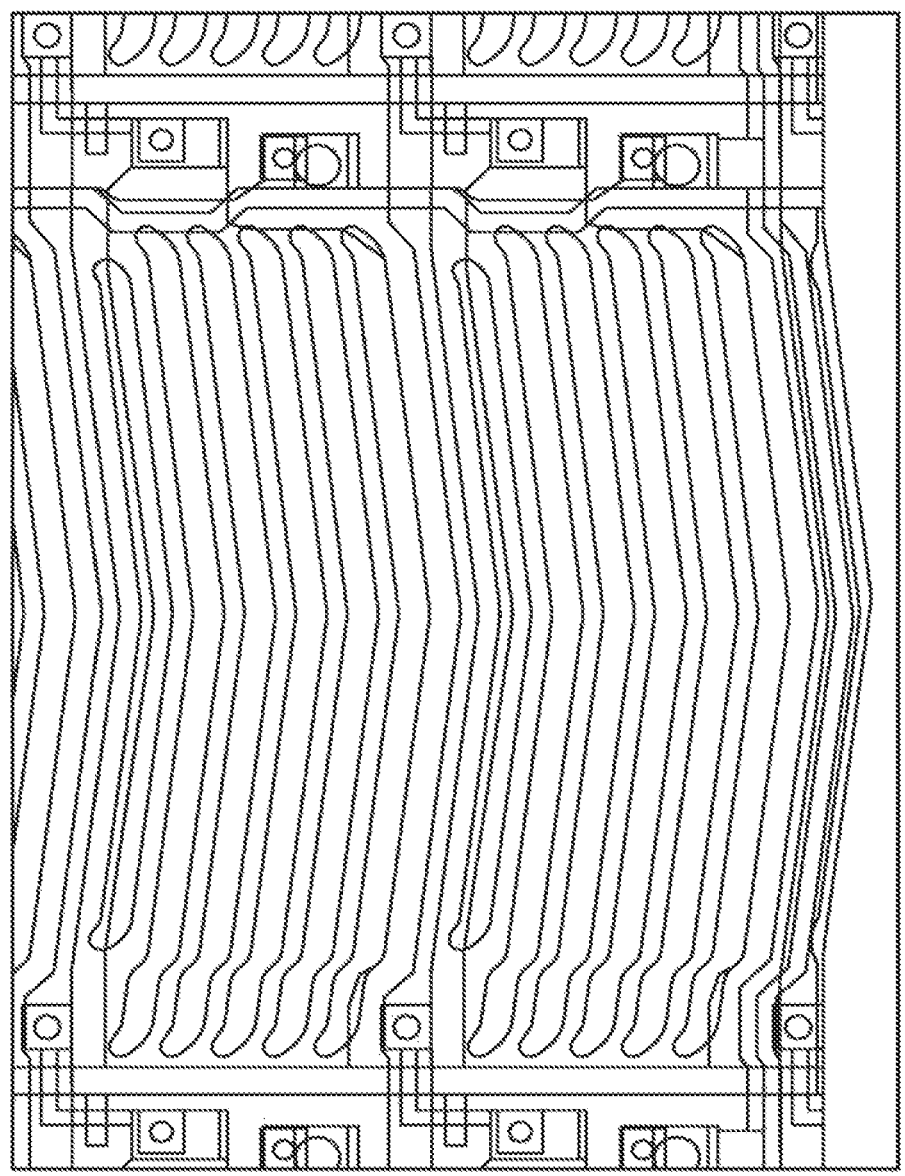
FIG. 42 illustrates a plan view of completed pixels in the example IPS LCD display using LTPS in which a yVcom line is formed in an M2 layer according to embodiments of the invention.

FIG. 42 shows a plan view of completed pixels 3501 and 3502. FIG. 43 illustrates a side view of pixel 3501 taken along the lines shown in the top view shown in the figure.

FIGS. 44-55 are directed to an example ECB LCD display using LTPS Like the ECB LCD display using amorphous silicon (a-Si) (shown in FIGS. 11-24), the process of manufacturing the ECB LCD display using LTPS includes construction of vias and additional M2 lines to form yVcom lines that connect the storage capacitors of pixels in the y-direction.

An example process of manufacturing an ECB LCD display using LTPS according to embodiments of the invention will now be described with reference to FIGS. 44-50.

Figure 44:
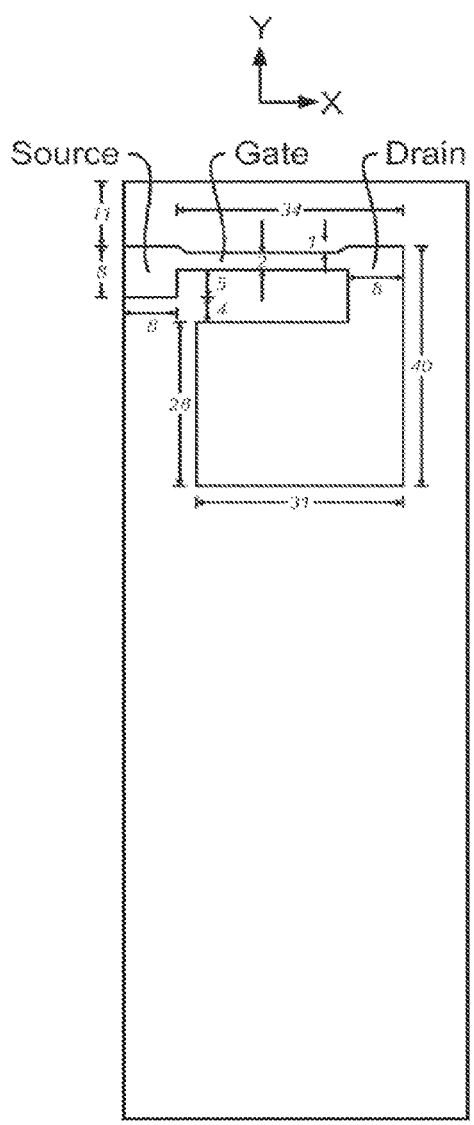
FIG. 44 illustrates a semiconductor layer of poly-Si in an example ECB LCD display using LTPS according to embodiments of the invention.
Figure 45:
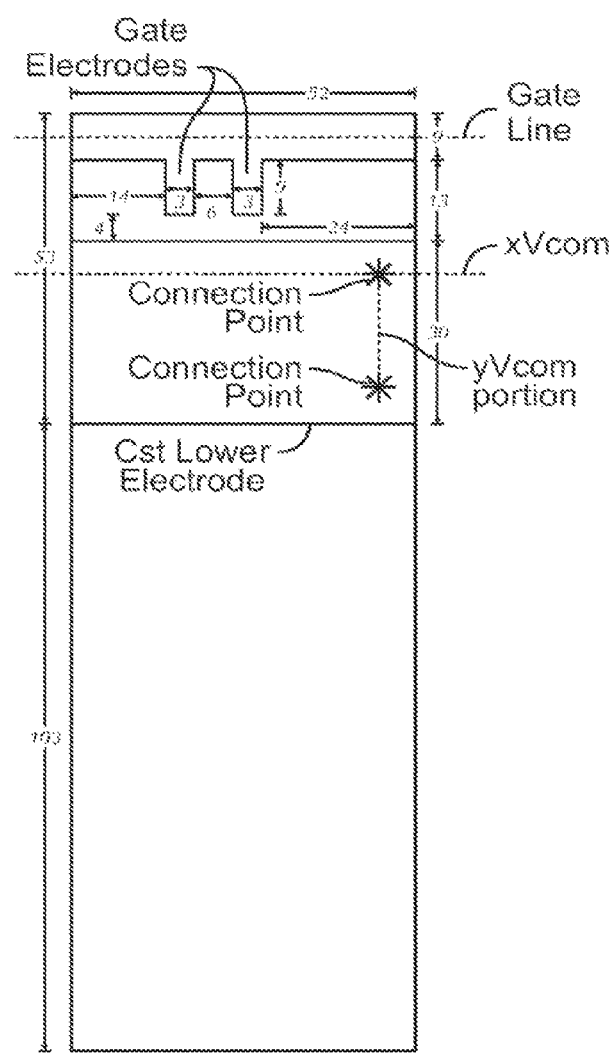
FIG. 45 illustrates a first layer of metal (M1) in the example ECB LCD display using LTPS according to embodiments of the invention.
Figure 46:
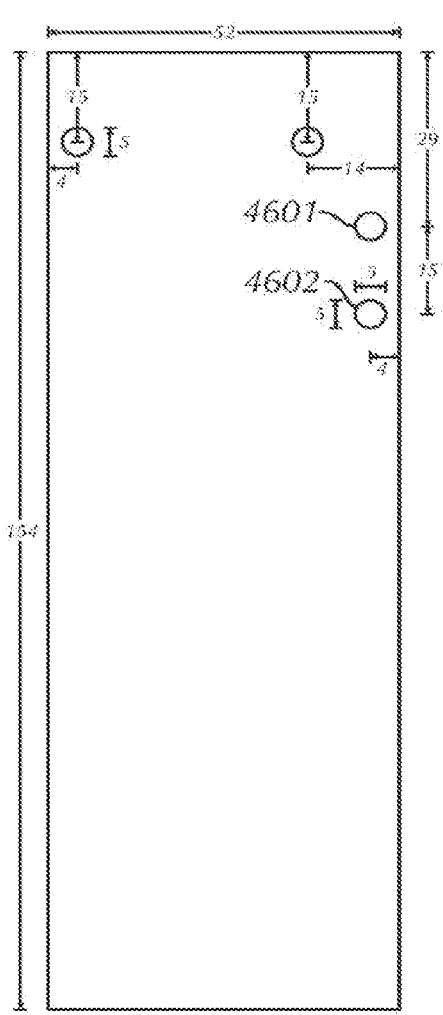
FIG. 46 illustrates connections in the example ECB LCD display using LTPS according to embodiments of the invention.
Figure 47:
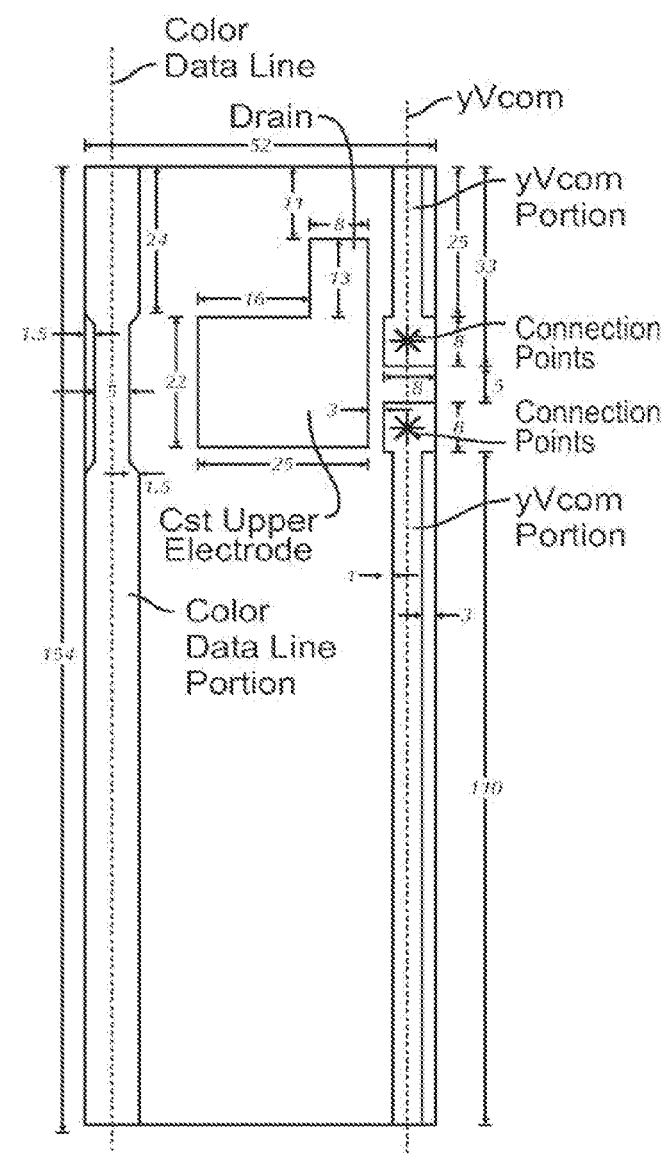
FIG. 47 illustrates a second metal layer (M2) in the example ECB LCD display using LTPS according to embodiments of the invention.
Figure 48:
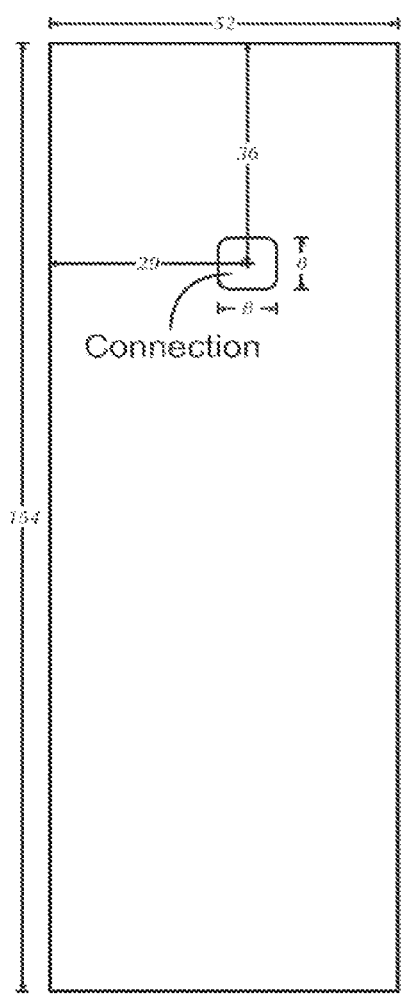
FIG. 48 illustrates a connection layer in the example ECB LCD display using LTPS according to embodiments of the invention.
Figure 49:
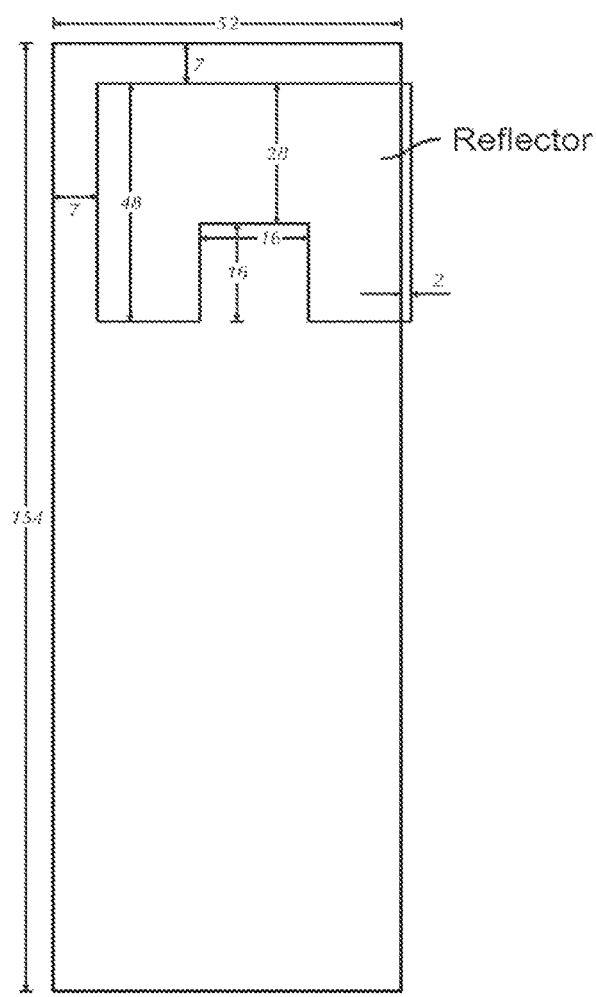
FIG. 49 illustrates a reflector layer in the example ECB LCD display using LTPS according to embodiments of the invention.
Figure 50:
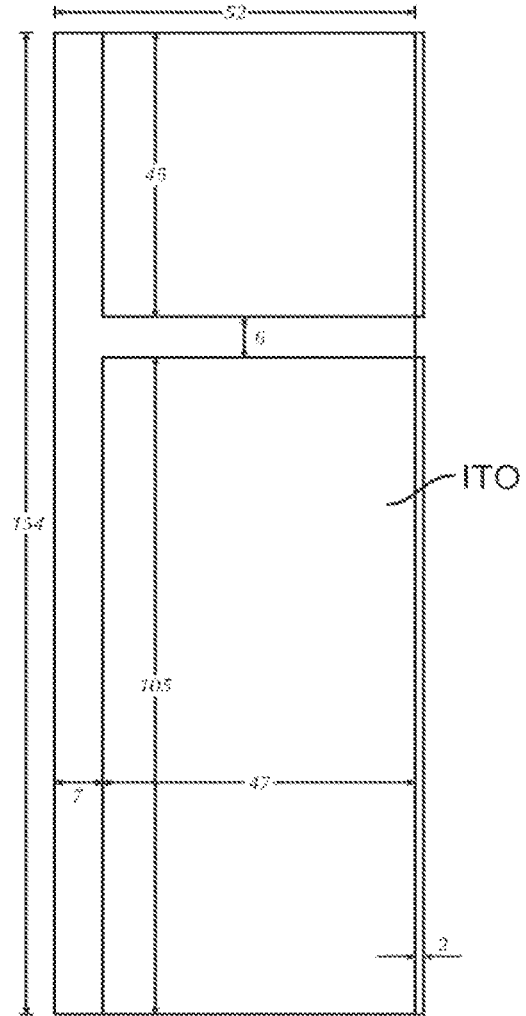
FIG. 50 illustrates an ITO layer in the example ECB LCD display using LTPS according to embodiments of the invention.
Figure 51:
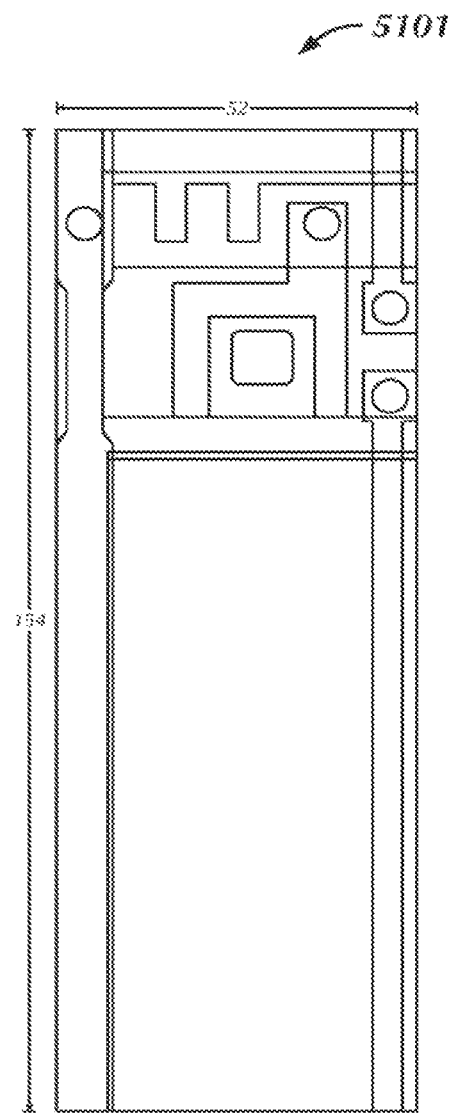
FIG. 51 illustrates a completed pixel in the example ECB LCD display using LTPS according to embodiments of the invention.
Figure 52:
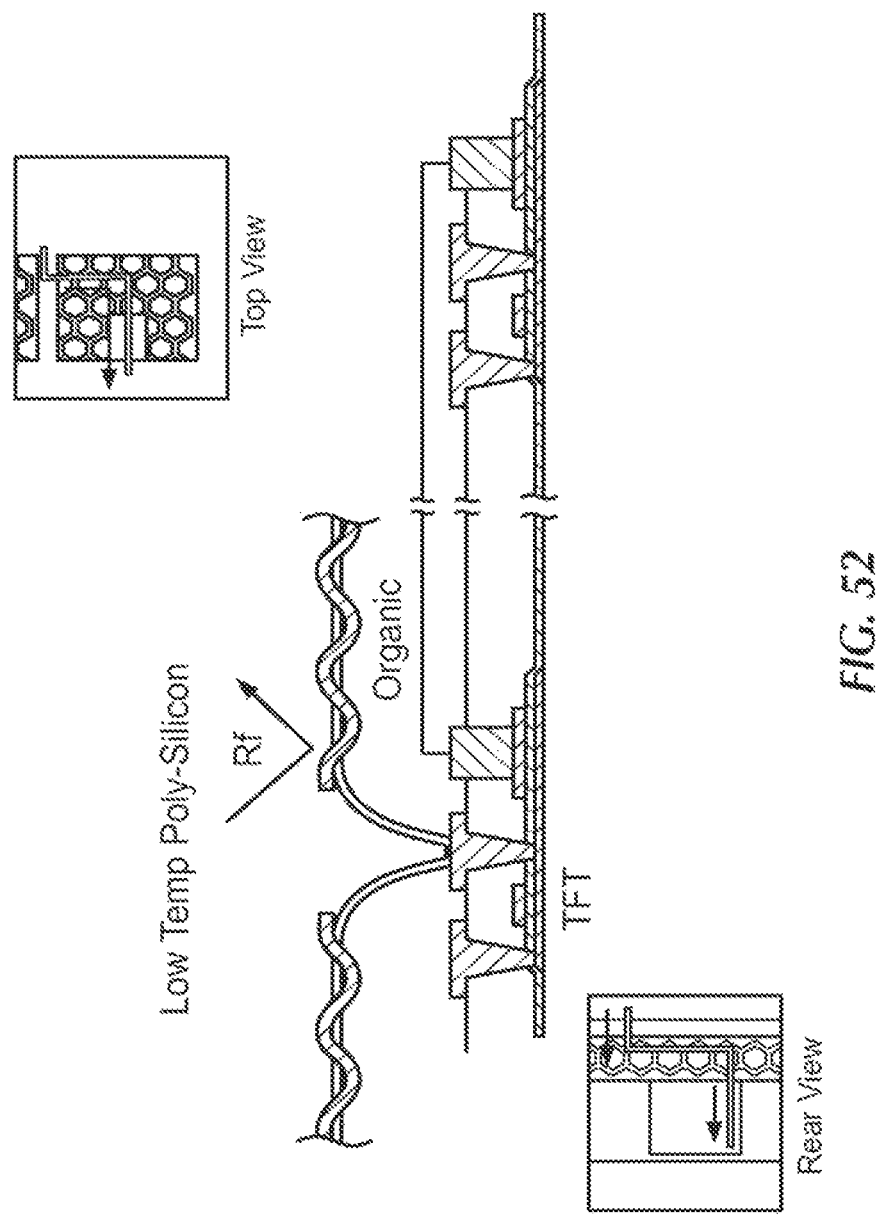
FIG. 52 illustrates a side view of a pixel in the example ECB LCD display using LTPS according to embodiments of the invention.
Figure 53:
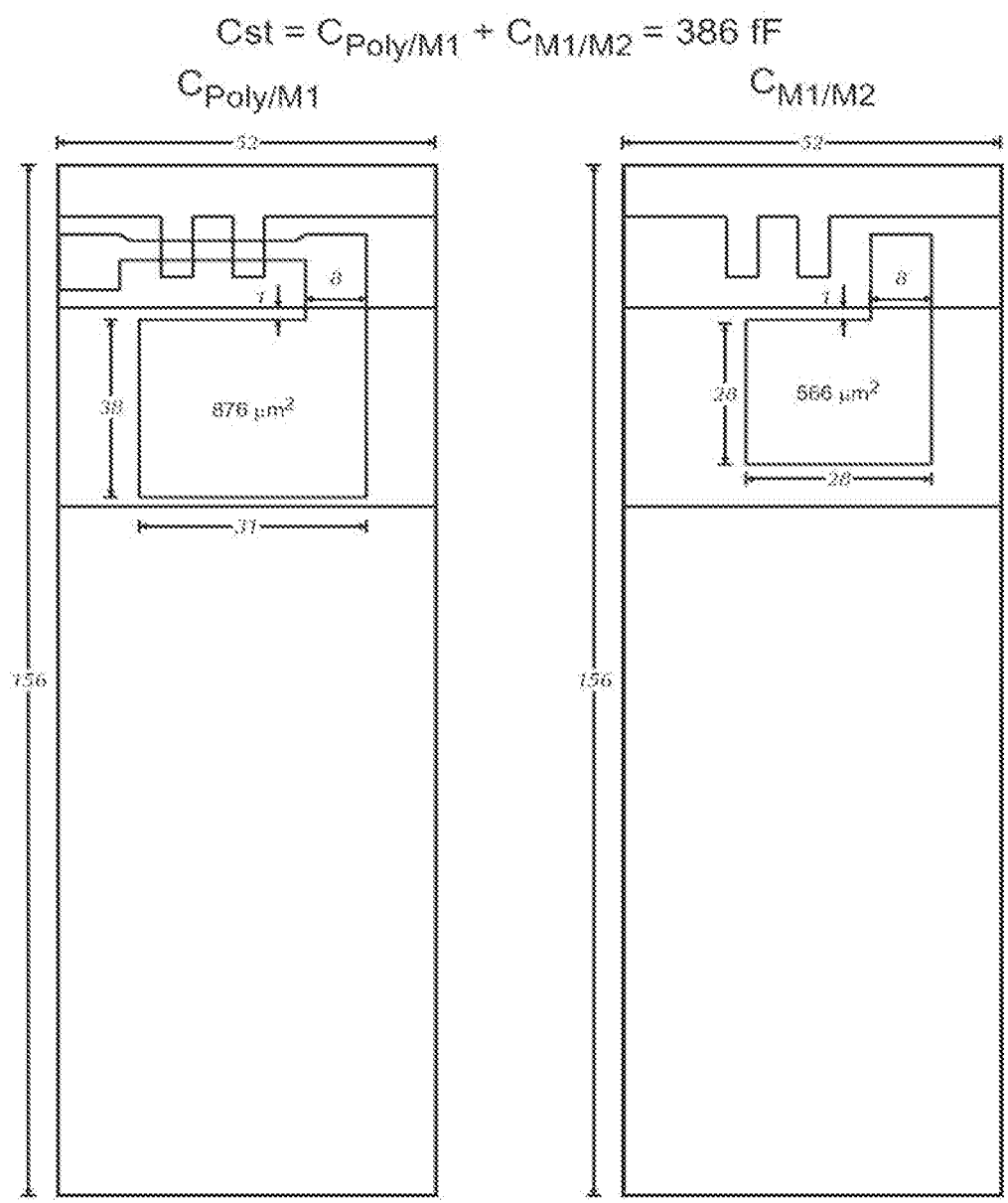
FIG. 53 illustrates a calculation of the storage capacitance of a pixel in the example ECB LCD display using LTPS according to embodiments of the invention.
Figure 54:
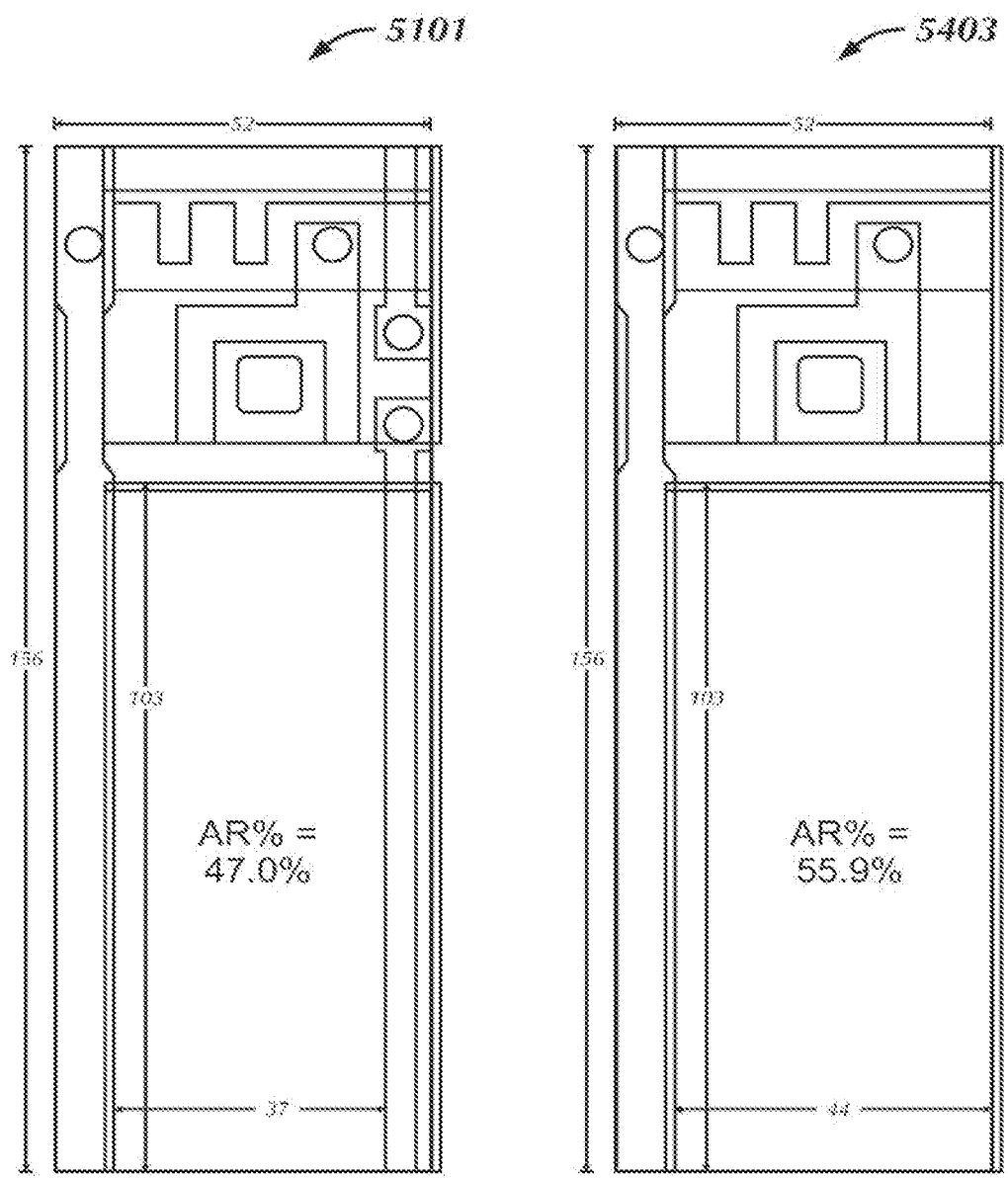
FIG. 54 illustrates an aperture ratio estimation of pixels in the example ECB LCD display using LTPS according to embodiments of the invention.
Figure 55:
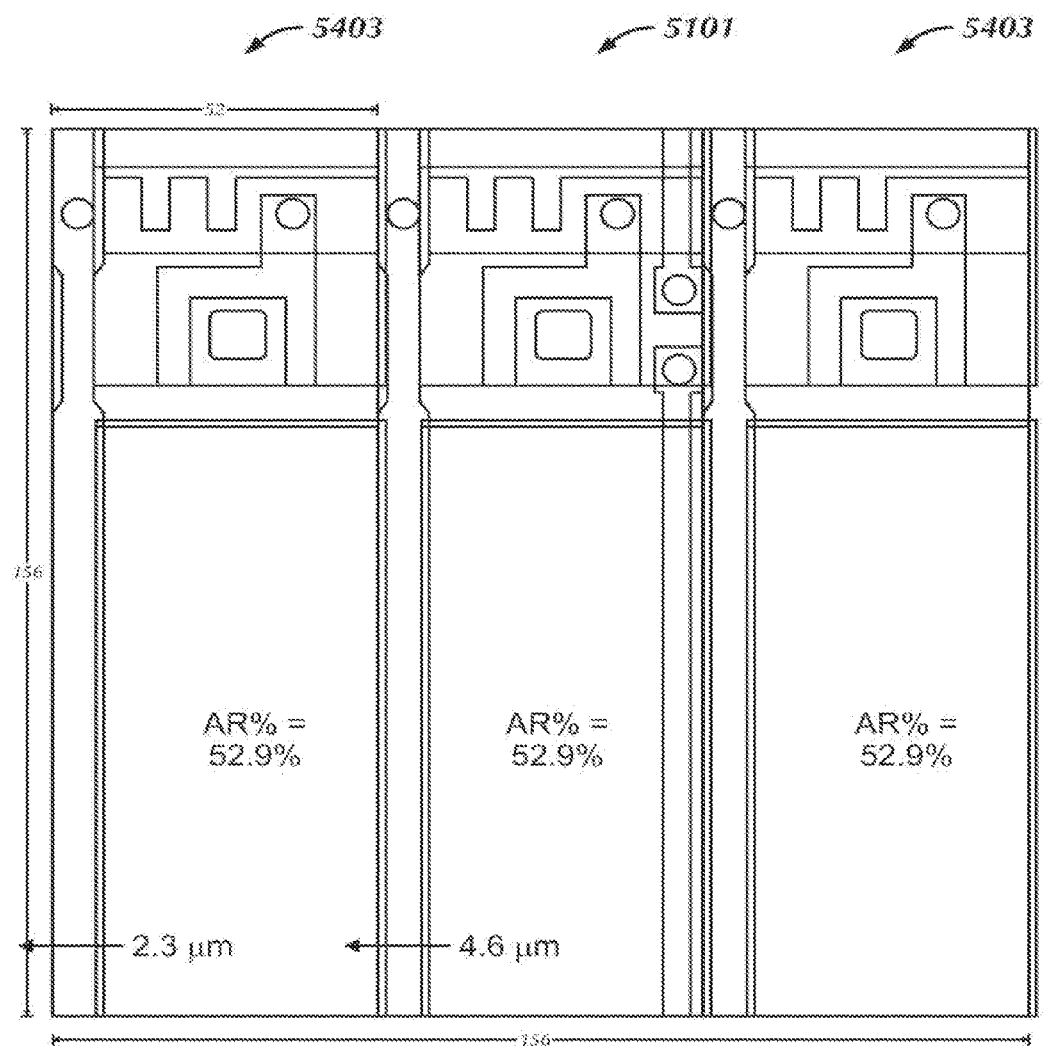
FIG. 55 illustrates an example modification in the example ECB LCD display using LTPS according to embodiments of the invention.

FIG. 44 shows a semiconductor layer of poly-Si. FIG. 45 shows a first layer of metal (M1). FIG. 46 shows connections including 4601 and 4602. FIG. 47 shows a second metal layer (M2). Connections 4601 and 4602 connect the M1 and M2 layers to form a yVcom line as shown in the figures. FIGS. 48-50 show a connection layer, a reflector layer, and an ITO layer, respectively. FIG. 51 shows a completed pixel including a yVcom portion that allows connection in the y-direction. FIG. 52 shows a side view of pixel 5101 along the line shown in the top view shown in FIG. 52. FIG. 53 shows a calculation of the storage capacitance of pixel 5101. FIG. 54 shows an aperture ratio estimation of pixel 5101 and a pixel 5403 that does not include a yVcom line. FIG. 55 shows that some metal, such portions of the M1, M2, and/or ITO layers can be shifted to help equalize the aperture ratios of the pixels.

Figure 56:
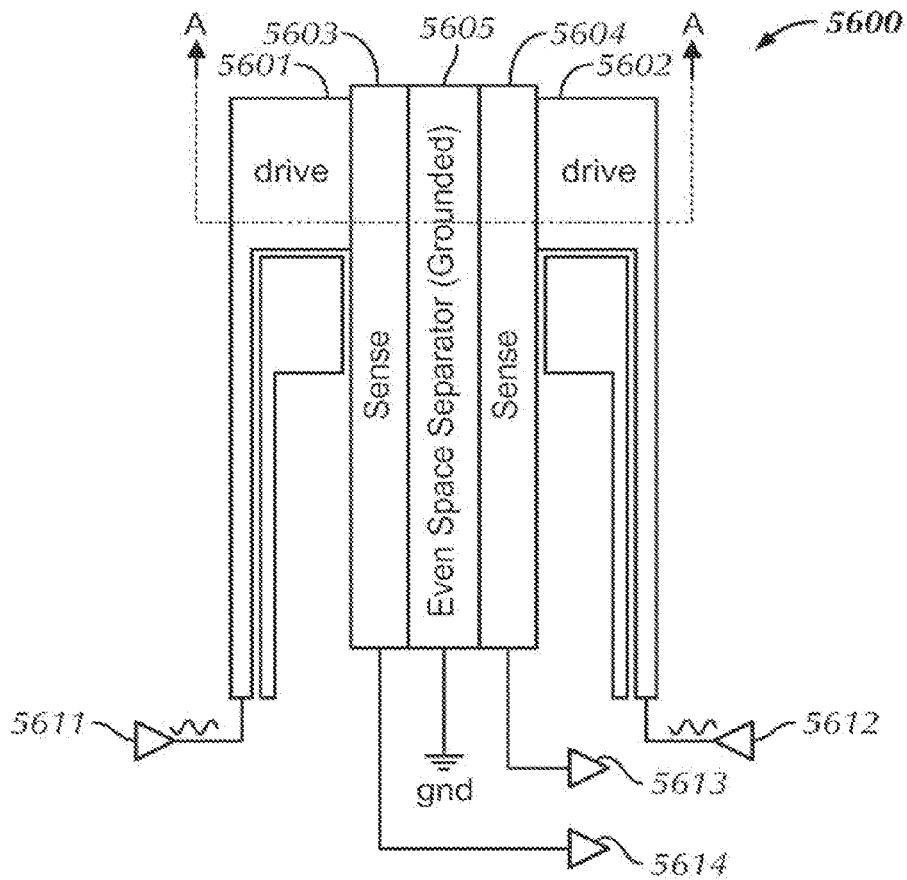
FIG. 56 illustrates a portion of a touch screen that includes an example grounded separator region according to embodiments of the invention.

FIG. 56 illustrates a portion of an example touch screen 5600 that includes a grounded separator region according to embodiments of the invention. Similar to some embodiments described above, touch screen 5600 includes regions for driving (5601 and 5602) and regions for sensing (5603 and 5604). The drive regions are connected to drive lines 5611 and 5612, and the sense regions are connected to sense lines 5613 and 5614. Touch screen also includes a grounded separator region 5605, which is a region of pixels having linked-together storage capacitors, as described above, that is grounded. Grounded separator region 5605 can help to electrically isolate touch pixel areas and may improve the detection of touch by touch screen 5600. Grounded separator regions can be, for example, evenly spaced throughout a touch screen.

Figure 57:
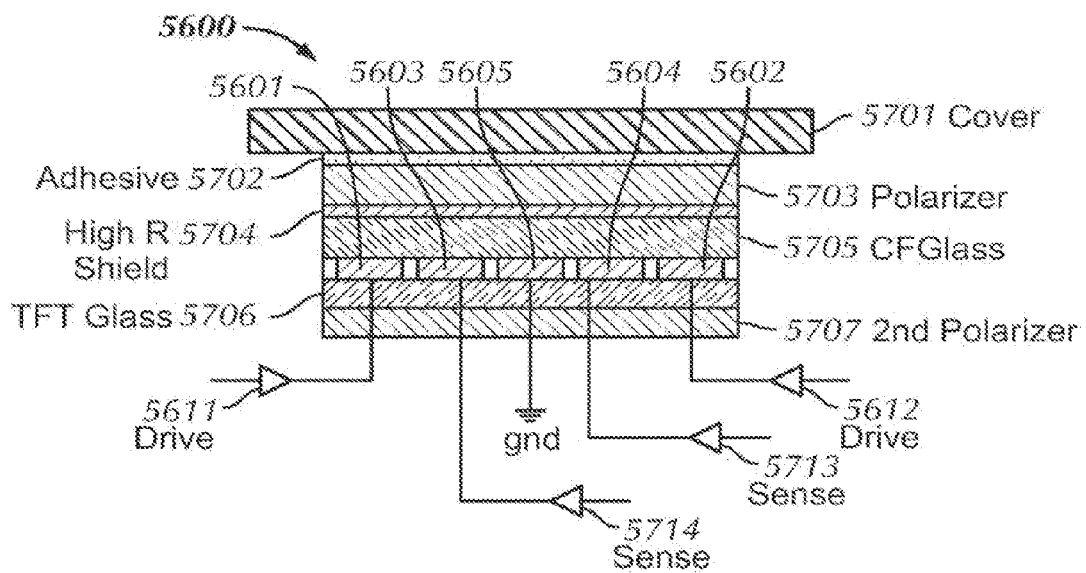
FIG. 57 is a side view of the example touch screen of FIG. 56, which illustrates an example high R shield according to embodiments of the invention.

FIG. 57 is a side view along the line A-A in FIG. 56, showing the portion of touch screen 5600, including a cover 5701, an adhesive 5702, a polarizer 5703, a high resistance (R) shield 5704, a color filter glass 5705, drive regions 5601 and 5602, sense regions 5603 and 5604, grounded separator region 5605, a TFT glass 5706, and a second polarizer 5707. A high resistance shield, such as high R shield 5704, may be used in touch screens using IPS LCD pixels, for example. A high R shield may help block low frequency/DC voltages near the display from disturbing the operation of the display. At the same time, a high R shield can allow high-frequency signals, such as those typically used for capacitive touch sensing, to penetrate the shield. Therefore, a high R shield may help shield the display while still allowing the display to sense touch events. High R shields may be made of, for example, a very high resistance organic material, carbon nanotubes, etc. and may have a resistance in the range of 100 Mega-ohms per square to 10 Giga-ohms per square.

Figure 58:
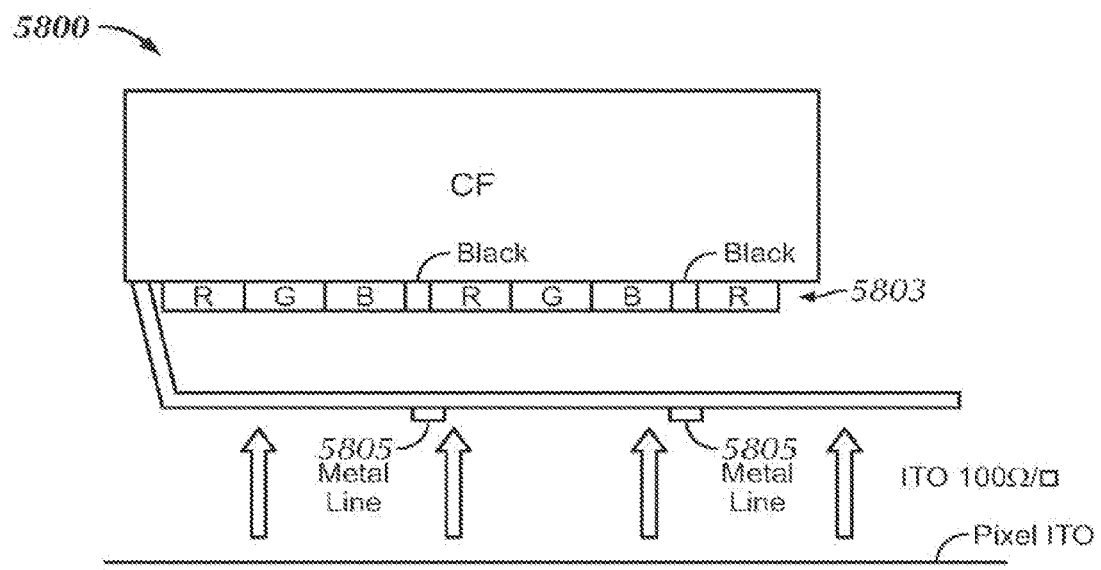
FIG. 58 illustrates a side view of a portion of an example touch screen including black mask lines of a black mask and metal lines under the black mask lines according to embodiments of the invention.
Figure 59:
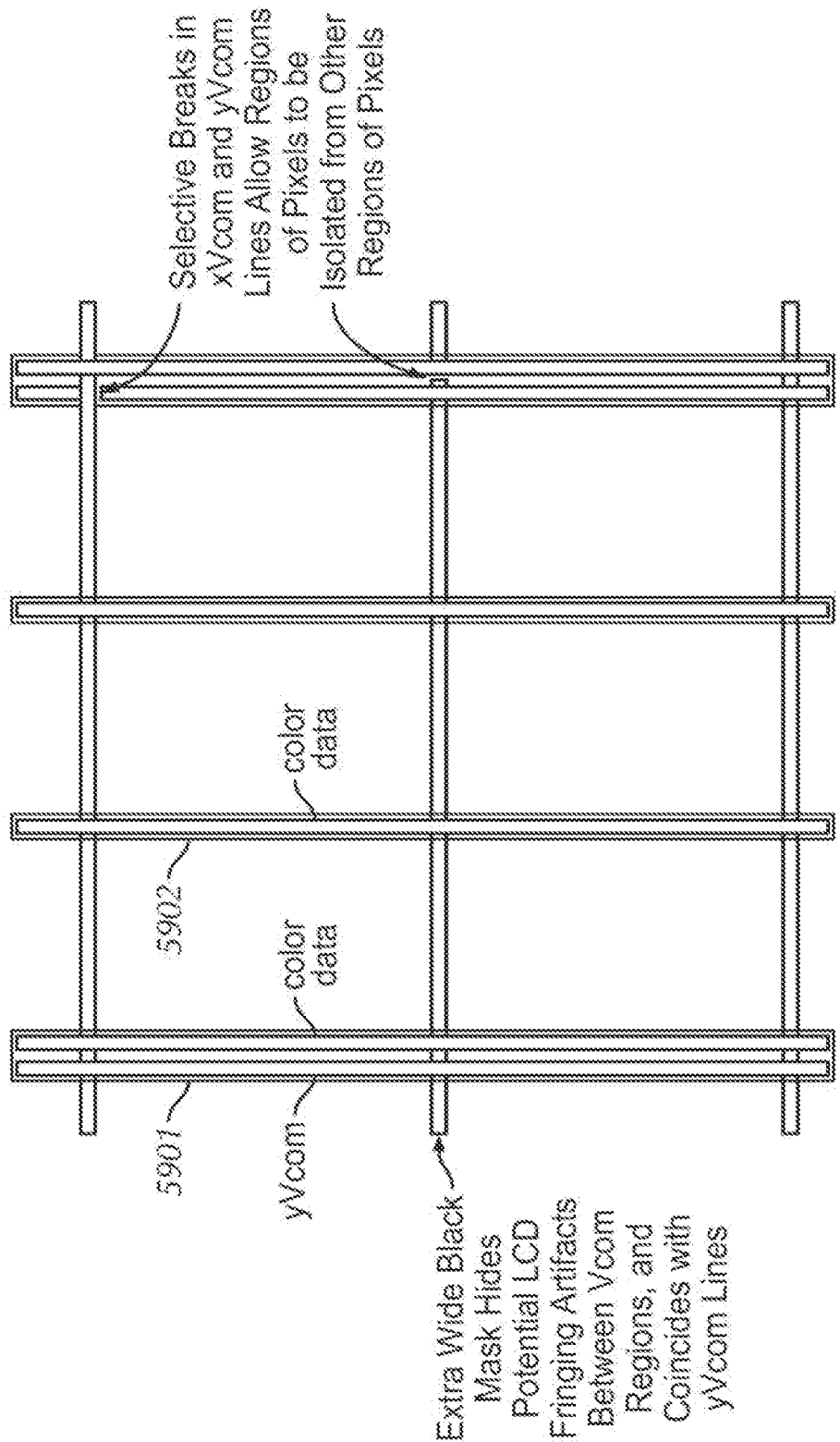
FIG. 59 illustrates an example black mask layout according to embodiments of the invention.

FIG. 58 shows a side view of a portion of an example touch screen 5800 according to embodiments of the invention. Touch screen 5800 includes a color filter glass 5801, a pixel layer 5803 (including red (R), green (G), and blue (B) pixels, and black mask lines of a black mask, such as shown in FIG. 59). Touch screen 5800 also includes metal lines 5805 under the black mask lines. Metal lines 5805 can provide low-resistance paths, for example, between a region of pixels and bus lines in the border of a touch screen. For example, in conventional LCD non-IPS displays, the common electrode, which is typically on the CF glass, is one sheet of ITO. Therefore, the resistance of this common electrode is very low. For example, a conventional LCD may have a common electrode of ITO that has a resistance of approximately 100 ohms per square. However, in some embodiments above the common electrode is "broken up" into regions that are connected to a shared common line through relatively thin pathways. The connection between a region of pixels and a shared common electrode line can have a relatively high resistance, particularly if the region is further away from the boarder of the touch screen, in which the shared common line may reside. Metal lines 5805 may help lower the resistance of the path to such a region. Placing metal lines 5805 under the black mask can reduce the metal lines' impact on pixel aperture ratio, for example.

FIG. 59 shows an example black mask layout according to embodiments of the invention. Black mask 5901 shields a yVcom line and a color data line. Mask 5901 can help to reduce potential LCD artifacts between different regions. Mask 5902 shields a color data line. Mask 5901, which covers two lines, is wider than mask 5902.

Figure 60:
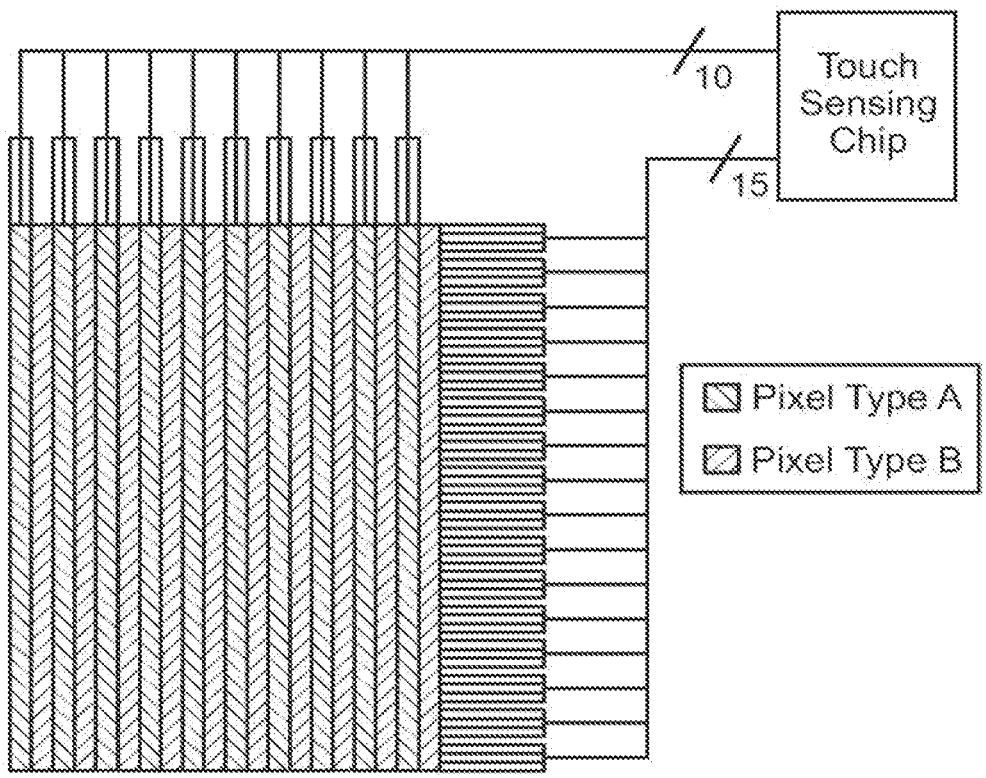
FIG. 60 illustrates an example IPS-based touch-sensing display in which the pixel regions serve multiple functions.

FIG. 60 shows an example IPS-based touch-sensing display in which the pixel regions serve multiple functions. For example, a pixel region can operate as a drive region at one time, and operate as a sensing region at another time. FIG. 60 shows two type of pixel regions, pixel region type A and pixel region type B. During a first time period the A type pixel regions, i.e., touch columns, can be driven with a stimulus waveform while the capacitance at each of the B type pixel regions, i.e., touch rows, can be sensed. During a next time period, the B type pixel regions, i.e., touch rows, can be driven with a stimulus waveform while the capacitance at each of the A type pixel regions, i.e., touch columns, can be sensed. This process can then repeat. The two touch-sense periods can be about 2 ms. The stimulus waveform can take a variety of forms. In some embodiments it may be a sine wave of about 5V peak-to-peak with zero DC offset. Other time periods and waveforms may also be used.

Figure 61:
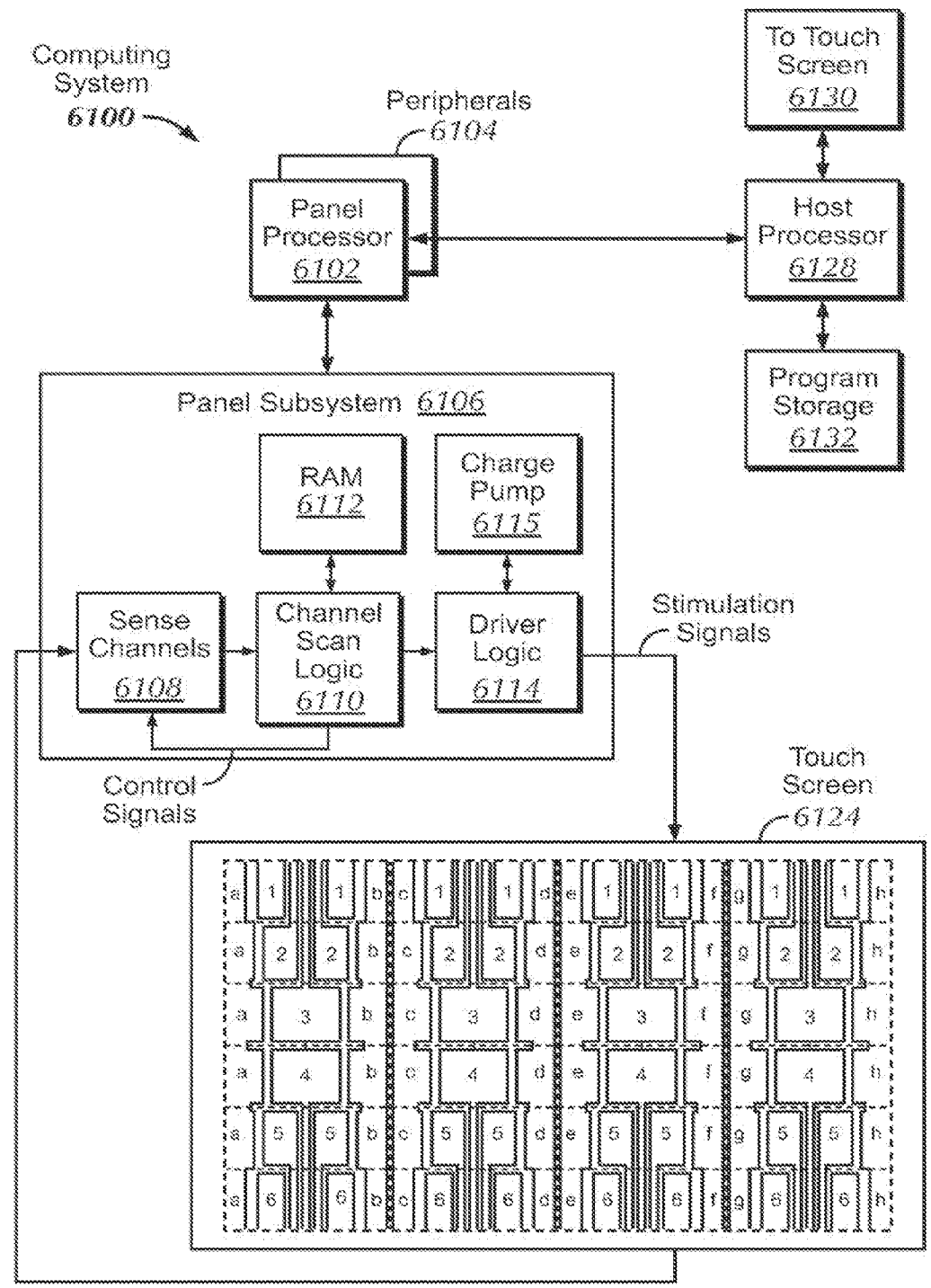
FIG. 61 illustrates an example computing system that can include one or more of the example embodiments of the invention.

FIG. 61 illustrates an example computing system 6100 that can include one or more of the embodiments of the invention described above. Computing system 6100 can include one or more panel processors 6102 and peripherals 6104, and panel subsystem 6106. Peripherals 6104 can include, but are not limited to, random access memory (RAM) or other types of memory or storage, watchdog timers and the like. Panel subsystem 6106 can include, but is not limited to, one or more sense channels 6108, channel scan logic 6110 and driver logic 6114. Channel scan logic 6110 can access RAM 6112, autonomously read data from the sense channels and provide control for the sense channels. In addition, channel scan logic 6110 can control driver logic 6114 to generate stimulation signals 6116 at various frequencies and phases that can be selectively applied to drive lines of touch screen 6124. In some embodiments, panel subsystem 6106, panel processor 6102 and peripherals 6104 can be integrated into a single application specific integrated circuit (ASIC).

Touch screen 6124 can include a capacitive sensing medium having a plurality of drive regions and a plurality of sense regions according to embodiments of the invention. Each intersection of drive and sense regions can represent a capacitive sensing node and can be viewed as picture element (pixel) 6126, which can be particularly useful when touch screen 6124 is viewed as capturing an "image" of touch. (In other words, after panel subsystem 6106 has determined whether a touch event has been detected at each touch sensor in the touch screen, the pattern of touch sensors in the multi-touch panel at which a touch event occurred can be viewed as an "image" of touch (e.g. a pattern of fingers touching the panel).) Each sense region of touch screen 6124 can drive sense channel 6108 (also referred to herein as an event detection and demodulation circuit) in panel subsystem 6106.

Computing system 6100 can also include host processor 6128 for receiving outputs from panel processor 6102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 6128 can also perform additional functions that may not be related to panel processing, and can be coupled to program storage 6132 and display device 6130 such as an LCD display for providing a UI to a user of the device. Display device 6130 together with touch screen 6124, when located partially or entirely under the touch screen, can form touch screen 6118.

Note that one or more of the functions described above can be performed by firmware stored in memory (e.g. one of the peripherals 6104 in FIG. 61) and executed by panel processor 6102, or stored in program storage 6132 and executed by host processor 6128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 62A:
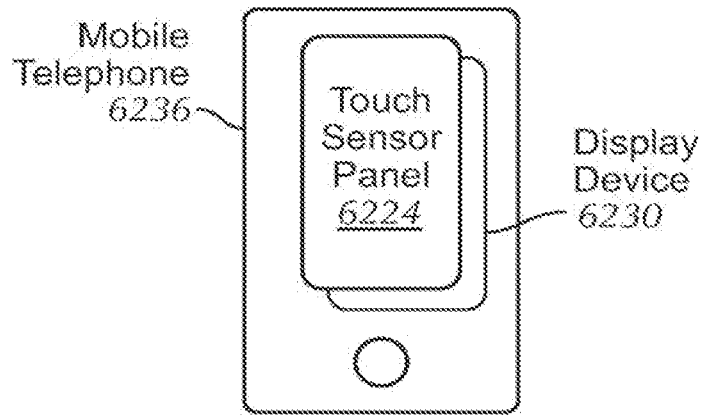
FIG. 62a illustrates an example mobile telephone that can include a touch screen including pixels with dual-function capacitive elements according to embodiments of the invention.

FIG. 62a illustrates an example mobile telephone 6236 that can include touch screen 6224 and display device 6230, the touch screen including pixels with dual-function capacitive elements according to embodiments of the invention.

Figure 62B:
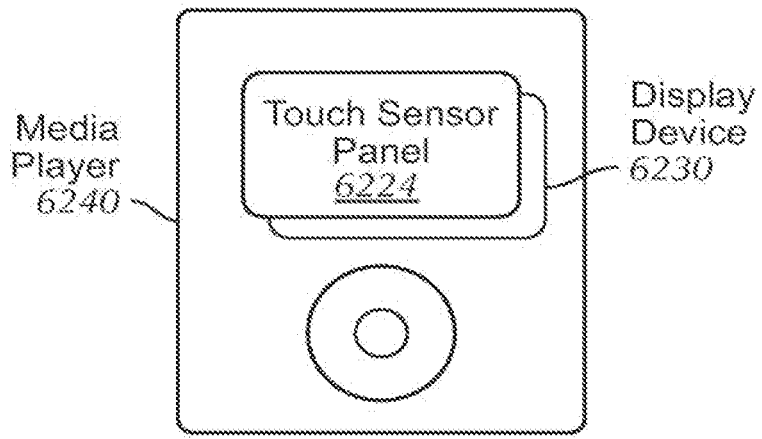
FIG. 62b illustrates an example digital media player that can include a touch screen including pixels with dual-function capacitive elements according to embodiments of the invention.

FIG. 62b illustrates an example digital media player 6240 that can include touch screen 6224 and display device 6230, the touch screen including pixels with dual-function capacitive elements according to embodiments of the invention.

Figure 62C:
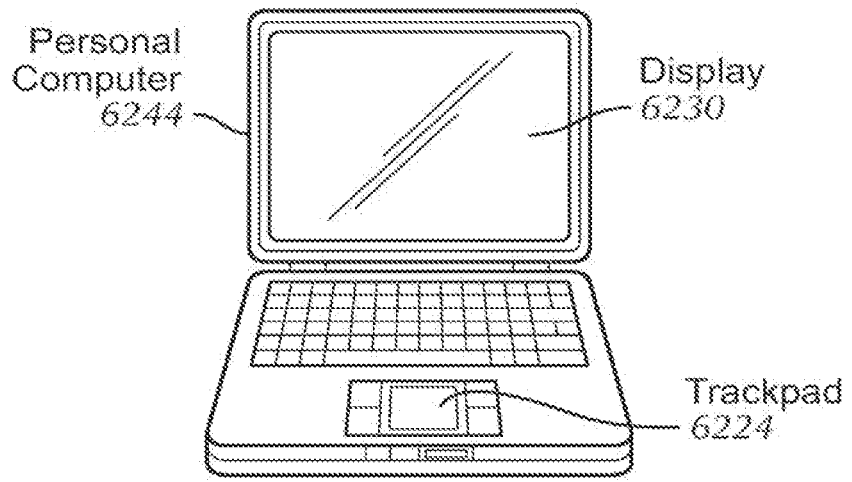
FIG. 62c illustrates an example personal computer that can include a touch screen including pixels with dual-function capacitive elements according to embodiments of the invention.

FIG. 62c illustrates an example personal computer 6244 that can include touch screen (trackpad) 6224 and display 6230, the touch screen of the personal computer (in embodiments where the display is part of a touch screen) including pixels with dual-function capacitive elements.

Although embodiments of this invention have been fully described with reference to the accompanying drawings, it is to be noted that various changes and modifications will become apparent to those skilled in the art.

What is claimed is:

1. A touch screen including a display region having display pixels and a non-display border region, the touch screen comprising:

a plurality of first common voltage lines disposed in rows including at least one row having a plurality of first portions that are electrically separate in the at least one row in the display region;

a plurality of second common voltage lines disposed in columns including at least one column having a plurality of second portions that are electrically separate in the at least one column in the display region;

a plurality of first regions and a plurality of second regions, each region including a plurality of display pixels each having a capacitive element, wherein in the plurality of first regions, the capacitive elements are electrically connected together via one or more of each of the plurality of first and second portions of the first and second common voltage lines, and wherein in the plurality of second regions, the capacitive elements are electrically connected together by a plurality of third common voltage lines disposed in columns;

the plurality of first regions electrically separated from the plurality of second regions in the display region in a touch sensing mode of operation; and wherein capacitive elements within each region are configured to provide a display function in a display mode of operation of the touch screen and to provide capacitive coupling between at least one region of the plurality of first regions serving as a drive region, and one region of the plurality of second regions serving as a sense region, in the touch sensing mode of operation.

2. The touch screen of claim 1, wherein during the touch sensing mode of operation, the plurality of first regions are electrically connected together in the non-display border region of the touch screen.

3. The touch screen of claim 1, wherein the capacitive elements of each of the plurality of first regions emanates an electric field;

the plurality of second regions comprise sense regions and including capacitive elements that receive the electric field; and a shield layer formed of a substantially high resistance material disposed such that the electric field passes through the shield layer before being received by the sense regions.

4. The touch screen of claim 3, wherein the drive regions and the sense regions are disposed on a common substrate.

5. The touch screen of claim 4, wherein the touch screen comprises a cover and the drive shield layer is disposed between the cover and the drive and sense regions.

6. The touch screen of claim 5, wherein the plurality of first regions are electrically connected together in a non-display border region of the touch screen.

7. The touch screen of claim 1, further comprising at least one grounded region of display pixels disposed between a drive region and a sense region.

8. A method of operating a touch screen including a display region having display pixels and a non-display border region, the touch screen having a plurality of first common voltage lines disposed in rows including at least one row having a plurality of first portions that are electrically separate in the at least one row in the display region, a plurality of second common voltage lines disposed in columns including at least one column having a plurality of second portions that are electrically separate in the at least one column in the display region, a plurality of first regions and a plurality of second regions, each region including a plurality of display pixels each having a capacitive element, wherein in the plurality of first regions, the capacitive elements are electrically connected together via one or more of each of the plurality of first and second portions of the first and second common voltage lines, and wherein in the plurality of second regions, the capacitive elements are electrically connected together by one or more of a plurality of third common voltage lines disposed in columns, the plurality of first regions electrically separated from the plurality of second regions in the display region in a touch sensing mode of operation, and wherein capacitive elements within each region are configured to provide a display function in a display mode of operation of the touch screen and to provide capacitive coupling between at least one region of the plurality of first regions serving as a drive region, and one region of the plurality of second regions serving as a sense region, in the touch sensing mode of operation, the method comprising:

operating the capacitive elements during the display mode of operation to produce an image on the touch screen;

operating the capacitive elements during the touch sensing mode of operation to sense a touch event on or near the touch screen, wherein operating the capacitive elements during the touch sensing mode of operation comprises:

driving the capacitive elements in the plurality of first regions of display pixels with a stimulation signal; and sensing electric fields with the capacitive elements in at least one of the plurality of second regions of display pixels, and wherein the display mode of operation and the touch sensing mode of operation alternate periodically.

9. The method of claim 8 wherein operating the capacitive elements during the touch sensing mode of operation comprises:

transmitting an alternating current (AC) signal through capacitive elements in the plurality of first regions, the AC signal having a same direct current (DC) offset as an LCD inversion signal transmitted through the capacitive elements during the display mode of operation.

10. The method of claim 8 further comprising, providing a ground isolation region positioned between the between a drive region and a sense region.

11. A stackup of a touch screen including a display region having display pixels and a non-display border region, the stackup comprising:

a plurality of gate lines;

a plurality of data lines;

the plurality of gate lines and the plurality of data lines coupled to the plurality of pixels for enabling display of data by the plurality of pixels;

a plurality of first common voltage lines disposed in rows including at least one row having a plurality of first portions that are electrically separate in the at least one row in the display region;

a plurality of second common voltage lines disposed in columns including at least one column having a plurality of second portions that are electrically separate in the at least one column in the display region;

a plurality of first and second regions, each region including a plurality of display pixels each having a capacitive element, wherein in the plurality of first regions, the capacitive elements are electrically connected together via one or more portions of each of the first and second common voltage lines, and wherein in the plurality of second regions, the capacitive elements are electrically connected together by a plurality of third common voltage lines disposed in columns, and the plurality of first regions are electrically separated from the plurality of second regions in the display region in a touch sensing mode of operation, wherein the first regions are drive regions and the second regions are sense regions;

at least one bus line forming part of an electrical connection that connects together ones of the plurality of first regions in the touch sensing mode of operation; and wherein the at least one bus line is disposed in the non-display border region of the display screen.

12. The stackup of claim 11, wherein the plurality of first common voltage lines are formed from a single layer of conductive material.

13. The stackup of claim 12 wherein the plurality of second common voltage lines and the plurality of third common voltage lines are formed of another single layer of conductive material.

14. The stackup of claim 11, wherein the circuit elements are storage capacitors of the display pixels.

15. The stackup of claim 11, wherein the at least one bus line comprises first bus lines that connect together the plurality of first regions in the touch sensing mode of operation and at least an additional bus line that connects together the plurality of second regions in the touch sensing mode of operation.

16. The stackup of claim 15 wherein at least one ground region is disposed in a column between ones of the plurality of first and second regions.

17. The stackup of claim 11, wherein first, second and third sets of the plurality of first regions are each disposed along a column direction, and fourth and fifth sets of the plurality of second regions are disposed along the column direction, wherein
  the first through fifth sets are disposed along a row direction in the order of the first, fourth, second, fifth and third sets; and;
  the at least one bus line includes a first bus line forming part of an electrical connection that connects together the circuit elements of the first, second and third sets, and a second bus line that forms part of an electrical connection that connects together circuit elements of the fourth and fifth sets.

18. The touch screen of claim 11, further comprising at least one grounded region of display pixels disposed adjacent each sense region.

19. A touch sensing system comprising:
  a stackup of a touch screen including a display region having display pixels and a non-display border region comprising:
    a plurality of gate lines;
    a plurality of data lines;
    a plurality of first common voltage lines disposed in rows including at least one row having a plurality of first portions that are electrically separate in the at least one row in the display region;
    a plurality of second common voltage lines disposed in columns including at least one column having a plurality of second portions that are electrically separate in the at least one column in the display region;
    a plurality of first and second regions, each region including a plurality of display pixels each having a capacitive element, wherein in the plurality of first regions, the capacitive elements are electrically connected together via one or more portions of each of the first and second common voltage lines, and wherein in the plurality of second regions, the capacitive elements are electrically connected together by a plurality of third common voltage lines disposed in columns;
    the plurality of first regions electrically separated from the plurality of second regions in the display region in a touch sensing mode of operation;
    wherein capacitive elements within each region are configured to provide a display function in a display mode of operation of the touch screen and to provide capacitive coupling between at least one region of the plurality of first regions serving as a drive region, and one region of the plurality of second regions serving as a sense region in the touch sensing mode of operation;
  a drive circuit configured to provide stimulation signals to the plurality of first regions during the touch mode of operation; and
  a sense channel connected to the plurality of second regions during the touch sensing mode of operation.

20. The touch sensing system of claim 19, further comprising:
  at least one bus line forming part of an electrical connection that connects together the plurality of first regions in the touch sensing mode of operation; and
  wherein the at least one bus line is disposed in the non-display border region of the display screen.

21. The touch sensing system of claim 19, wherein the capacitive elements of the plurality of first and second regions are common electrodes.

22. The touch sensing system of claim 19, wherein the capacitive elements of the plurality of first and second regions are fringe field electrodes.

23. The touch sensing system of claim 19, wherein the display region includes a liquid crystal display.

24. The touch sensing system of claim 23, wherein each of the plurality of display pixels includes a fringe field electrode.

25. The touch sensing system of claim 24, wherein the fringe field electrode is configured to operate in a display mode of operating during the touch sensing mode of operation.

26. The touch sensing system of claim 19, further comprising at least one grounded region of display pixels disposed between a drive region and a sense region.

27. A touch screen including display pixels with capacitive elements, the touch screen comprising:
  a plurality of drive regions of display pixels that is stimulated by stimulation signals;
  a plurality of sense regions of display pixels that receives sense signals corresponding to the stimulation signals; and
  at least one grounded region of display pixels that is grounded, wherein the at least one ground region is disposed in between at least one of the plurality of sense regions and one of the plurality of drive regions;
  capacitive elements of the plurality of drive regions electrically connected together by a grid of portions of first voltage lines disposed in a first direction, the portions of the first voltage lines being electrically separate in the first direction in the display region, and portions of second voltage lines disposed in a second direction, the portions of the second voltage lines being electrically separate in the second direction in the display region;
  capacitive elements of the plurality of sense regions electrically connected together by third voltage lines disposed in the second direction;
  the plurality of drive regions electrically separated from the plurality of sense regions during a touch sensing mode of operation;
  capacitive elements within each region are configured to provide a display function in a display mode of operating of the touch screen and to provide capacitive coupling between the drive regions and the sense regions in the touch sensing mode of operation of the touch screen.

28. The touch screen of claim 27, wherein ones of the plurality of drive regions are electrically connected to one another along the first direction in the touch sensing mode of operation by electrical connections at least partially disposed on a border region of the touch screen.

* * * * *